United States Patent [19]
Ward

[11] Patent Number: 5,081,576
[45] Date of Patent: Jan. 14, 1992

[54] ADVANCE POLLING BUS ARBITER FOR USE IN MULTIPLE BUS SYSTEM

[75] Inventor: William P. Ward, Poway, Calif.

[73] Assignee: Encore Computer U.S., Inc., Fort Lauderdale, Fla.

[21] Appl. No.: 173,211

[22] Filed: Mar. 24, 1988

[51] Int. Cl.⁵ .............. G06F 13/22; G06F 13/364; G06F 13/366; G06F 15/16

[52] U.S. Cl. .............. 395/325; 364/228.3; 364/229.2; 364/230.1; 364/240.1; 364/240.9; 364/241; 364/241.3; 364/242.7; 364/242.92; 364/259.2; 364/DIG. 1

[58] Field of Search ... 364/200 MS File, 900 MS File; 370/85.8; 375/8; 340/825.22

[56] References Cited

U.S. PATENT DOCUMENTS

| | | | |
|---|---|---|---|
| 4,100,533 | 6/1978 | Napolitano et al. | 370/85.8 |
| 4,205,373 | 5/1980 | Shah et al. | 364/200 |
| 4,468,738 | 8/1984 | Hansen et al. | 364/200 |
| 4,470,114 | 9/1984 | Gerhold | 364/200 |
| 4,586,128 | 4/1986 | Dewoskin | 364/200 |
| 4,608,700 | 8/1986 | Kirtley, Jr. et al. | 370/85.8 |
| 4,660,141 | 4/1987 | Ceccon et al. | 364/200 |

Primary Examiner—Archie E. Williams, Jr.
Assistant Examiner—Emily Y. Chan
Attorney, Agent, or Firm—Fleit, Jacobson, Cohn, Price, Holman & Stern

[57] ABSTRACT

An advance polling bus arbiter includes a priority selector for selecting during a polling cycle a highest priority source system unit which is seeking access to a system bus. Bus grant logic sends the highest priority source system a bus grant signal which indicates that the selected system unit can make a transfer during the next cycle. An advance link logic unit compares a target bus address received from the selected system unit to a local bus address and simultaneously signals an intersystem bus link of an impending intersystem transfer while the source system unit is receiving its bus grant signal.

1 Claim, 35 Drawing Sheets

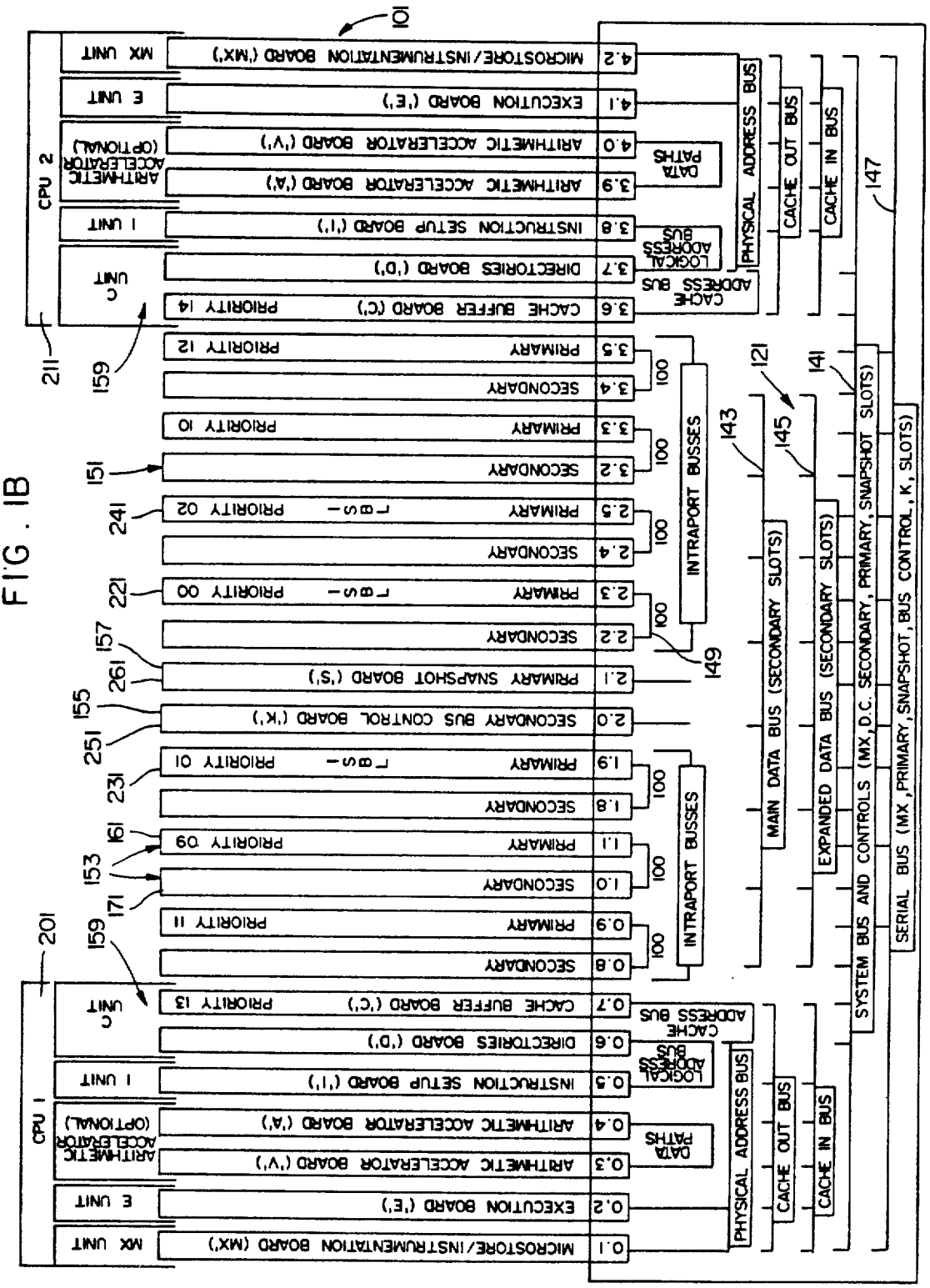

ADVANCE POLLING BUS ARBITER FOR USE IN MULTIPLE BUS SYSTEM

CROSS REFERENCES TO RELATED APPLICATIONS

This application is related to applications for:

"System For Monitoring and Capturing Bus Data in a Computer" to Smith et al., Ser. No. 173,222, now U.S. Pat. No. 4,959,772, filed on the same day as this application and assigned to the assignee of this application. The disclosure of the Smith et al. application is incorporated by reference herein;

"Bus Structure for Overlapped Data Transfer" to Thomas et al., Ser. No. 173,212, now U.S. Pat. No. 5,001,525, filed on the same day as this application and assigned to the assignee of this application;

"Cache Memory With Interleaved Storage" to Ward et al., Ser. No. 173,405, now abandoned, filed on the same day as this application and assigned to the assignee of this application; and "Cache Memory Address Modifier For Dynamic Alteration of Cache Block Fetch Sequence" to Ward et al., Ser. No. 173,406, now U.S. Pat. No. 4,953,079, filed on the same day as this application and assigned to the assignee of this application.

BACKGROUND OF THE INVENTION

The invention relates to a three cycle bus arbiter which operates in a polling-transfer-confirmation system bus environment and more particularly, relates to a bus arbiter which provides advance transfer signals to an intersystem bus link during the same bus cycle in which it provides request/grant operations for a system bus unit.

It is well known to those skilled in the art of computer design as well as to users of digital computer systems that generally more speed in computation and information processing is nearly always desirable if it can be provided in an economical manner. One way in which the speed of processing may be increased for a digital computer is by increasing the number of instructions or floating point operations which may be performed per second by the system. One school of thought holds that the manner in which this is done is by decreasing the cycle time for a very powerful processor so that a single processor may execute more instructions or perform more floating point operations per second. While this option is often attractive and relatively straightforward from an engineering standpoint, it is also quite expensive in that it requires that a given system employ the most powerful and advanced subsystems and circuitry available to those skilled in the art at the time that the system is being designed. This entails some risk since the underlying technology may be relatively new and untried and may prove to be inoperable in the environment of a very high performance digital computer.

As an alternative, it is sometimes desirable to employ multiple processing units or even multiple digital computers connected together to share information. It is well known to those skilled in the art, that once multiple processors begin sharing information among themselves, careful design must be employed in order to insure that the number of cycles required to transfer information from one processor to another or among storage units does not increase to the point that the multiple processor system is only marginally faster than a single processor system.

One of the problems associated with multiple processor systems is that typically, a customer is forced to purchase a system with a fixed number of processors. That is, a particular system will be optimized to use two, four or eight processors and if the customer desires to have certain of the processors removed in order to satisfy somewhat lesser performance requirements, while reducing the cost of the system, it is often necessary that he purchase extraneous hardware which stands idle since it would normally be used to handle tasks for the maximum number of processors for which the system is configured.

What is needed then, is a digital computer and in particular, a bus arbitration system for a digital computer which is economically configurable for one or a plurality of processors and which reduces the number of processor or bus cycles required to transfer information from one system bus to another system bus in a multiple system bus, multiple processor digital computer system.

SUMMARY OF THE INVENTION

An advance polling bus arbiter includes an input port for receiving bus request signals from a plurality of system units connected to a system bus. The bus request signals are fed to a prioritizing unit which identifies the system unit having the highest priority which has requested access to the full system bus.

In the event that only one-half of the bus is being requested by a first plurality of system units and one-half of the bus is being requested by a second plurality of system units, the system unit having the highest priority in the first plurality and the system unit having the highest priority in the second plurality will be selected by the priority logic.

Simultaneously with receiving the bus request signals from each of the system units asserting such signals, the bus arbiter also receives an address signal from each system unit indicating the target system or target system bus which is to receive the anticipated bus transfer. When the priority logic selects the system unit or system units to receive the bus grant signals for the next cycle, it also signals target bus decoding logic as to which systems will be receiving access to the local system bus. The target bus decoding logic then compares the target bus addresses sent by the system unit(s) being selected. In the event that the target bus address does not match the address of the local bus, in other words, an off-bus transfer is to be made, a signal is immediately sent to an intersystem bus link unit by bus link logic which alerts the intersystem bus link that it will be receiving a bus transfer for transfer to a remote system. In this manner, both the system bus arbitration and advance polling of the intersystem bus link takes place in a single cycle saving considerable time.

It is a principal object of the present invention to provide a bus arbiter having an advanced polling mechanism which can signal an intersystem bus link of an impending transfer through it simultaneously with the transmission of a bus grant signal to a requesting system unit.

It is another object of the instant invention to provide a bus arbiter with an advance polling feature which minimizes the number of bus cycles required to transfer information from a system unit connected to a first system bus to a system unit connected to a second system bus.

Other objects and uses of the instant invention will become obvious to one skilled in the art upon a perusal of the following specification and claims in light of the accompanying drawings.

BRIEF DESCRIPTION OF THE DRAWINGS

FIG. 1B is a plan view of a system bus structure of one of the digital computers of FIG. 1A;

FIGS. 11A and 11B are logic diagrams of a portion of a request in logic module of the bus arbiter of FIG. 10;

FIGS. 12A and 12B are logic diagrams of a portion of the request in logic of the bus arbiter of FIG. 11;

FIGS. 13A and 13B are logic diagrams of a portion of the request in logic;

FIGS. 16A and 16B are logic diagrams of a portion of the logic of the request comparator;

DESCRIPTION OF THE PREFERRED EMBODIMENT

Figure 1A:
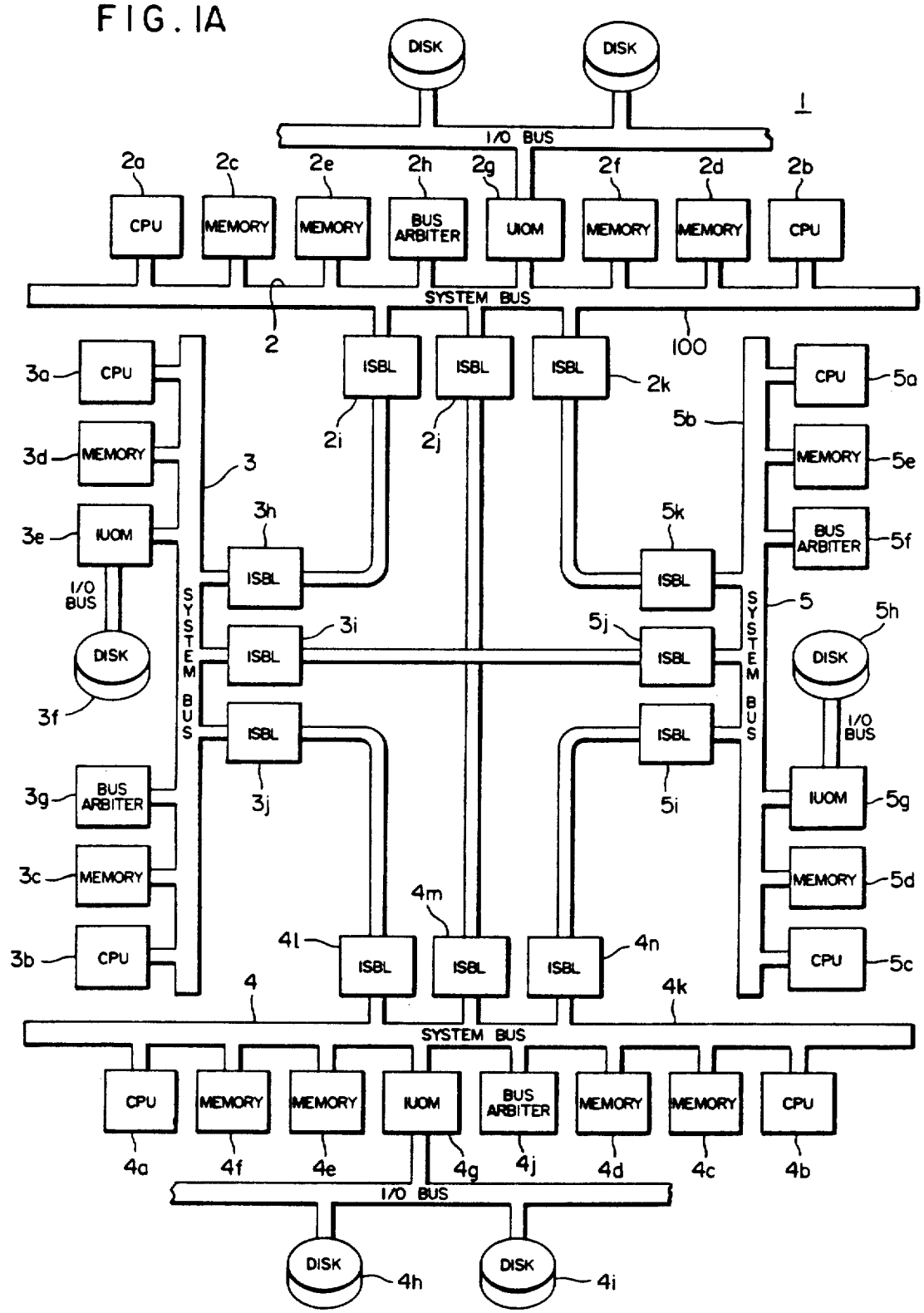
FIG. 1A is a block diagram of a multisystem computer network embodying the present invention.

Referring now to the drawings and especially to FIG. 1A, a multi-system network embodying the present invention is shown therein and is generally indicated by the numeral 1. The multisystem network 1 includes a first dual processor computer 2 having a first central processing unit 2a, a second central processing unit 2b, a first memory module 2c, a second memory module 2d, a third memory module 2e, a fourth memory module 2f, a universal I/O microengine 2g, a bus arbiter 2h and a plurality of intersystem bus links 2i, 2j and 2k. Each of the intersystem bus links 2i, 2j and 2k is connected to a matching intersystem bus link, respectively connected to a dual processor computer 3, a dual processor computer 4 and a dual processor computer 5. Systems 3, 4 and 5, although shown as being configured similarly to the system 2, may include varying amounts of memory, secondary storage and the like. The system 3 includes a first CPU 3a, a second CPU 3b, a memory module 3c, a second memory module 3d, a universal I/O microengine 3e coupled to a disk drive 3f, a bus arbiter 3g and a plurality of intersystem bus links, respectively identified as 3h, 3i and 3j. Intersystem bus link 3h is connected to the intersystem bus link 2i for communication between the digital computer 2 and the digital computer 3.

The digital computer 4 includes a central processing unit 4a, a second central processing unit 4b, a first memory module 4c, a second memory module 4d, a third memory module 4e, a fourth memory module 4f, a universal I/O microengine 4g, a first disk storage unit 4h connected to the universal I/O microengine, a second disk storage unit 4i connected to the universal I/O microengine, a bus arbiter 4j and a plurality of intersystem bus links connected to the system bus 4k being respectively identified as an intersystem 41, an intersystem bus link 4m and an intersystem bus link 4n. The intersystem bus link 41 is connected to the intersystem bus link 3j. The intersystem bus link 4m is connected for communication with the intersystem bus link 2j.

The digital computer 5 includes a first central processing unit 5a connected to a system bus 5b. A second central processing unit 5c is connected to the system bus 5b. A first memory module 5d and a second memory module 5e are connected to the system bus 5b. A bus arbiter 5f is also connected to the system bus 5b. A universal I/O microengine 5g is connected to system bus 5b and to a disk storage unit 5h. A plurality of intersystem bus links, respectively identified as 5i, 5j and 5k are connected to the system bus 5b. The intersystem bus link 5k communicates with the intersystem bus link 2k. The intersystem bus link 5j communicates with the intersystem bus link 3i. The intersystem bus link 5i communicates with the intersystem bus link 4n.

Taking the computer system as an exemplary system, a system bus structure 100 is shown therein having a plurality of functional units connected to it.

Figure 2:
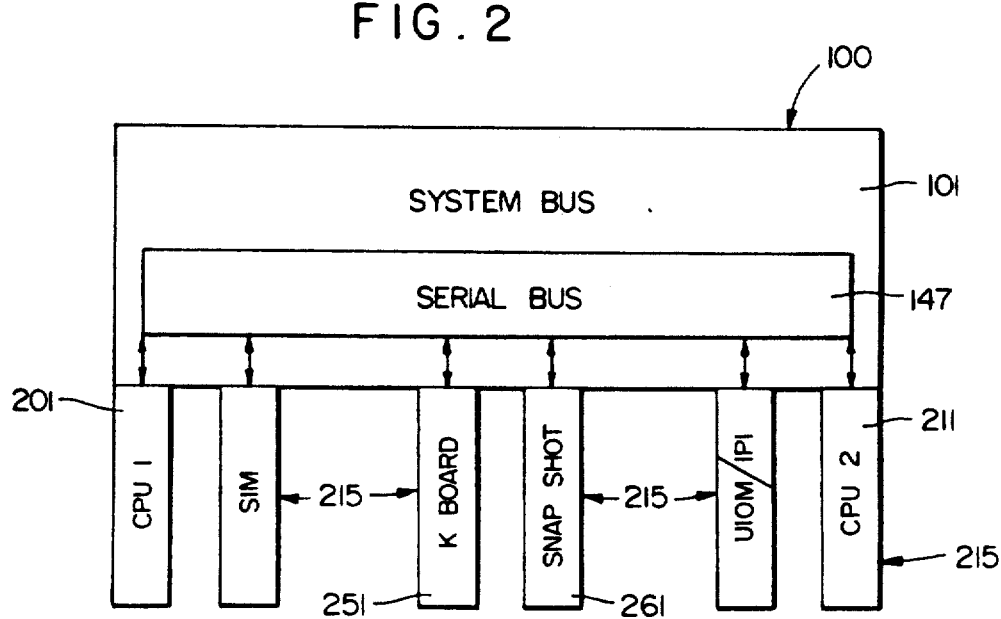
FIG. 2 is a block diagram view of the preferred multiprocessor digital computer architecture of FIG. 1B including the system bus structure.

Referring now to FIG. 1B, a mini-supercomputer 10 which is substantially similar to digital computers 2, 3, 4 and 5, includes a high speed system bus structure embodying the present invention is shown therein and is generally identified by numeral 101. As may best be seen in FIGS. 1A, 1B and 2, a plurality of system bus units generally referenced by numeral 215 is connected to the system bus structure 101 by attachment of said units 215 to respective desired ports, and, particularly designed to support high speed, high reliability, parallel processing of bi-directional signal transfers in a multi-port and multiple central processor unit (CPU) environment communication as between system bus units or devices 215. One embodiment of a system bus architecture 100 utilizing the system bus structure 101 as contemplated is shown in FIGS. 1A, 1B and 2. This embodiment comprises a first Vector Processing Central Processing Unit (CPU) 201 connected to up to seven ports respectively numbered 01–07, three Inter-System Bus Link Units (ISBLs) respectively numbered 221, 231 and 241 connected to ports, respectively numbered 19, 23 and 25, a bus controller unit 251 connected to a port 20, a snapshot unit 261 connected to a port, and a second Vector Processing Central Processing Unit (CPU) 211 connecting to up to seven ports respectively numbered 36–42. A number of additional general ports 08–17 and 26–35 are provided for connection of other system bus units 215, such as a System Integrated Memory (SIM) unit, a Universal Input/Output Microengine (UIOM) unit, and an Intelligent Peripheral Interface (IPI) unit.

Up to three Inter-System Bus Link Units 221, 231 and 241 may be connected to a given system bus structure 101 in order to provide a means for developing a system network. A system network is created by connecting a given ISBL from a first system bus structure 101 to a second ISBL from a second system bus structure 101. By creating this interconnection of system bus structures 101, the various system bus units 215 from the first system bus structure 101 may communicate with various system bus units 215 from the second system bus structure 101. The result is that the overall memory space of one system bus architecture 100 utilizing the system bus structure 101 may be doubled, tripled, or increased four-fold with up to four system bus structures 101 inter-connected into a system network.

The system bus structure 101 includes several sets of multiple lines, buses or bus lines, referred to generally by numeral 221, which may be implemented onto a backplane 119 as with external layer printed wiring having an unloaded characteristic impedance of approximately 50 ohms. The major buses 121 include a main system bus 141, a main data bus 103, an expanded data bus 145, a serial bus 147, and, a plurality of intraport busses 149.

The main system bus 141 is comprised of one hundred eleven lines organized into several major fields of multiple lines, the signals of which are separately interpretable for providing desired message transfer characteristics under which the system bus structure 101 operates and is discussed more particularly hereinafter. The main system bus 141 also includes a number of control signal lines which carry individual control signals used for general system control including global stop request, power fail, and stop clock lines.

The main data and expanded data busses 143 and 145 are comprised, respectively, of seventy-two independent lines and include various fields which are separately interpretable for providing data information to the various system bus units 215.

The serial bus 147 is comprised of two independent lines. Information carried on the serial bus is organized serially into a plurality of control and data fields which are separately interpretable for soft loading system bus units 215 as with control store information in the form of firmware and control or parameter settings.

Each intraport bus 149 is comprised of one hundred independent lines connecting a pair of primary and secondary ports respectively numbered 161 and 171. Each intraport bus 149 is device dependent and provides a data/control transmission path between each pair of primary and secondary ports 161 and 171.

Figure 3:
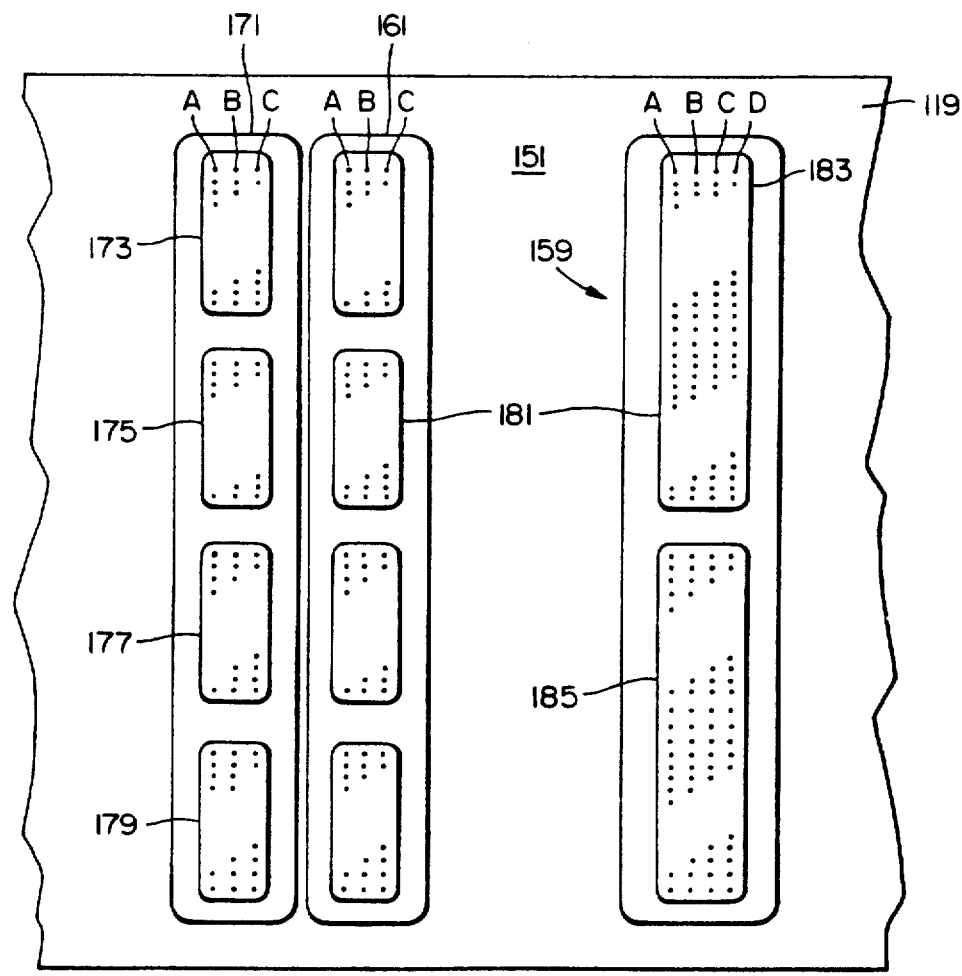
FIG. 3 is an isolation view, in partial cutaway, of a port side of a backplane incorporated as part of the system bus structure of FIG. 1B and displaying a primary port, a secondary port, and, a CPU port including a slot and a pin configuration.

Referring particularly to FIG. 3, the system bus structure 101 includes a series of 42 ports, referred to generally by numeral 151, which are physically located in parallel along the backplane 119 and are selectively connected in parallel to the various bus lines 121 in order to provide a means for interconnection of system bus units 215 to the system bus structure 101 and enabling inter-communication of system bus units 215 by means of the bus lines 121. The ports 151 include a plurality of general bus ports 153, a controller port 155, a snapshot port 157, and two groups of CPU ports 159 as may best be seen in FIGS. 1A and 1B. It should be noted that the controller port 155 and the snapshot port 157 are not identical to the general bus ports 153 or the CPU ports 159.

Each of the general bus ports 153 is comprised of a pair of ports, previously referred to as the primary port 161 and the secondary port 171, and is used as a general purpose location for peripheral bus units 215, such as memories, Inter-System Bus Links, and Universal Input/Output Microengines. The primary and secondary ports 161 and 171 of a given general port 153 are to be connected to a primary board and a secondary board of the selected system bus unit 215. A primary board of a selected system bus unit 215 mates with a selected primary port 161 in perpendicular relation to the backplane 119 and is thereby connected to the main system bus 141. The secondary board of the same system bus unit 215, if there is one, mates with the secondary port 171, corresponding to the selected primary port 161, in perpendicular relation to the backplane 119 and is thereby connected to the main and expanded data busses 143 and 145. The intraport bus 149 associated with the selected general port connects the primary board and the secondary board of the system bus unit 215 in parallel and series relation at each of the one hundred independent lines of the intraport bus 149, and provides a communication path by which data and system information may be transferred freely within a particular system bus unit 215.

From the foregoing, it can be seen that the system bus structure 101 comprises the system bus units 215 attaching to the general ports as comprising sets of two boards: a primary board for receipt and processing of system and control information from the main system bus, and, a secondary board for receipt of data information from the main and expanded data buses and cooperating with the primary board in the processing of data information in accordance with the system and control information.

The controller port 155 is used for connecting other system units to a bus controller and clock signal generator unit or bus arbiter 251, also known as a K-board, which arbitrates transfers over the system bus structure 101. The bus controller and clock signal generator unit 251 has timing means, such as clock distribution circuitry by which transfers are synchronized, and provides bus request/select or priority arbitration logic means, such as circuitry for determining priority of other system bus units asserting bus access requests.

A snapshot port 157 is used for connecting a snapshot unit 261 which affords a means of monitoring processing activity.

Each of the primary, secondary, controller, and snapshot ports, 161, 171, 155 and 157, are comprised of four (4) slots 173, 175, 177 and 179 with three (3) rows A, B, C of 32 pins per slot, otherwise known as 96 DIN pin and socket connectors. While each of the CPU ports 159 are comprised of two (2) slots 183, 185, with four (4) rows A, B, C, D of 96 pins, however, the specific connectors used for the CPU slots may vary according to the processor type. For all slots and configurations, a plurality of male pins 181 are installed in the backplane to facilitate ease of repair should a given pin 181 become damaged.

The pins 181 are connected to mating portions of various system bus units 215, or printed circuit boards, for purposes of accommodating transfers of bits of information or instructions. A corresponding in 181 of each primary, secondary, snapshot, and series of CPU ports 161, 171, 157, and 159 is connected in parallel with each of the one hundred eleven lines of the main system bus 141, facilitating the transfer of control information and instructions. Several of the pins 181 of the controller port 155 are connected to a corresponding number of lines of the main system bus 141, controlling system bus transfers.

A corresponding pin 181 of each secondary port 171 is connected in parallel with each of the seventy-two lines of the main data bus 143 and the seventy-two lines of the expanded data bus 145, facilitating the transfer of standard 64-bit or expanded 128-bit data transfers.

A corresponding pin 181 of each primary port, snapshot, controller, and the CPU port for the microstore/instrumentation unit 157, 155 and 159 is connected in parallel with each of the two lines of the serial bus 147, facilitating the transfer of serial data, instructions, and information.

A corresponding pin 181 of each pair of primary and secondary ports 161 and 171 is connected in parallel with each of the one hundred lines of a corresponding set of the intraport bus 149, facilitating the intra-system bus unit communication of the primary and secondary boards of a system bus unit 215.

A number of pins 181 are provided for supplying the necessary power requirements of the system bus units 215. Each type of port 151 and 159 has its power/ground pins uniquely distributed.

A numerical breakdown of the pin 181 assignments of each general port 153 is provided in the following table:

| PIN BREAKDOWN OF GENERAL PORTS | |
|---|---|
| | PINS |
| PRIMARY SLOT | |
| 4 Each 96 Pin Connectors | 384 |
| Ground | 145 |
| −5.2 V | 28 |
| −2.0 V | 16 |
| +5.0 VA | 20 |
| +5.0 VB | 17 |
| Clock Pins | 4 |
| System Bus & Controls | 111 |
| Serial Bus | 2 |
| Intraport Bus | 100 |
| Space Pins (not bussed) | 4 |
| Space Pins (bussed) | 6 |
| SECONDARY SLOT | |
| 4 Each 96 Pin Connectors | 384 |
| Ground | 147 |
| −5.2 V | 38 |
| −2.0 V | 119 |
| +5.0 VA | 18 |
| +5.0 VB | 20 |
| Clock Pins | 4 |
| Main Data Bus | 72 |
| Expanded Data Bus | 72 |
| Intraport Bus | 100 |
| Space Pins (not bussed) | 2 |

Figure 6:
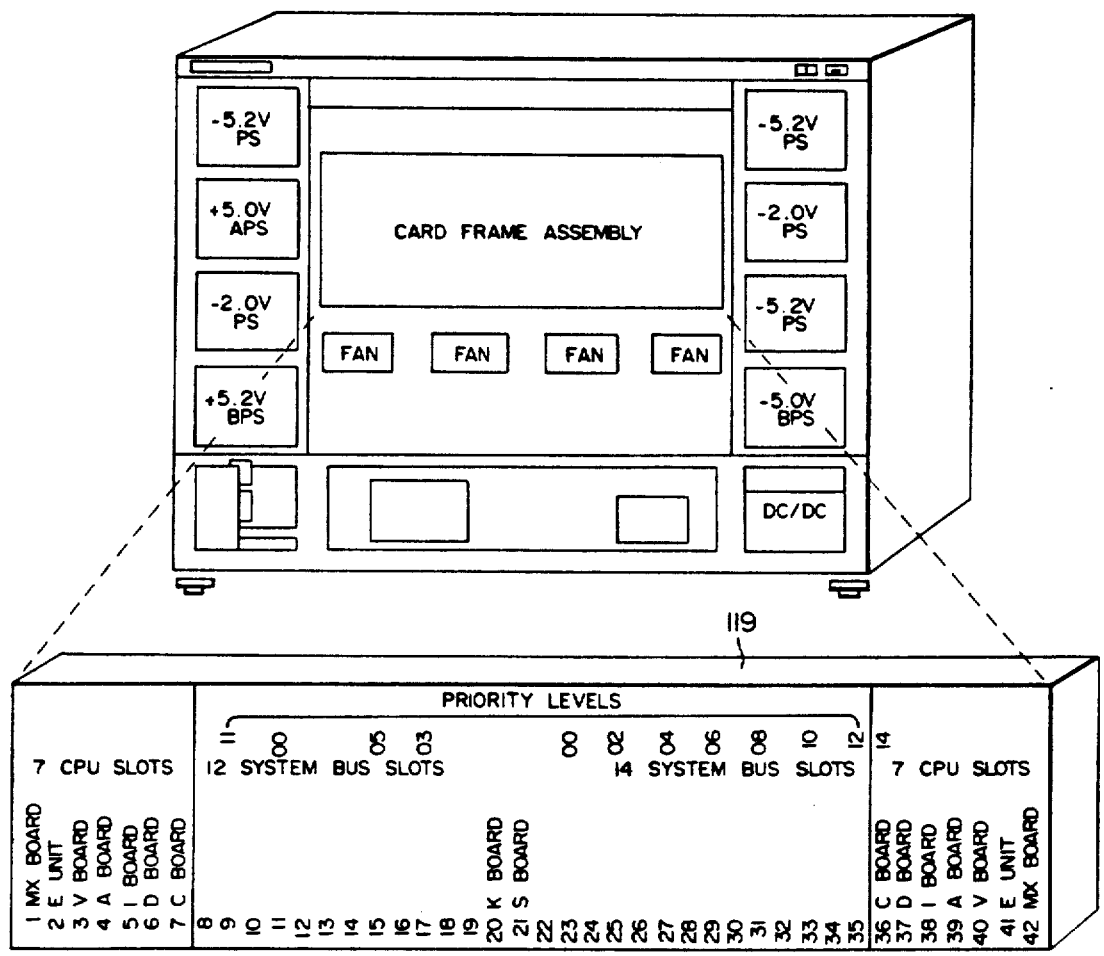
FIG. 6 is a broad plan view showing the location of the system bus structure of FIG. 6 in a rearward location of a mini-supercomputer housing or casing having a width of less than thirty inches and showing in block form a plurality of power connections for the system bus structure from the casing.

In addition to the pins associated with the bus lines 121 as previously discussed, the table further reflects various power pins necessary for providing power to the various circuit elements on a given system bus unit 215. FIG. 6 further shows a backplane in schematic form as integrating into a mini-supercomputer cabinet with corresponding power outlets from the cabinet to supply to the backplane pins as designated.

The system bus structure 101 also includes a plurality of groups of independent bus transmission request/select lines and utilized as a means of providing priority arbitration between the system bus units 215 seeking to perform bus transfer operations. Each group of transmission request/select lines, referenced in FIG. 4 and more particularly discussed hereinafter, is comprised of two request lines (BLREQAXXP, BLREQDXXP), one select line (KQSELXXP), and a ground line for each request/select line, and, connects the controller port 155 to a pre-selected primary port 161 or CPU cache port. Each of the primary ports 161 and each plurality of CPU ports 159 is connected to the controller port 155 by a dedicated set of transmission request/select lines. The request/select lines act as means for the various system bus units 215 to request a priority on sending a message over the system bus 141. The controller port 155 is the location from which the controller unit 251 can arbitrate the various requests and assign the various requesting system bus units 215 a priority or order in which they can access the system bus 141 during a given cycles. The request line is activated by the system bus unit 215 when a message is desired to be sent and the select line is activated by the controller unit when the requesting system bus unit 215 may send a message over the system bus 141. Each group of bus transmission request/select lines has a pre-selected priority number for purposes of determining priority of a given system bus unit 215 on the occasion of multiple requests for the main system bus 141 during one cycle. The preferred order of priority is to commence with the two highest priority numbers 00 and 01 at the closest locations to the control unit 251, and to give the next highest priorities numbers 02 and 03 outwardly until all system bus units 21 have a priority number. The least highest priority being given to the CPUs 201 and 211 which are positioned at the furthest locations from the controller port 155. Referring to FIG. 1B, the highest priority ports are ports 23,19, and 25, having priorities 00, 01, and 02, respectively. Those ports are typically utilized by Inter-System Bus Link units 221, 231 and 241, however, other system units such as memory modules may be connected to the high priority ports if three Inter-System Bus Link units are not needed. The least highest priority ports are the series of ports designated for the CPUs 201 and 211 having priorities 13 and 14, respectively.

The system bus structure 101 further includes a second plurality of groups of independent lines referred to as ISBL advance transfer notification control lines which are utilized as a means of providing advance notification to ISBLs of an impending transfer to them. Each group of ISBL advance transfer notification control lines is comprised of a pair of request bus lines (BLRQBUSAXXP,BLRQBUSBXXP) and a ground line for each request line, and, connects the controller port 155 to a pre-selected primary port 161 or series of CPU ports 159. Each of the primary ports 161 and each group of CPU ports 159 is connected to the controller port 155 by a dedicated group of ISBL advance transfer notification control lines. The purpose of the ISBL advance transfer notification control lines is to provide a means for the various system bus units 215 to specify a particular receiving system bus structure 101 simultaneously with a request for priority on sending a message over the main system bus.

The system bus structure 101 further includes a third series of sets of independent lines, referred to as ISBL advance lines, which are selectively activated upon decoding of the ISBL advance transfer notification signal and utilized as a means of delivering an advance notice signal to a particular ISBL of an impending transfer. Each set of ISBL advance lines is comprised of one line (KQLNKADVD[X]+) and a ground line, and, connects the controller port 155 to one of the three highest priority ports 23,19,25. Each of the ISBL ports 23, 19 and 25 is connected to the controller port 155 by a dedicated set of ISBL advance lines. The purpose of the ISBL advance lines is to provide a means for a particular ISBL unit to receive a signal from the control unit 251 advising the ISBL unit of the impending transfer in the following bus cycle simultaneously with the transmission of the select signal to the requesting source unit 215.

The system bus structure 101 further includes a fourth series of sets of independent lines, referred to as clock signal lines, which are utilized as a means with which to coordinate synchronous transfers across the system bus structure 101. Each set of clock signal lines is comprised of a pair of equal length clock lines (KC(XX)CLK1LP, KC(XX)CLK1TP), referred to as a latch clock signal line and a trigger clock signal line and respectively carrying the latch and the trigger clock signals 301 and 311, respectively, and, connects the controller port 155 to a pre-selected primary port 161 or series of CPU ports 159. Each of the primary ports 161 and each series of CPU ports 159 is connected to the controller port 155 by a particular set of clock signal lines. The purpose of the clock signal lines is to provide a means for synchronizing the various system bus units 215 to specify particular sending times, receiving times, and a length of time for transfers, as reflected in FIGS. 4 and 5 and more particularly discussed hereinafter.

The system bus structure 101 further includes another two designated sets of independent lines on the system bus 141, referred to as memory inhibit lines (BLMEMINHOP -7P) and ISBL inhibit lines (BLNKINHOP -3P). Particular memory inhibit line(s) may be designated for a particular memory unit 215 and may be activated by that memory unit 215 when it is not able to accept transfers, for instance, when its transfer storage space becomes full. The inhibit lines may be utilized as a means by which particular memory and ISBL units 215, respectively, may individually signal other bus units 215 when transfer storage space in their memory or ISBL units 215 becomes unavailable so that further transfers to them are prevented.

Referencing the transfer capabilities of the system bus structure 101, the parallel message formats include memory read transfers, memory write transfers, and control transfers including start-up, abort, system operation, and diagnostic control. In operation, the parallel message format permits a first message to be delivered along the bus lines 121 from a first system bus unit 215, referred to as a first source unit, to a second system bus unit 215, referred to as a first receiving unit; while concurrently, a second message is being delivered along the bus lines 121 from a third system bus unit 215, referred to as a second source unit, to a fourth system unit bus 215, referred to as a second receiving unit. In order to accommodate this parallel processing format, the sets of bus lines 121 may be pre-specified as to order and number for particular bus signal transfers and those signal transfers may be half bus or full bus transfers. Furthermore, all communications from one system bus unit 215 to another may be specifically defined by information contained within separate bit fields within the system bus structure 101, and, a bus transfer (32-, 64-, or 128-bit wide) may utilize one or more fields depending on the type of transfer.

Figure 4:
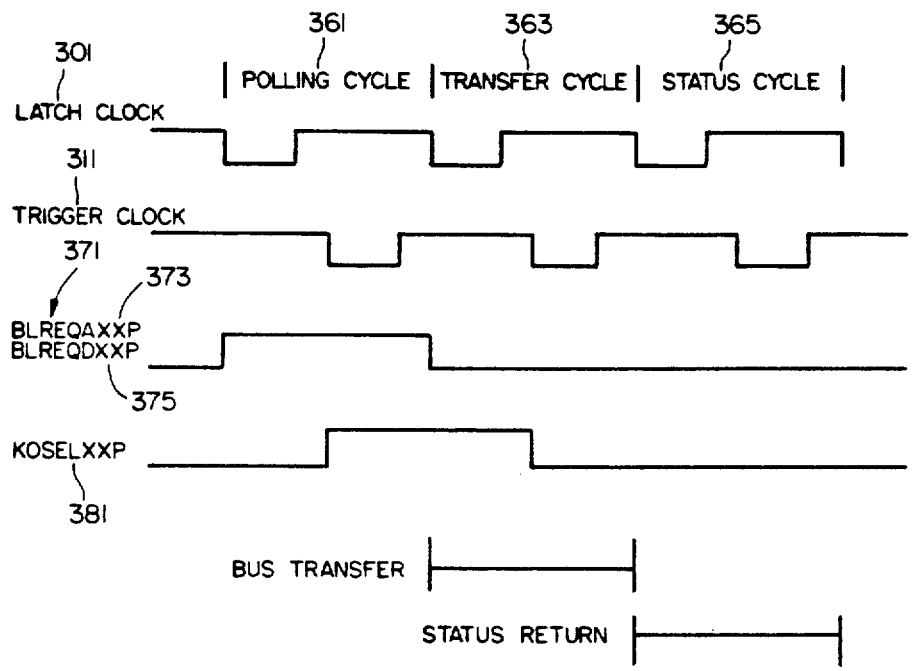
FIG. 4 is a timing diagram displaying a latch signal and a trigger clock signal, a plurality of related signals, and corresponding clock signal cycles over which bus transfer operations are distributed.
Figure 5:
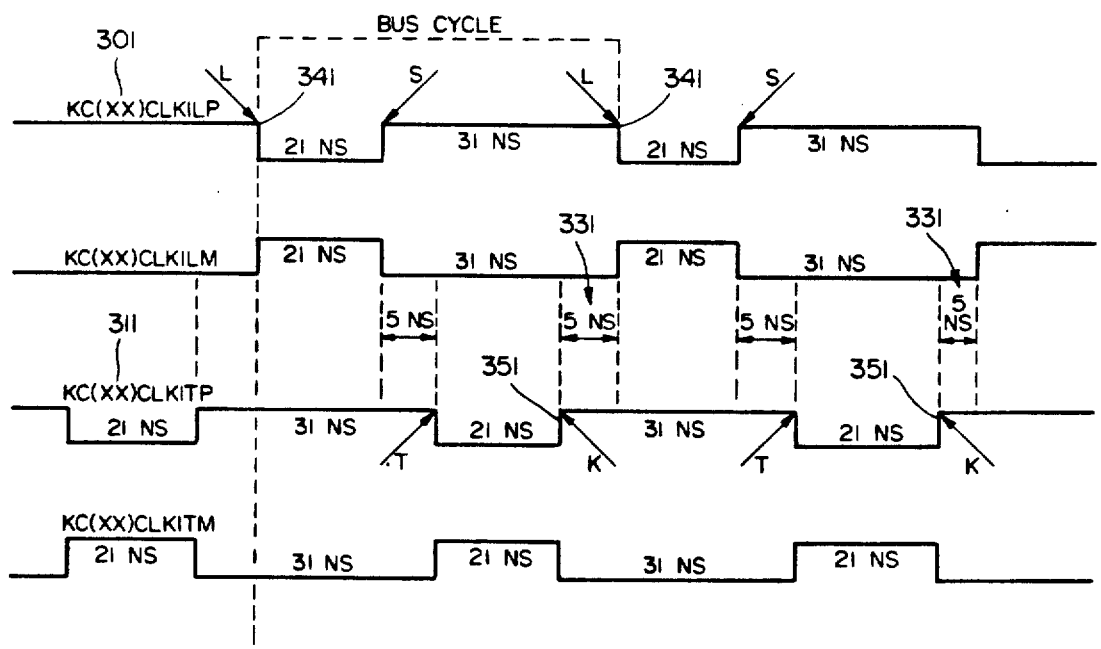
FIG. 5 is a more detailed timing diagram of the latch signals and trigger clock signals of FIG. 4.

Referring to FIGS. 1A, 1B and 2 and the system bus structure 101 is capable of supporting a continuous message rate of 19.23 million transfers per second by utilizing a timing means, such as a two phase clock system as previously referenced and disclosed in FIGS. 4 and 5. The two phase clock system can be used to synchronize bus message transmissions within 52 nanosecond periods, otherwise known as bus cycles and referred to by numeral 321. With the use of the clock signals 301 and 311, all signal transfers across the system bus structure 101 are synchronized as between each of the respective system bus units 215. These clock signals, as shown in FIGS. 4 and 5, are generated by a master clock in the control unit 251. FIGS. 4 and 5 show the complementary latch and trigger clock signals. The latch clock signals are referenced in FIG. 5 by the designations KC(XX)CLK1LP and KC(XX)CLK1LM, respectively; and the trigger clock signals are referenced by the designations KC(XX)CLK1TP and KC(XX)CLK1TM, which are in a fixed phase relation to the latch clock signals. The leading or latch open edge of the latch clock signal is designated by the letter 'L' as shown in FIG. 5; and, the period between two leading edges of the latch clock signal defines a single bus cycle.

Under the particular clock system shown in FIGS. 4 and 5, bus signal transfers are permitted a maximum propagation time of 47 nanoseconds. A 5 nanosecond difference 331 is maintained between the period of a bus cycle 321 and that of a signal transfer in order to provide an allowance for clock skew within the various system bus units 215. The general timing requirements for a bus transfer require that the bus transfer be enabled (or sendable) for the 52 nanosecond period between two consecutive latch open edges of the latch clock signal, otherwise known as one bus cycle, where the latch open edge is designated by the letter 'L' in FIG. 5 and referred to by numeral 341. Transmissions are to be captured by the receiving unit 215 at a trigger close edge of the trigger clock signal, designated by the letter 'K' in FIG. 5 and referred to by numeral 351.

Generally, a source system bus 215 unit transfers information onto the system bus structure 101 at a latch open edge 341 during a given bus cycle. All receiving system bus units 215 receive the bus transfer signals from the system bus structure 101 during the time interval prior to the next trigger close edge 351. This timing relationship is employed for all bused signals on the printed wiring section of the backplane 119, including control signals which may be active for more than one bus cycle or independent of message transfers over the main system bus 141.

Figure 7:
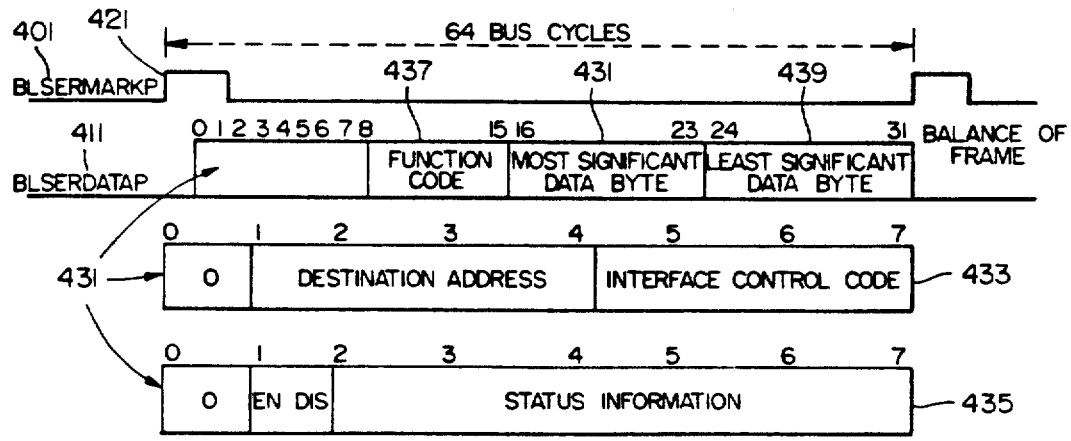
FIG. 7 is a representation of a plurality of serial bus signals including a plurality of fields into which the plurality of serial bus signals are organized for a serial bus transfer.

Under the clock system shown in FIGS. 5 and 7, serial bus transfers are synchronized over the serial bus 147 by utilizing one of the independent lines (BLSERMARKP), referred to as a serial marker line 401, for carrying a marker or timing signal which is asserted once in every sixty-four bus cycles. The marker signal includes a serial marker open edge 421. Upon transmission of the marker signal over the serial marker line 401, a 32-bit serial transfer is enabled over another serial line 411 (BLSERDATAP). The serial line 411 provides a means by which a single bit of serial information may be transferred at any one time. Each bit of the 32-bit transfer commences during the next 32 consecutive latch open edges 341 following the serial marker open edge 421 on the serial marker line 401.

As more particularly reflected in FIG. 7, it can be seen that the serial bit transfers over the serial line 411 are organized into control and data fields which are separately interpretable for soft loading system bus units 215 as with control store information (firmware) and control or parameter settings. The first field includes bits 0-7, generally designated by numeral 431, and is interpretable depending upon the system bus unit 215 from which the serial transfer is being made. In the event that the transfer is from the control unit 251, the first field 431 is interpretable in the form as referred to by numeral 433; whereas in the event that the serial transfer originates from another system bus unit 215, the first field is interpretable in the form as referred to by numeral 435. However, a serial transfer from another system bus unit 215 only occurs in response to the control unit 251. The balance of the fields of serial data include a function code field 437 in bits 8-15, a most significant data byte 438 in bits 16-23, and, a least significant data byte 439 over bits 24-31.

Transfers on the bus lines 121 are interpretable in a particular order from a particular set of independent lines and are referred to as message strings. The set of bus lines 121 are pre-specified as to order and number for particular message string transfers. The system bus structure 101 transfers all the information as a doubleword in parallel. FIG. 2 illustrates the word format for data transfers. In the doublewords shown in FIG. 8, bits are numbered from left to right as 0-63 and 0-63; and bytes are numbered 0-3, 0-3, 0-3, and 0-3 reflecting the two words comprising a standard data transfer and the four words comprising an expanded data transfer. The least significant bit of the standard data transfer being located at the first bit 63 reading from the left and least significant bit of the expanded data transfer being located at the second bit 63 reading from the left.

Referring particularly to FIG. 4, three bus cycles are shown in conjunction with the latch clock 301 as relating to system bus transfers. These three bus cycles include a polling cycle, a transfer cycle, and a status cycle, and, delineate separate stages of processing utilized for transmitting and confirming transmission of system bus transfers over the system bus structure 101.

The polling cycle 361 commences when a first system bus unit 215, referred to as a source or requesting unit, having determined the need to send a message over the system bus 141, asserts a request signal 371, over the signal lines BLREQAXXP and BLREQDXXP at a first latch open edge 341 to the controller port 155. The request signal 371 is interpreted as a request for access to the system bus 141, where all system bus transfers are coordinated by a control unit 251. The request signal 371 remains high until the end of the polling cycle during which time the request signal is received by the control unit 251. After receiving the request signal 371, the control unit 251 asserts a select signal 381, over the signal lines KQSELXXP at the trigger close edge 351. The select signal 381 is received by the requesting or source unit 215 and is interpreted by the requesting unit 215 as an enablement to send the desired message over the system bus 141. The select signal 381 remains or asserted high until the next trigger close edge 351 during which time the select signal 381 is received only by the requesting unit 215. The polling cycle 361 ends with the select signal high.

The transfer cycle 363 commences with the next latch open edge 341 following the receipt of the select signal 381 by the source or requesting bus unit 215. After receiving the select signal 381, the requesting unit 215 sends the desired message over the system bus 141 at the next latch open edge 341 to a second bus or receiving unit 215. The receiving unit 215 receives the message over the system bus 141 on or before the next following trigger close edge 351. The transfer cycle 363 ends with the following latch open edge.

The status cycle commences with the next latch open edge 341 following the receipt of the message over the system bus 141 by the receiving unit 215. After receiving the message over the system bus 141, the receiving unit transmits a status signal, over a status line BLSTATUSOP confirming receipt of the messages. The status signal is sent to the snapshot port during the next latch open edge 341 and the status signal is received prior to the trigger close edge. Additionally, the results of parity error testing as determined by a snapshot board 261, if any, may be sent to the source unit 215 over parity error lines during the next latch open edge 341 and the parity error signals are received prior to the trigger close edge 351. The status cycle ends with the following latch open edge 341 to complete all of the stages associated with the message communication. The particulars of timing and order of the aforenamed cycles are discussed more fully hereinafter.

Generally speaking, there are three types of transfers which may be supported in parallel on the system bus structure 101. The system bus structure 101 may support a memory read, a memory write, and a control transfer. Memory read transfers may be issued as requests to the computer architecture's memory system, such as to a memory bus unit 215, to access data and return it to the requesting unit, which is the source unit for the memory read transfer. Memory write transfers may be issued as requests that the memory bus unit 215 replace or modify the data at a specified physical address within the memory utilizing new data presented with the memory write transfer. Some memory write transfers may also return data at the specified address to the source unit, prior to data modification or replacement. Control transfers include all other types of transfers, the principal groups of which are system control, ISBL read status, ISBL write status, and data return transfers.

Referring more particularly to control transfers, the system control transfers include miscellaneous transfers, while the ISBL read and write status transfers are primarily used for error messages for errors in a multiple system bus structure 101. The data return transfer is used by the memory system 215 to transmit data to a bus unit 215 in response to a memory read transfer or memory write transfer.

In order to facilitate the parallel processing of the aforenamed types of transfers, the bus lines 121, exclusive of the intraport busses 149, as previously stated are organized into particular fields, also referred to as busses, which are listed in the following table with respect to the principal types of transfers:

|  | Memory Address | Data Bus | Memory Transfer | Operation Code | Source Address | Destination Address |
|---|---|---|---|---|---|---|
| Memory Read Transfer | X |  | X |  | X |  |
| Memory Write Transfer | X | X | X |  | X |  |
| Control Transfer |  |  |  |  |  |  |
| Interrupt Request |  | X |  | X | X | X |
| ISBL Status |  |  |  | X | X | X |
| Data Return |  | X |  | X |  | X |

Figure 8:
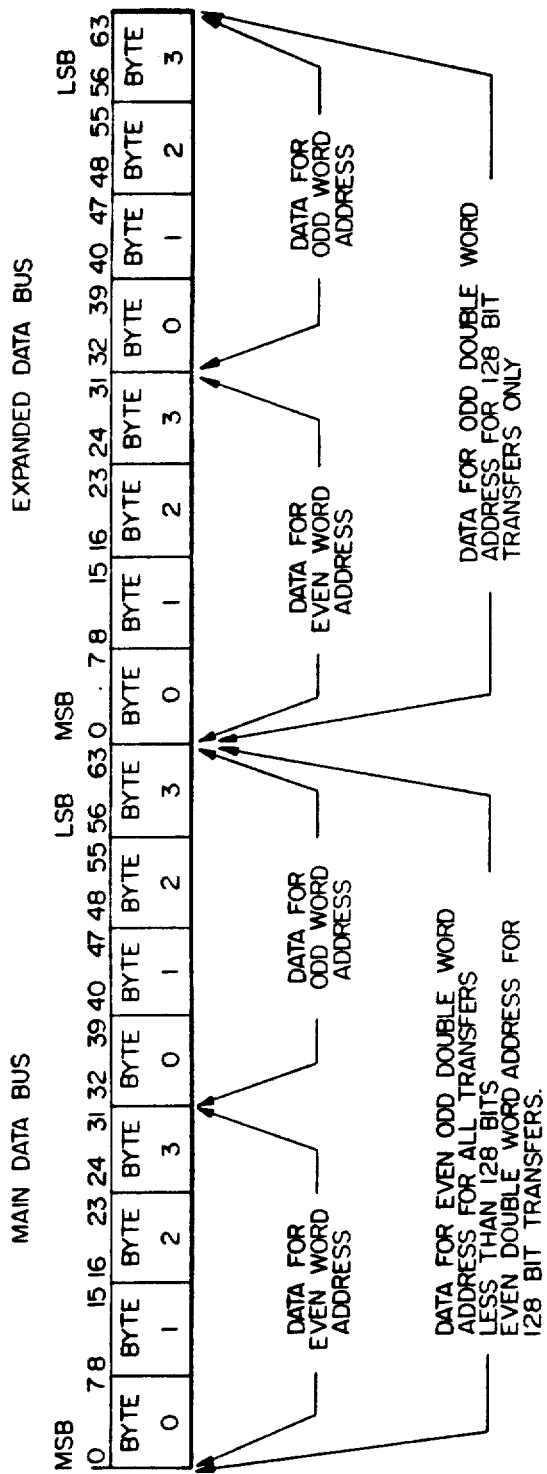
FIG. 8 is a representation of the main and expanded data bus transfer fields including the addressable fields.
Figure 9:
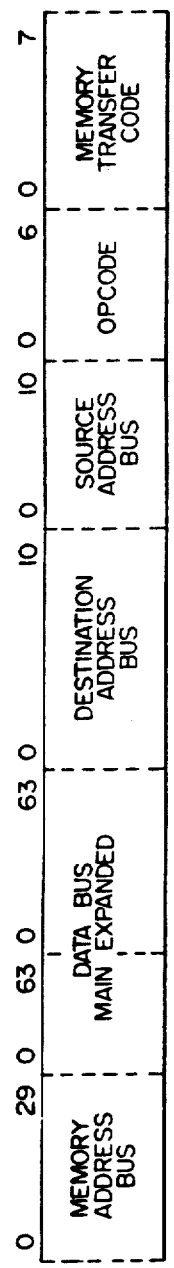
FIG. 9 is a representation of the various bus fields for bus transfers on the system bus structure.

As can be seen above and as reflected in FIGS. 8 and 9, the bus lines 121 are organized into six principal fields including a memory address field, a main data field, an expanded data field, a destination address field, an opcode field, and a memory code field. The memory address field is comprised of thirty independent lines which define a field of thirty bits. A data field is comprised of two sets of sixty-four independent lines from the fields of the main and expanded data busses 143 and 145, respectively, to create a sixty-four bit main data field and a sixty-four bit expanded data field. The destination address field is comprised of eleven independent lines to define a destination address field of eleven bits. The opcode field is comprised of seven independent lines to create a field of seven bits. The memory transfer code field may be comprised of eight independent lines to create a field of eight bits.

The memory address bus may be used by a source unit 215 to communicate with a specific addressable location in a memory unit 215 during memory read and memory write transfers. The two leading bits of the memory address field may be used as a physical address code (e.g. 00,01,10,11) to select which of four possible interconnected system bus structures 101 whose associated memory unit(s) 215 are to be accessed. The balance of the memory address bits permit one gigabyte of memory to be accessed from each system bus structure 101.

The data bus provides the main transmission path for data to be passed to and from the memory units and other bus units 215 during data return transfers, memory write transfers, and interrupt request transfers. Data transfers are a minimum of sixty-four bit (doubleword) lengths, and may be one hundred and twenty-eight bit (quadword) lengths. The system bus structure 101 provides sufficient versatility to specify data transfers by byte, halfword, doubleword, and quadword lengths. In addition, transfers of less than doubleword length may be pre-positioned within the data field by source units 215. The specific locations and lengths are shown in FIG. 8.

The memory transfer code bus may be used by a source unit 215 to specify the read or write nature of a particular bus transfer to the receiving memory unit 215, during memory read and memory write transfers. The two leading bits of the memory transfer code field specify the operation and the balance of the field may be used as modifiers.

The operation code or opcode bus identifies all types of bus transfer except memory read and memory write transfers. The three leading bits of the operation code field specify the particular class of transfer and the balance of the field may be used as modifiers. There are four classes of transfers which may be defined by the operation code field, including system control, ISBL write status, ISBL read status, and memory data return transfers. The system control transfers may include targeted and global interrupt requests allowing bus unit 215 to issue interrupt requests to the CPUs 201 and 211.

The source address bus may be used by a source unit 215 to communicate with memory or ISBL units 215 during memory read, memory write, interrupt request, and ISBL status transfers. In the case of a memory write transfer, the source unit address supplied on the source address bus may be used by the receiving memory unit 215 as the destination address passed on the destination address bus on the corresponding data return transfer. Bits 0–5 of the source address field contain the physical address of a source unit 215 and bits 6–10 are a tag for a particular memory read operation in order that the corresponding subsequent data return in response to the memory read command may be appropriately tagged and sorted by the data receiving unit 215.

The destination address bus may be used by a source unit 215 to carry the physical address of the receiving, or target, unit 215.

By utilizing a bus organized as described above, certain transfers can use mutually exclusive lines. For instance, a memory read transfer requires half of the bus fields: the memory address field, memory transfer code field, and the source address field. A data return transfer requires the other half of the bus fields: the data bus field, the operation code field, and the destination address field. Furthermore, with the use of the two bus request lines 371, the needed fields for a particular bus transfer may be specified according to the code sent on the dual request lines.

In the event that a first bus unit 215, such as a CPU or UIOM, seeks to obtain the bus lines 121 in order to make a memory read transfer, the first requesting unit 215 may send a high signal on the request line BLREQAXXP, also referred to as the request address line 373, and a low signal on the request line BLREQDXXP, also referred to as the request data line 375. This first coded request signal may be used to specify that the half of the bus lines 121 designated for the memory address field, the memory transfer code field, and the source address field are needed for this transfer, but not the data bus field, the operation code field, and the destination address field. On the other hand, in the event that a second bus unit 215, such as the System Integrated Memory, requests access to the bus lines 121 in order to make a data return transfer, the second requesting unit 215 may send a high signal on the request data line 375 and a low signal on the request address line. The second coded request signal, converse to the first, specifies that the bus lines 121 designated for the data bus, operation code and destination address fields are needed for this transfer, but not the memory address, memory transfer code, and source address fields. The result being that if two bus units 215 simultaneously make the above requests, they can both be granted access to send their respective bus transfers on the same bus cycle and thereby complete a bus transfer faster than if they were required to send their messages in two separate cycles.

Prior to sending a request signal, a requesting unit 215 tests the inhibit lines to determine whether a proposed receiving unit 215, otherwise known as a target unit, is capable of accepting the bus transfer. In the event that the inhibit lines indicate that the proposed receiving unit 215 is unable to accept the bus transfer, then no request signal will be made by the requesting unit 215. Several types transfers are always accepted by the receiving unit 215, they include memory data returns, ISBL write status transfers, and ISBL read status transfers, and the first bus request from a CPU for a block of transfers. In the event that a memory read or write transfer is directed to a local memory unit then the memory inhibit lines are tested by the sending unit 215, otherwise, the ISBL inhibit lines are tested by the sending unit 215.

It may be recalled that the system bus structure 101 supports the use of parity checks for message transfers over the bus lines 121. The parity of the data in the memory address field, the memory data field and the expanded data bus field are examined. A parity bit is associated with each byte. Any parity error conditions are monitored by the snapshot unit 261. When a transfer is made during the transfer cycle, the snapshot unit 261 monitors and then tests the transfer for any parity error conditions. During the status cycle, the snapshot unit 261 issues a parity error signal over the parity error lines in the event that any parity error conditions exist in the transfer of the prior bus cycle. The snapshot unit 261 checks the memory address field for memory read or memory write transfers and checks the data bus fields for memory write and data return transfers. In the event that a local address parity error is detected, the snapshot unit 261 issues a signal over a parity error line, referred to as BLAPEP and in the event that a data parity error is detected the snapshot unit 261 issues a signal over a parity error line, referred to as BLDPEP. The parity error lines are also monitored by the source and receiving units 215 for a particular transfer and may be used as a means for the source and receiving units 215 to take appropriate action. For instance, the source unit 215 may signal an error condition by setting an error flag, which may be relayed to the CPU, if the source unit 215 is other than the CPU, and relay the error condition to an operator. On the other hand, where a memory unit 215 monitors an error condition on a particular transfer, the transfer may be aborted. Where an error condition exists on a memory write transfer, the transfer is aborted leaving the memory contents unmodified. Where an error condition exists on a memory read transfer, the transfer is aborted so no data return transfer occurs. Finally, where a source unit 215 initiates a transfer of less than doubleword size, the source unit 215 must properly position bits to insure odd parity.

Figure 10:
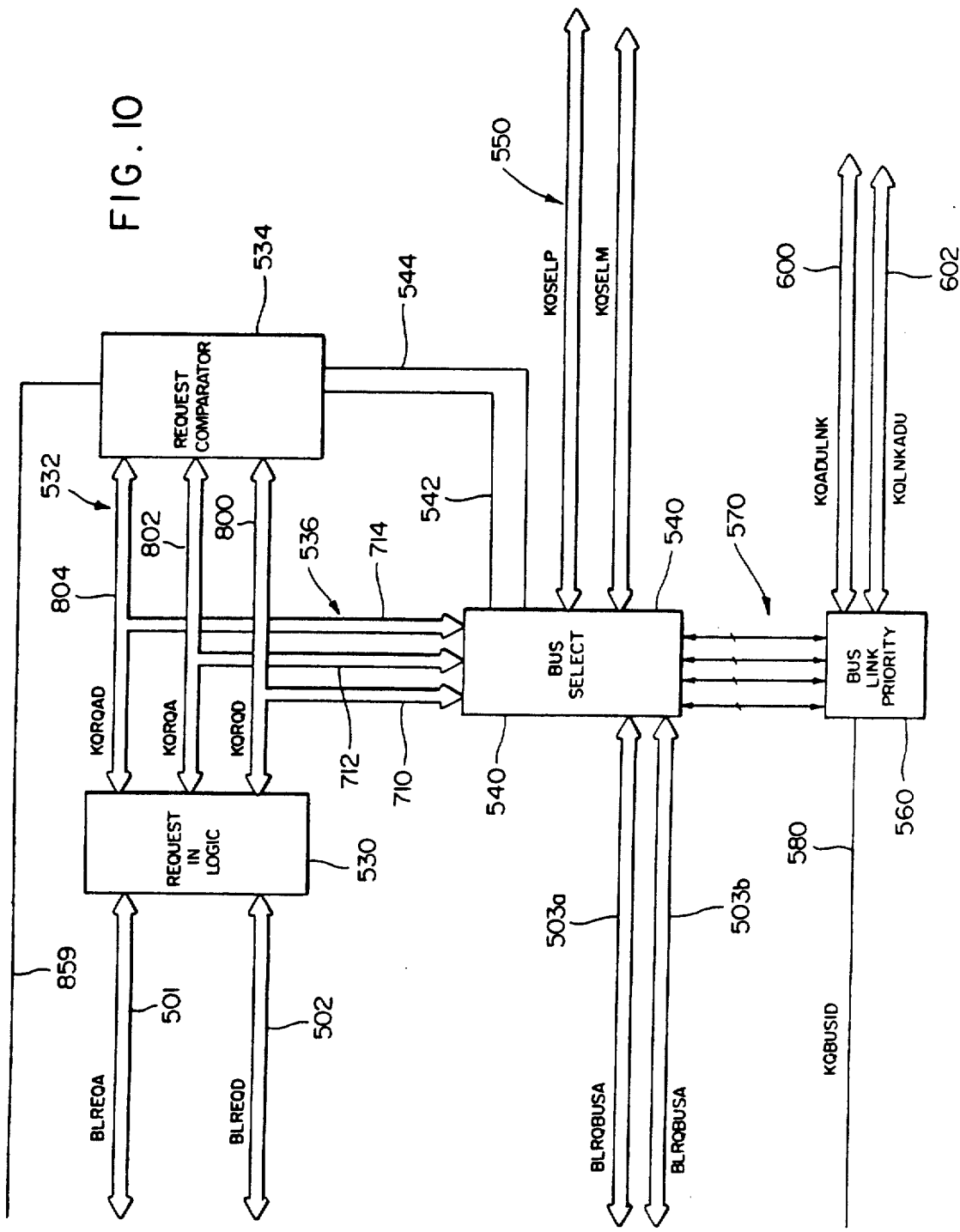
FIG. 10 is a block diagram of the logic of the bus arbiter on the bus control board shown in FIG. 1B.

In order to gain access to the system bus, in other words, to be able to perform a bus transfer while preventing other units from simultaneously making bus transfers, it is necessary to provide bus arbitration or bus request/select features. In the instant embodiment as may best be seen in FIG. 10, the K-board includes the bus arbiter 251. The bus arbiter 251 includes bus request and select circuitry. As was stated above, each of the system units which is coupled to the system bus is connected by individual dedicated bus select and request lines to the bus arbiter 251. These are a BLREQA bus 501, a BLREQD bus 502. In addition a BLRQBUSA bus 503a and a BLRQBUSB bus 503b are used to select the target lines to receive a transfer and carry the two bit address code identifying the target bus.

For instance, a system unit such as the cache memory is connected to the bus arbiter 251 by a BLREQA13P line 502 and a BLREQD13P line 504. The cache memory output is also connected to the bus request/select circuitry of the bus arbiter 251 by a BLRQBUSA13P line 508 and a BLRQBUSB13P line 510.

In the present embodiment the BLREQA13P line 502 and the BLREQD13P 504 line carry a two-bit signal to the bus arbiter 251 which is indicative of whether the requesting system unit is requesting system bus access to perform a full bus transfer or a half bus transfer, such as a memory read transfer or a data return transfer. When a full bus transfer is requested by the cache memory, the BLREQA13P line 502 and the BLREQD13P 504 line are both driven high, indicating to the bus arbiter 251 that the cache memory is requesting a full bus transfer. In a similar fashion, if the cache memory requests allocation of bus cycles in order to perform a memory read transfer from the main memory unit, the BLREQA13P line 502 would be driven high, the BLREQD13P 504 line would be driven low, thereby indicating that only the half bus needed to perform a memory read transfer, that is, the memory address bus, the source address bus and the memory transfer bus was being requested. If at the same time, the main memory was attempting to perform a data return to the cache unit or to some other system unit, such as the UIOM, the main memory could energize its BLREQD01P line 520 to drive it high while holding its BLREQA01P line 522 low. Assuming that no higher priority units were requesting the bus, the bus arbiter 251 would then send select signals to the cache memory authorizing it to initiate its bus transfer on the memory address bus, the source address bus and the memory transfer bus while at the same time, the data bus main fields and the opcode address bus would be energized by the main memory to perform a simultaneous data return. Thus, providing a duplex functioning of the system bus by allowing memory read transfers and data returns to take place on the same bus cycle.

The logic which is needed to perform the bus request/select functions as stated above is incorporated in the bus arbiter 251 of the bus arbiter 251. The bus arbiter 251 includes a request-in logic module 530 which is connected by a bus 532 to a request comparator 534. A request bus 536 is a portion of the bus 532 and is connected to a bus selection logic module 540. The request comparator 534 is also connected to the bus selection logic module 540 by a pair of enable lines, respectively numbered 542 and 544. The request-in logic module 530 receives all of the BLREQA(XX)P and BLREQD(XX)P signals fed by the dedicated lines from the various system units. The bus select logic 540 is connected to all the BLRQBUSA(XX)P lines and the BLRQBUSB(XX)P lines which make up the BLRQBUSA bus 503a and the BLRQBUSB bus 503b, respectively, from all of the system units. Those lines carry the two-bit codes from each of the system units which are indicative of whether the bus transfer is to be received by a system unit connected to the system bus from which the transfer is initiated, also known as the local bus, or to a system unit connected to another system bus, which would require that the target bus would have to be reached through an intersystem bus link. A selection bus 550 includes multiple pairs of selection lines which are connected between each of the system units on the local bus and the bus request/select logic. These lines carry signals which select or authorize the system units to proceed with a requested transfer.

A bus link priority unit 560 is connected to the bus select unit 540 by a request bus 570. The bus link priority unit 560 also receives a local bus identification signal on an identification bus 580. The bus link priority logic 560 produces a KQADVLNK(X)P output signal on a KQADVLNK(X)P line 600 which is connected to each of the intersystem bus links connected to the local system bus. The bus link priority logic 560 also has three KQLNKADV(X)P lines 602 connected to it which are likewise respectively connected to the intersystem bus links connected to the system bus for effecting bus transfers between the local bus and remote system buses in a tightly connected network.

Figure 11A:
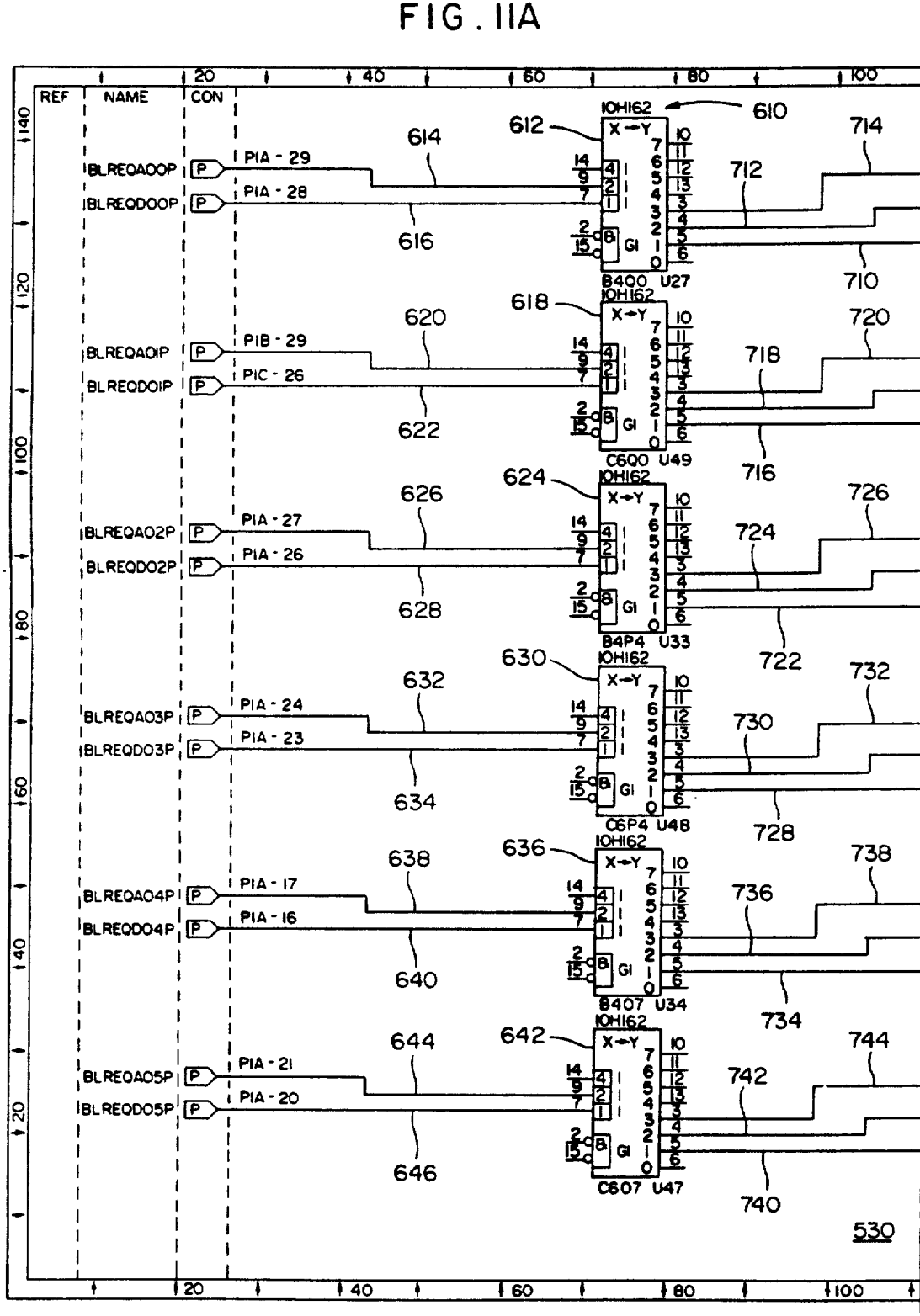
Figure 11B:
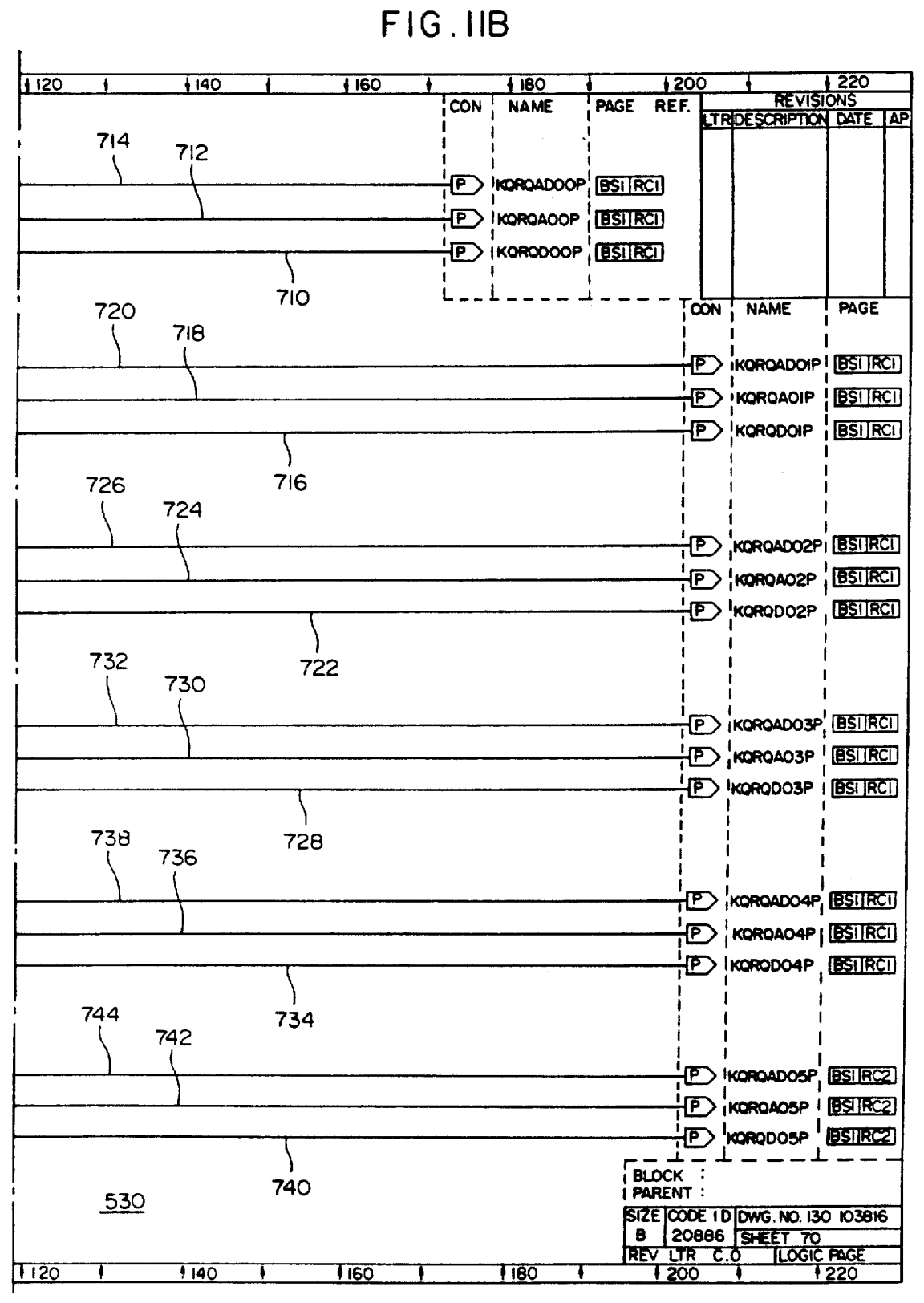

As may best be seen in FIG. 11, the request-in logic 530 includes a plurality of Motorola 10H162 ECL binary to 1 of 8 decoders 610 connected in parallel to selective leads of the BLREQA, BLREQ and BLREQD buses. The plurality of binary to 1 of 8 decoders 610 includes a first decoder 612 connected to the BLREQA00P and BLREQD00P 614 and 616 leads. A 10H162 binary to 1 of 8 decoder 618 is connected to a BLREQA01P lead 620 and BLREQD01P lead 622. A binary 1 of 8 decoder 624 is connected to a BLREQA02P lead 626 and a BLREQD02P lead 628. A 10H162 binary to 1 of 8 decoder 630 is connected to a BLREQA03P lead 632 and a BLREQD03P lead 634. A 10H162 binary to 1 of 8 decoder 636 is connected to a BLREQA04P lead 638 and a BLREQD04P lead 640. A binary to 1 of 8 decoder 642 is connected to BLREQA05P lead 644 and a BLREQD05P 646.

Figure 12A:
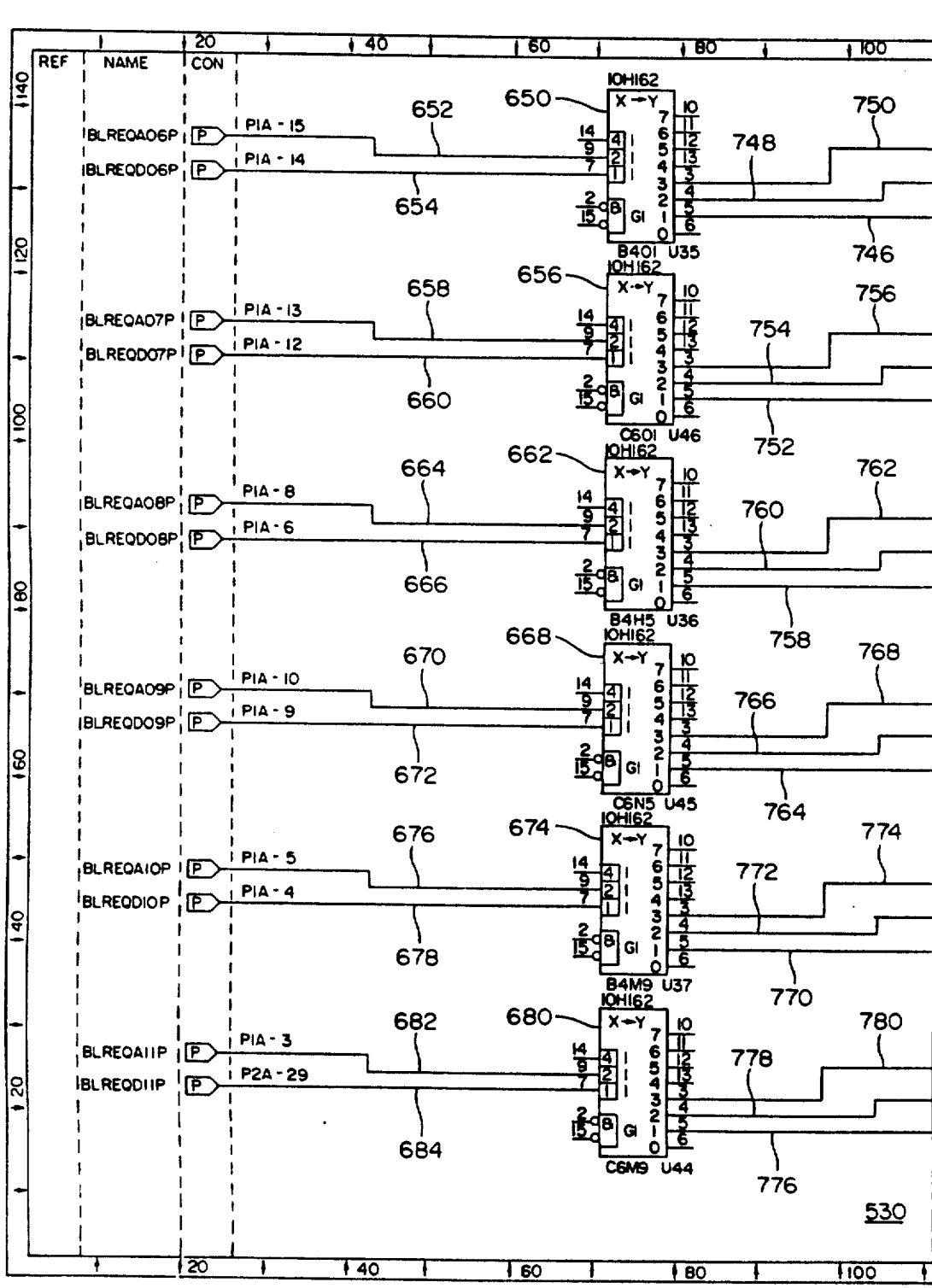
Figure 12B:
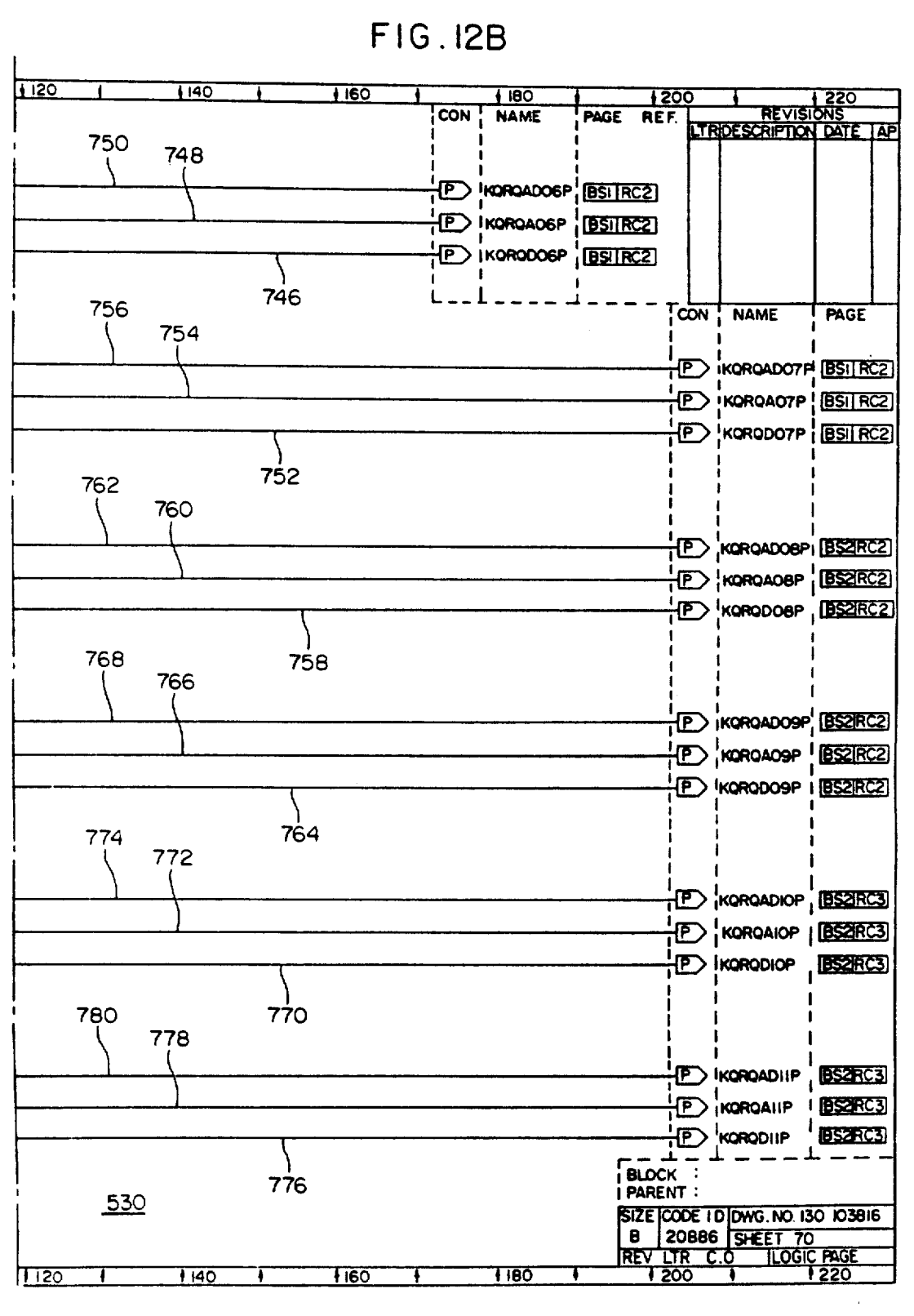

As may best be seen in FIG. 12, a 10H162 binary to 1 of 8 decoder 650 is connected to a BLREQA06P lead 652 and a BLREQD06P lead 654. A 10H162 binary to 1 of 8 decoder 656 is connected to a BLREQA07P lead 658 and a BLREQD07P lead 660. A 10H162 binary to 1 of 8 decoder 662 is connected to a BLREQA08P lead 664 and a BLREQD08P lead 666. A 10H162 binary to 1 of 8 decoder 668 is connected to a BLREQA09P lead 670 and a BLREQD09P lead 672. A 10H162 binary to 1 of 8 decoder 674 is connected to a BLREQA10P lead 676 and a BLREQD10P lead 678. A 10H162 binary to 1 of 8 decoder 680 is connected to a BLREQA11P lead 682 and a BLREQD11P lead 684.

Figure 13A:
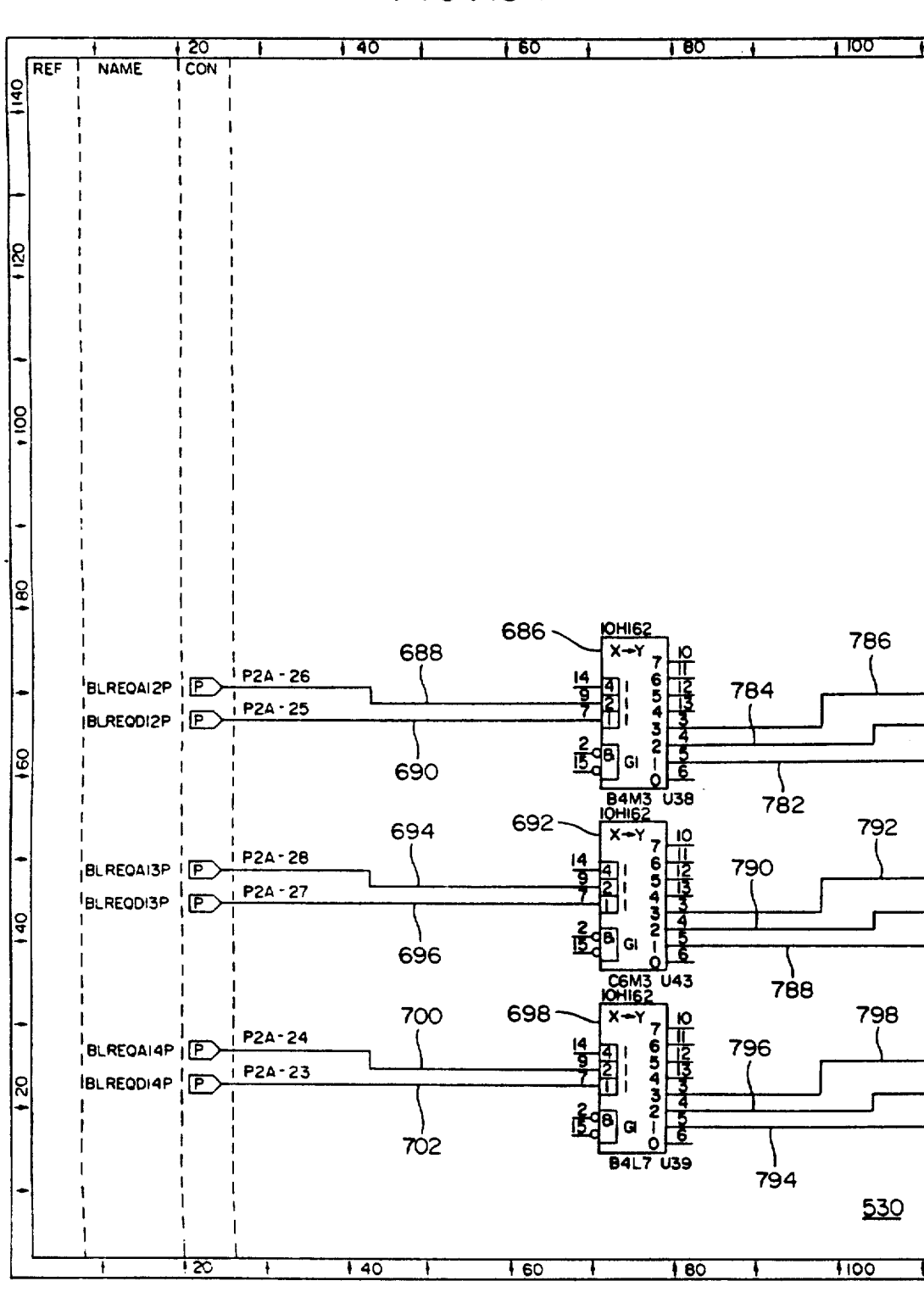
Figure 13B:
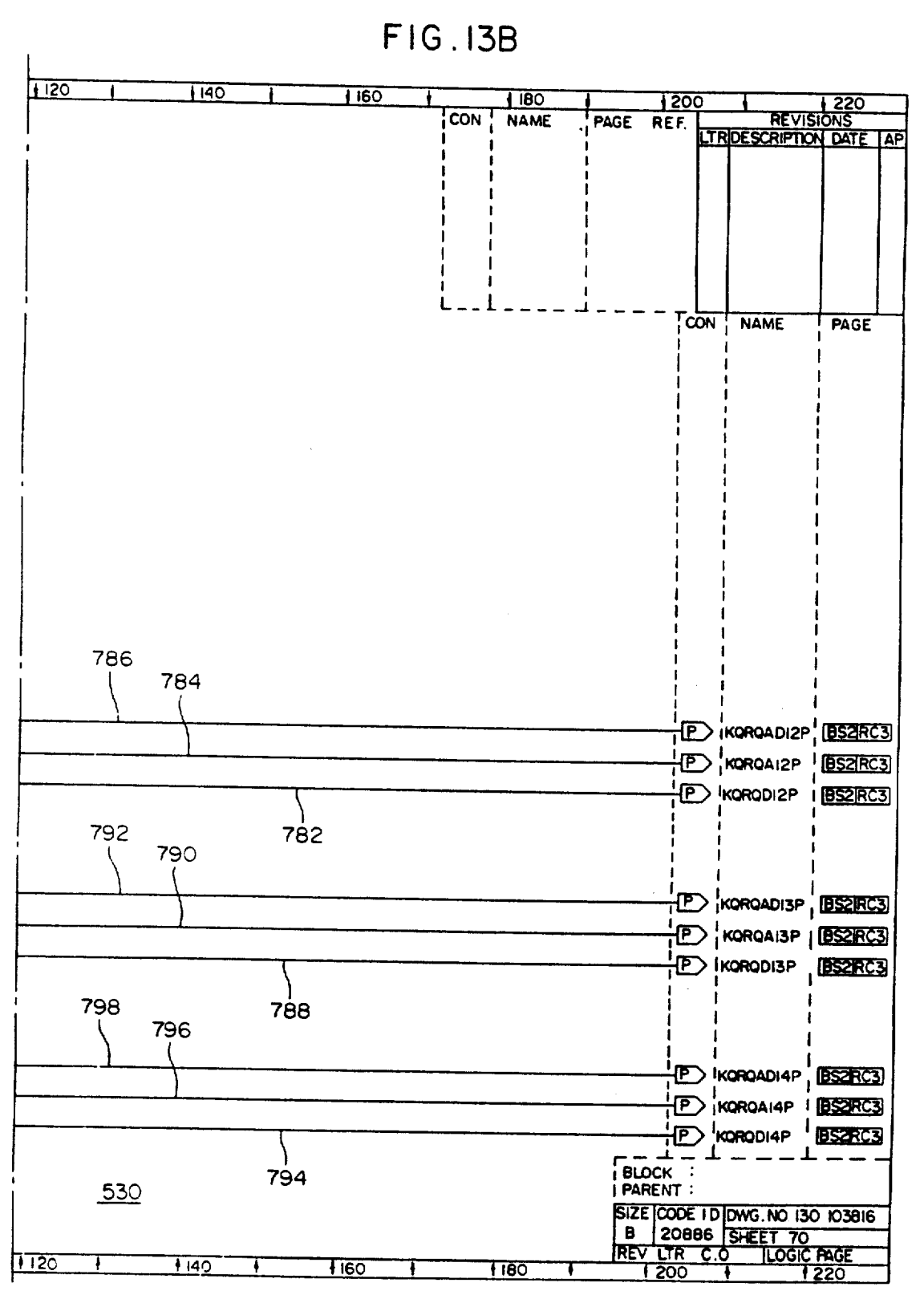

As may best be seen in FIG. 13, a 10H162 binary to 1 of 8 decoder 686 is connected to a BLREQA12P lead 688 and a BLREQD12P lead 690. A 10H162 binary to 1 of 8 decoder 692 is connected to a BLREQA13P lead 694 and BLREQD13P lead 696. A 10H162 binary to 1 of 8 decoder 698 is connected to a BLREQA14P lead 700 and a BLREQD14P lead 702. Thus, each of the 10H162 binary to 1 of 8 decoders of the plurality 610 is connected to a pair of A and D leads from the BLREQA bus 501 and the BLREQD bus 502 ranging from priority 00 to priority 14. Each of the input leads is connected to the binary coded input terminals with the A leads being connected to the binary 2 terminals and the D leads being connected to the binary 1 terminals.

Similarly, each of the 10H162 binary to 1 of 8 decoders in the plurality 610 has three of its output pins indicating the receipt of, a digital one a digital two or a digital three connected respectively to a KQRQD(XX)P bus, a KQRQA(XX)P bus and a KQRQAD(XX)P bus in order to indicate whether the device request lines are connected to one of the decoders which is requesting bus access at all and whether the system unit is requesting a half bus for a data return, a half bus for a memory read request or a full bus for some other type of bus transfer.

Each of the 10H162 binary to 1 of 8 decoders operates identically. Taking binary to 1 of 8 decoder 612 as exemplary, it is connected to the system unit on the system bus having the highest priority, typically, an intersystem bus link. If an intersystem bus link is not connected to it, it may be a device such as a main memory. In any event, if that system unit requests only one-half of the bus to perform a data return, it energizes the line 616 driving it high, it leaves the line 614 in a low state which causes a line 710 connected to the one pin of the decoder 612 to be driven high, indicating that the selected system unit having the highest priority is only requesting one-half of the bus. When the system unit issues a request for the other portion of the system bus needed to perform a memory read transfer, the line 614 would be driven high, the line 616 would be driven low and a line 712 connected to the binary output two pin of the decoder 612 would be driven high, indicating that the highest priority system unit is requesting access to the other half of the bus.

When the highest priority device requests access to both halves of the system bus, both lines 614 and 616 would be driven high, causing a line 714 connected to the decoded three pin of the decoder 612 to be driven high. The line 710 is a KQRQD00P line, the line 712 is a KQRQA00P line and the line 714 is a KQRQAD00P line.

In a similar fashion, the binary to 1 of 8 decoder 618 has its decoded one output connected to a KQRQD01P line 716, its decoded two output is connected to a KQRQA01P line 718 and its decoded three output is connected to a KQRQAD01P line 720. The binary to 1 of 8 decoder 624 has its decoded one line connected to a KQRQD02P line 722, its decoded two pin is connected to a KQRQA02P line 724 and its decoded three pin is connected to a KQRQAD02P line 726. The binary to 1 of 8 decoder 630 connected to the device priority slot number three on the bus has its decoded one output connected to KQRQD03P lead 728, its decoded two output is connected to a KQRQA03P lead 730 and its decoded three output is connected to a KQRQAD03P lead 732.

The binary to 1 of 8 decoder 636 connected to the system bus priority slot 04 has a decoded one output pin connected to a KQRQD04P line 734. Its decoder two output pin is connected to a KQRQA04P line 736. The decoded three output pin is connected to a KQRQAD04P line 738.

The binary to 1 of 8 decoder 642 which is connected to priority slot 05 of the system bus has its decoded one output pin connected to a KQRQD05P lead 740, its decoded two output pin is connected to a KQRQA05P output lead 742 and its decoded three output pin is connected to a KQRQAD05P lead 744.

The binary to 1 of 8 decoder 650 which is connected to the system bus priority port 06 as its decoded one output terminal connected to a line KQRQD06P 746, its binary decoded two output pin connected to a KQRQA06P line 748, and its binary three decoded output pin connected to a KQRQAD06P line 750.

The binary to 1 of 8 decoder 656 which is connected to port 07 of the system bus has its decoded one output pin connected to KQRQD07P lead 752, a binary decoded two output pin is connected to a KQRQA07P lead 754. The binary decoded three output pin is connected to a KQRQAD07P lead 756.

The binary to 1 of 8 decoder 662 which is connected to the system bus port having priority 08 has a decoded one output pin connected to a KQRQD08P line 758, its binary decoded two output pin is connected to a KQRQA08P line 760. Its binary decoded three output pin is connected to a KQRQAD08P line 762.

The binary to 1 of 8 decoder 668 which is connected to the system bus port having priority 09 has a decoded one output pin connected to a KQRQD09P line 764, its binary decoded two output pin is connected to a KQRQA09P line 766, its binary decoded three output pin is connected to a KQRQAD09P line 768.

The binary to 1 of 8 decoder 674 which is connected to the system bus port having priority 10 as a binary decoded one output pin is connected to a KQRQD10P line 770, its binary decoded two output pin is connected to a KQRQA10P line 772, its binary decoded three output pin is connected to a KQRQAD10P line 774.

The binary to 1 of 8 decoder 680 which is connected to the system bus port having priority 11 has a decoded binary one pin connected to a KQRQD11P line 776, its decoded binary two output pin is connected to a KQRQA11P line 778, its decoded binary output three pin is connected to a KQRQAD11P line 780.

The binary to 1 of 8 decoder 686 which is connected to the system bus port having priority 12 has its decoded one output pin connected to a KQRQD12P line 782, its decoded two output pin is connected to a KQRQA12P line 784, its decoded output pin three is connected to a KQRQAD12P line 786.

The binary to of 8 decoder 692 which is connected to the system bus port having priority 13 has a decoded one output pin connected to a KQRQD13P line 788, its decoded output two pin is connected to a KQRQA13P line 790, its decoded output three pin is connected to a KQRQAD13P line 792.

The binary to 1 of 8 decoder 698 which is connected to the system bus port having priority 14 has its decoded one output pin connected to a KQRQD14P line 794, a decoded two output pin is connected to a KQRQA14P line 796, a decoded three output pin is connected to a KQRQAD14P line 798. The KQRQD00-14P lines 710, 716, 722, 728, 734, 740, 746, 752, 758, 764, 770, 776, 782, 788 and 794 comprise a KQRQD bus 800. The KQRQA00-14P output lines 712, 718, 724, 730, 736, 742, 748, 754, 760, 766, 772, 778, 784, 790 and 796 comprise a KQRQA bus 802. The KQRQAD00-15P lines 714, 720, 726, 732 738, 744, 750, 756, 762, 768, 774, 780, 786, 792 and 798 comprise a KQRQAD bus 804.

Figure 14A:
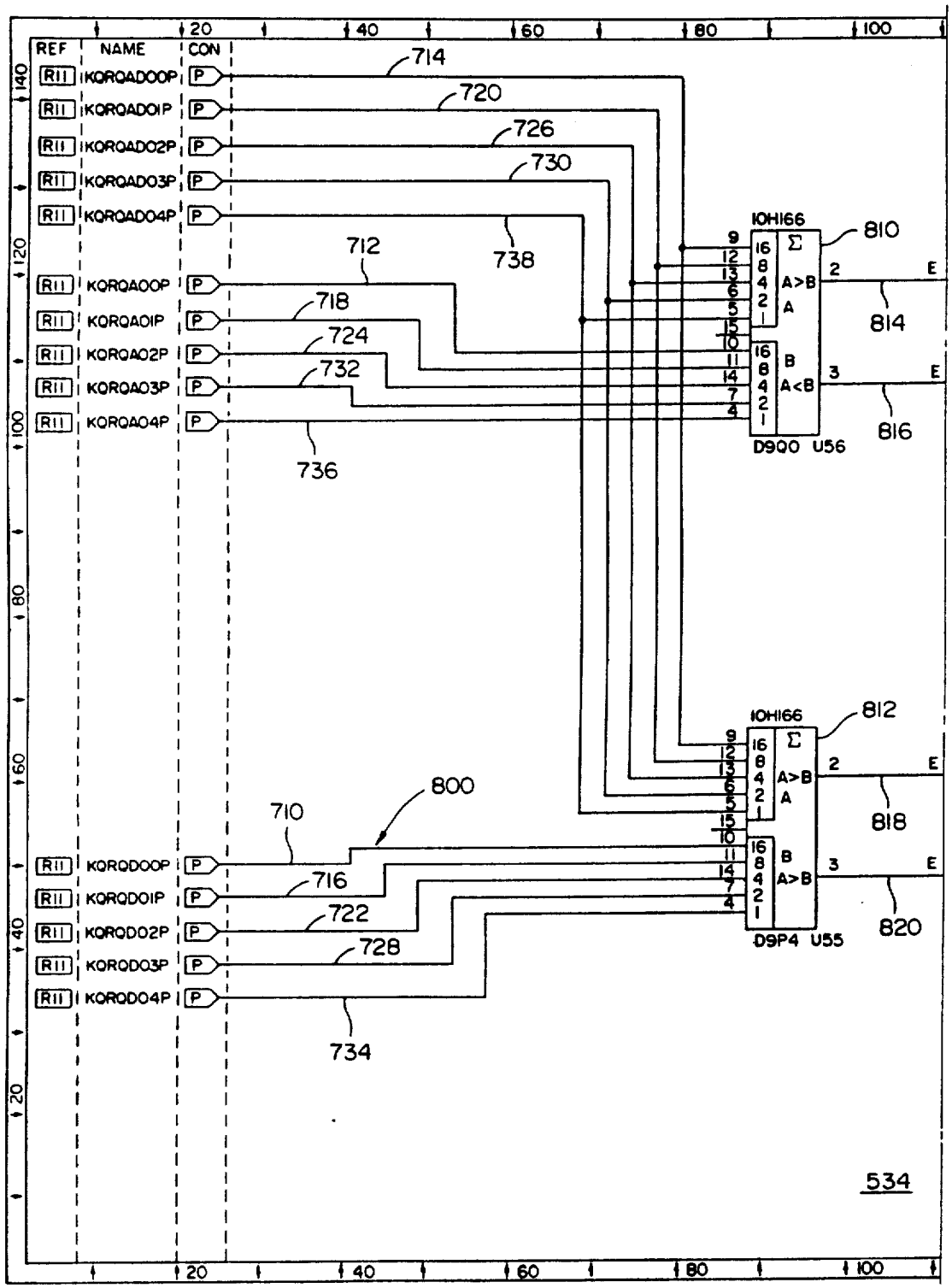
FIGS. 14A and 14B are logic diagrams of a portion of the request comparator logic of FIG. 10.
Figure 14B:
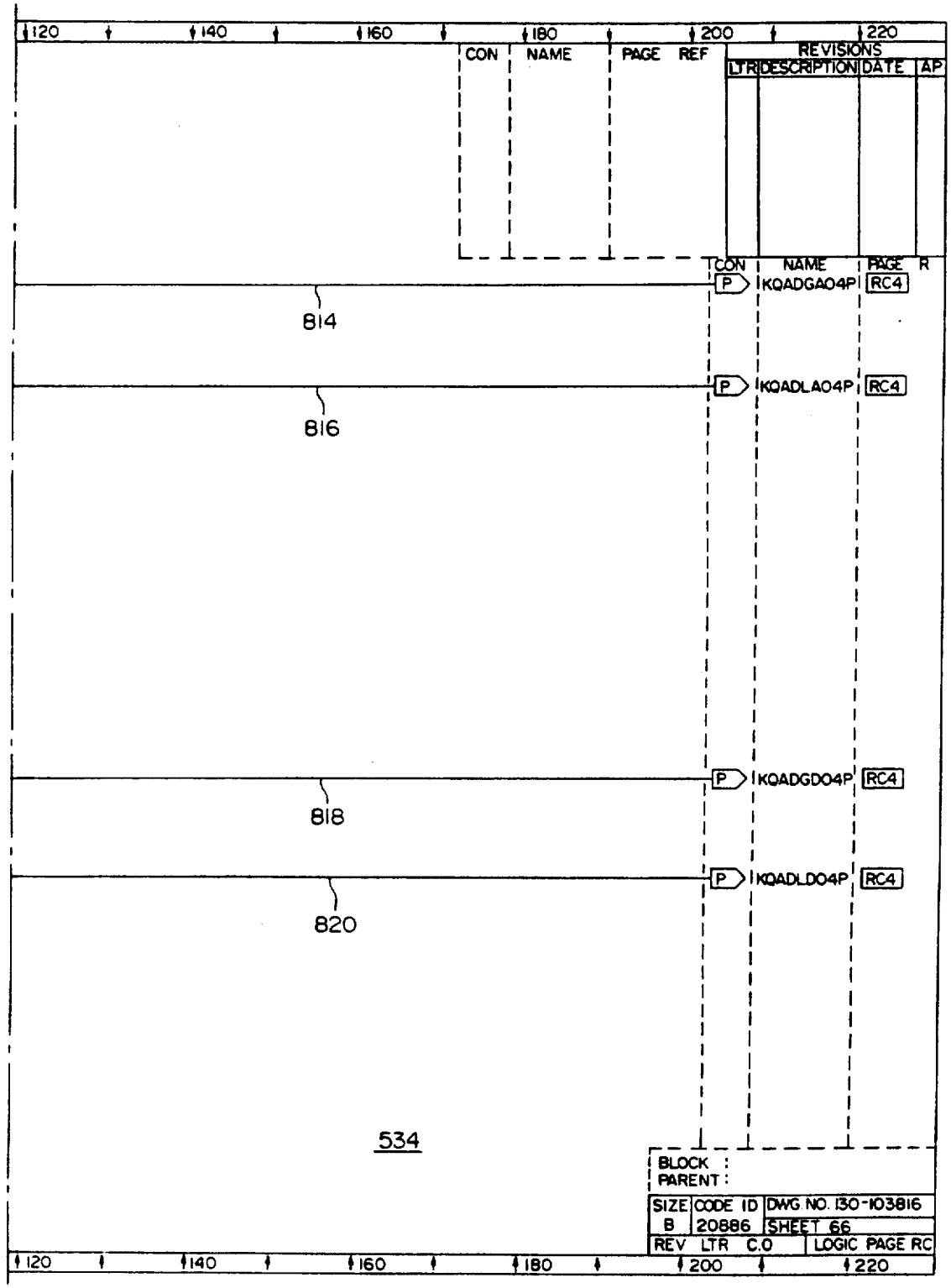

The buses 800, 802 and 804 are connected to the bus comparator logic 534 to provide signals to the bus select logic 534 as to whether a particular system unit connected to a selected system bus port is requesting the full bus or a particular one of the two bus halves. The bus comparator logic 534 includes a number of five bit magnitude comparators, specifically, Motorola emitter coupled logic 10H166 five bit magnitude comparators. As may best be seen in FIG. 14, a 10H166 ECL five bit magnitude comparator 810, a second five bit magnitude comparator 812 is connected partially and parallel with the first five bit magnitude comparator 810. The five bit magnitude comparator 810 has its 1, 2, 4, 8 and 16 A factor pins respectively connected to KQRQAD04P through KQRQAD00P line 714. The KQRQAD04P line 738, 03 line 732, 02 line 726, 01 line 720 and 00 line 714 are likewise connected similarly to the A side inputs of the comparator 812. The five bit magnitude comparator 810 has its B side inputs connected respectively from 1 through 16 to KQRQA04P line 736, 03 line 730, 02 line 724, 01 line 718 and 00 line 712. The five bit magnitude comparator 812 is connected at its B input binary ports 1 through 16 with KQRQD04P line 734 connected to 1, 03 line 728 to 2, followed by the 02 line 722, the 01 line 716 and the 00 line 710 connected to 16. Thus, the five bit magnitude comparator 810 receives the full bus priority request signals from bus slots 00 through 04 at its A input and the half bus priority request signals for memory read transfer from system units having priority 00 through 04 at its B terminals. When the weighted priority for A is greater than for B, a signal is generated on an output KQADGA04P line 814. When the weighted sum of the half bus priority requests from port 04 through 00 is greater, a KQADLA04P line 816 is energized.

Similarly, the five bit magnitude comparator 812 compares the weighted sum of full bus requests from ports 00 through 04 to the weighted sum of half bus requests for data return operation from ports 00 through 04. When the weighted sum of the full bus requests is greater than the weighted sum of the half bus requests, a line KQADG04P 818 is energized. When the weighted sum of the half bus priority requests is greater, a KQADLD04P line 820 is energized.

Figure 15A:
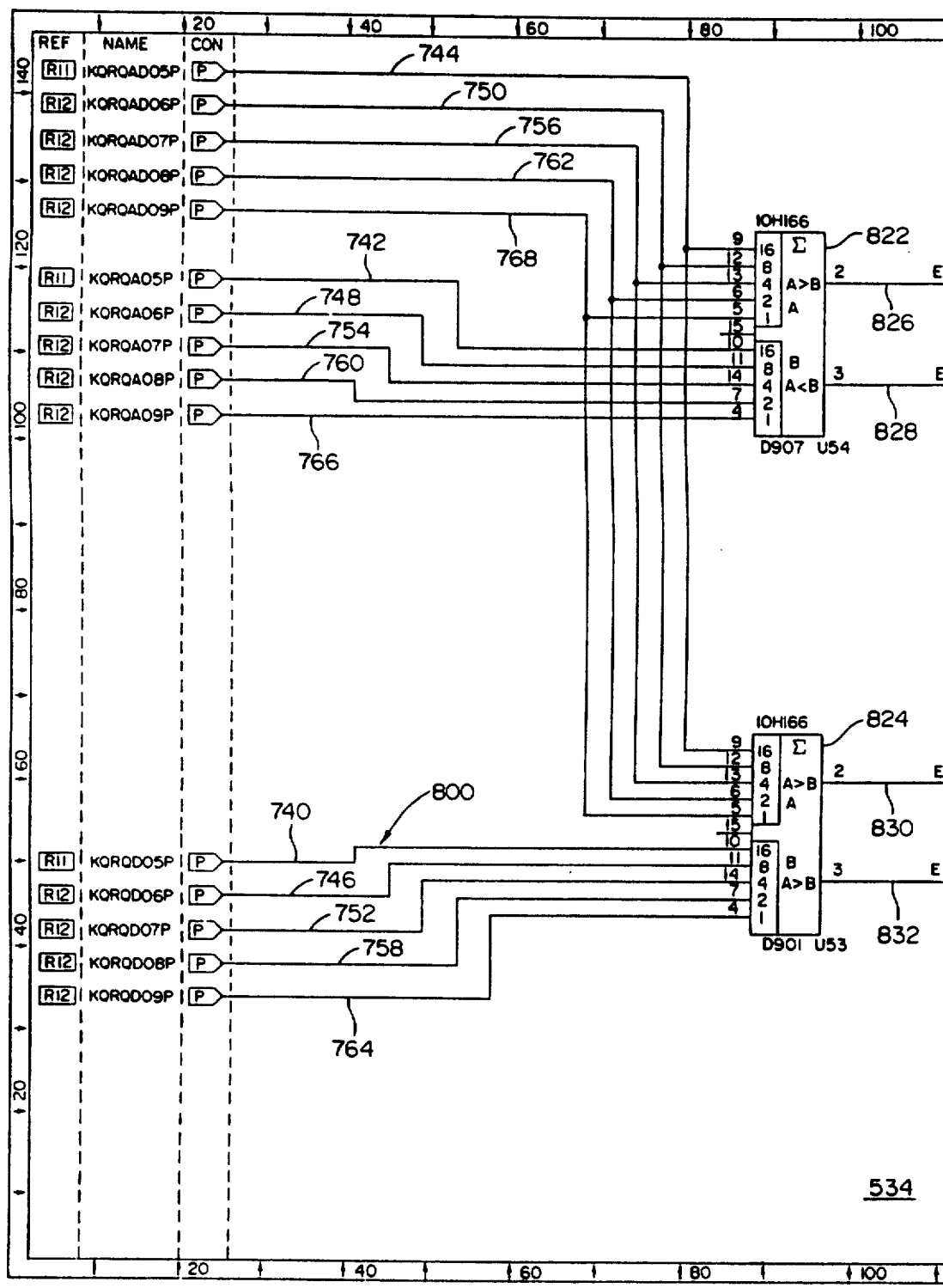
FIGS. 15A and 15B are logic diagrams of a portion of the logic of the request comparator.
Figure 15B:
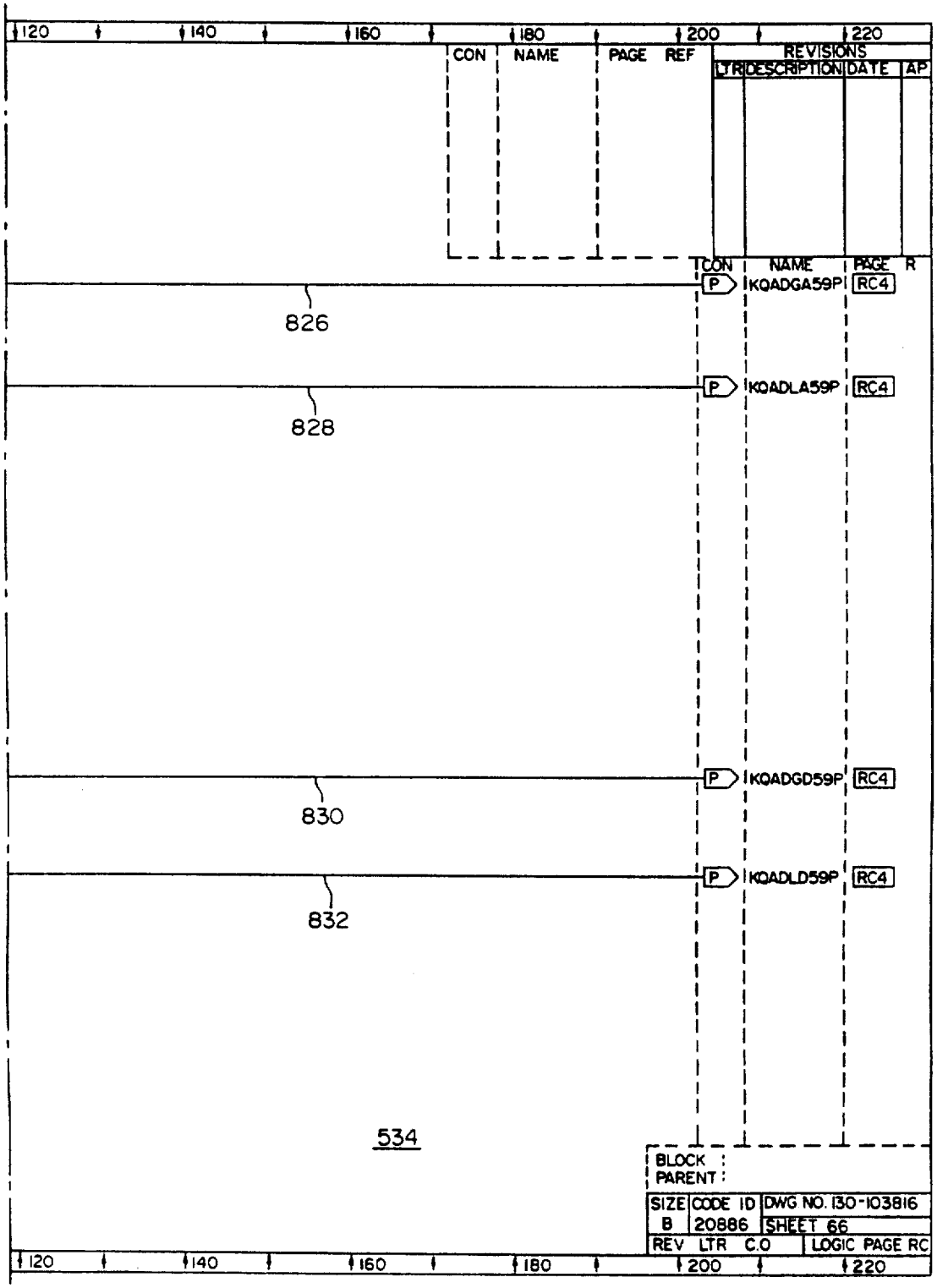

Similarly, as may best be seen in FIG. 15, a 10H166 ECL five bit magnitude comparator 822 and a 10H166 ECL five bit magnitude comparator 824 have each of their A ports connected to KQRQAD05-09P leads 744, 750, 756, 762 and 768 with line 744 being connected to the most significant bit pin and line 768 being connected to the least significant bit pin so that both the comparators 822 and 824 generate an internal representation of the weighted binary sum of the full bus priority requests from bus ports 05 through 09. The five bit magnitude comparator 822 has its B port connected to KQRQA05-09 lines 742, 748, 754, 760 and 766 with the 05 line being connected to the most significant bit and the 09 line being connected to the least significant bit. When the weighted sum of the full bus requests from system ports 05 through 09 exceeds the weighted sum of the half bus requests for a memory read transfer from the those same ports a KQADGA59P line 826 connected to the output of the five bit magnitude comparator 822 is asserted. When the half bus requests from devices 05 through 09 have a weighted sum greater than the full bus requests from the same devices, a line 828 coupled to an output pin of the comparator 822 is driven high.

Similarly, the comparator 824 compares the weighted sum of the full bus requests from devices 05 through 09 to the weighted sum of the half bus requests for data returns from those same devices. If the full bus requests weighted sum exceeds the half bus request, a line 830 connected to the output of the comparator 824 is asserted. If the half bus requests for data returns weighted priority exceeds that for the full bus requests, a line 832 coupled to an output pin of the comparator 824 is asserted.

Figure 16A:
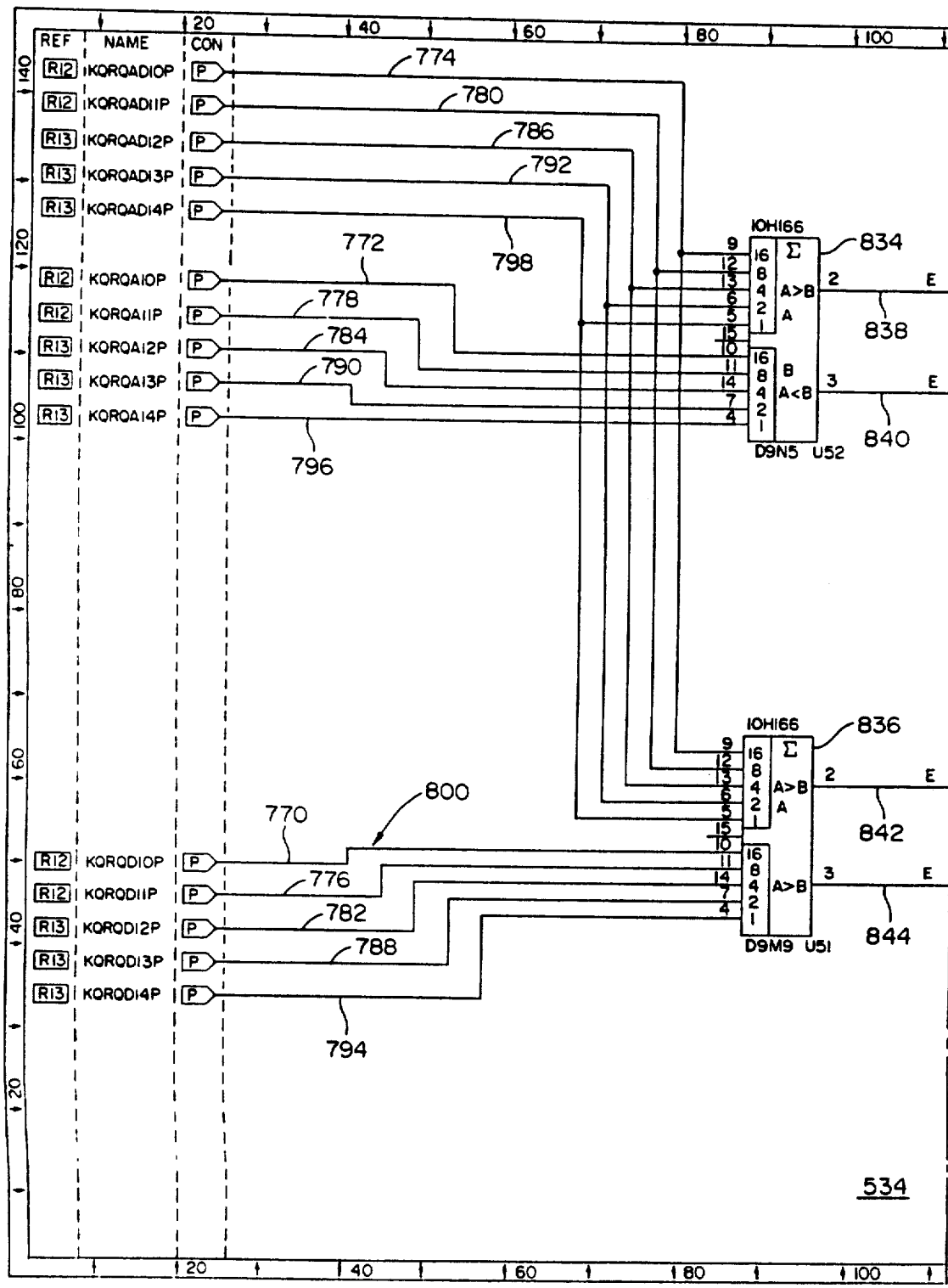
Figure 16B:
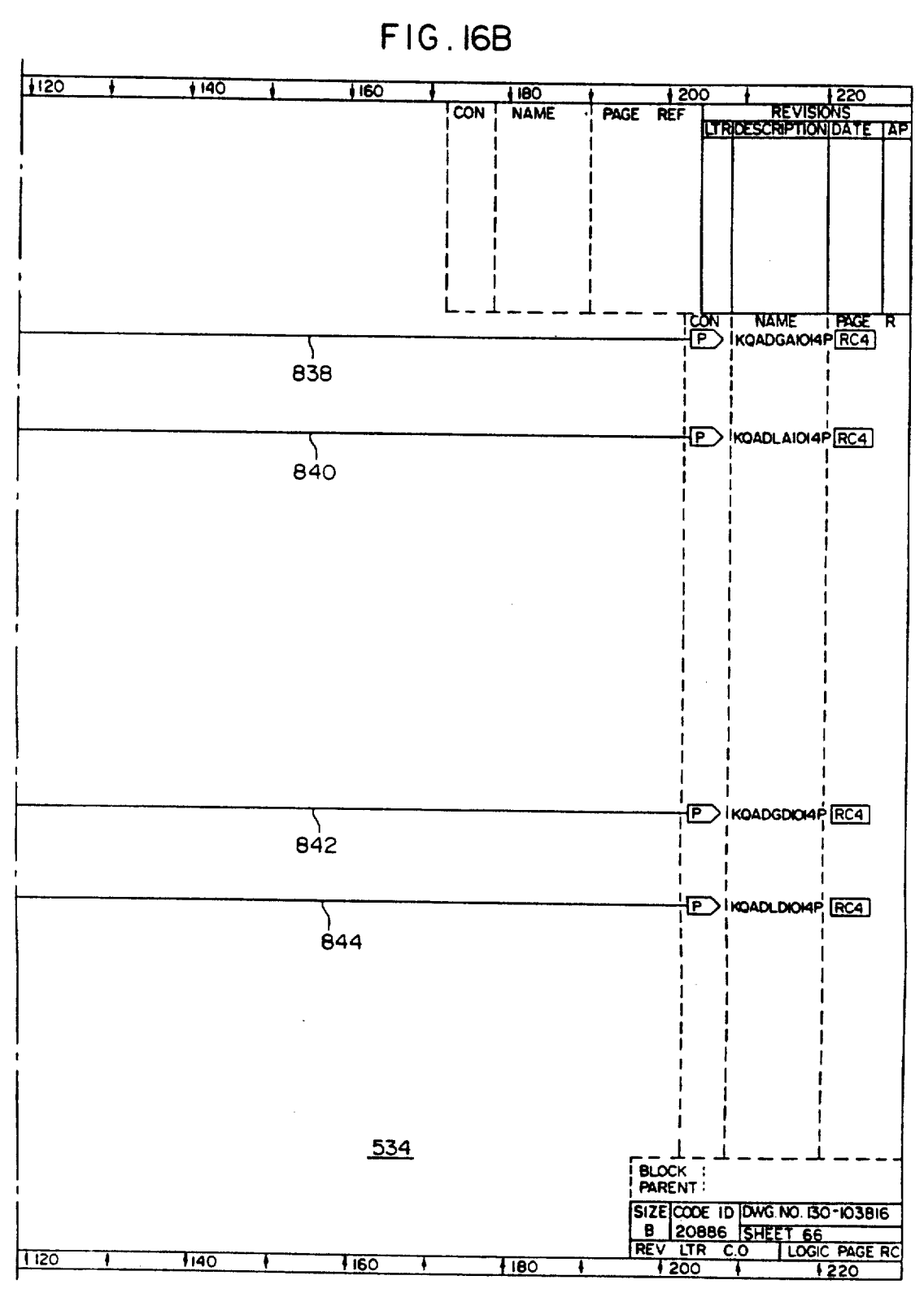

As may best be seen in FIG. 16, a 10H166 ECL 5-bit magnitude comparator 834 and a 10H166 ECL 5-bit magnitude comparator 836 each have their A ports respectively coupled to the KQRQAD10-14P lines with 774, 780, 786, 792 and 798 with the KQRQAD10P line 774 coupled to the most significant bit of the A port and the KQRQAD14P line 798 coupled to the least significant bits of the input ports. Thus the A ports receive signals so that the comparators 834 and 836 can generate weighted sums representative of the weighted priorities of any system units connected to ports 10 through 14 which are requesting full bus access. The B input port of the comparator 834 has coupled to it lines KQRQA10-14P 772, 778, 784, 790 and 796 to receive half bus request signals from system bus ports 10 through 14 for memory read transfers to generate a weighted sum representative thereof. The comparator 836 is connected to lines KQRQD10-14P 770, 776, 782, 788 and 794 at its B port to generate a weighted sum of the request signals for half bus transfers, data returns, requested by units coupled to ports 10 through 14.

When the weighted sum of the full bus requests exceeds the weighted sum of the half bus requests for a memory read transfer, a signal is generated on a KQADGA1014P line 838 coupled to the comparator 834. When the weighted sum of the bus requests for half bus, memory read transfers from system bus ports 10 through 14 exceeds the weighted sum of the request for full bus transfers, a signal is asserted on a KQAD-LA1014P line 840 connected to the comparator 834. When the weighted sum of the bus requests for full bus transfer for devices 10 through 14 exceeds the weighted sum for half bus or data return transfers from those same devices, a signal is asserted on line 856 which is coupled to the comparator 836. When the weighted sum of the bus requests for half bus transfers for units 10 through 14 exceeds the weighted sum of the request for full bus transfers, a KQADLD1014P line 844 has a signal asserted on it by the comparator 836.

Figure 17A:
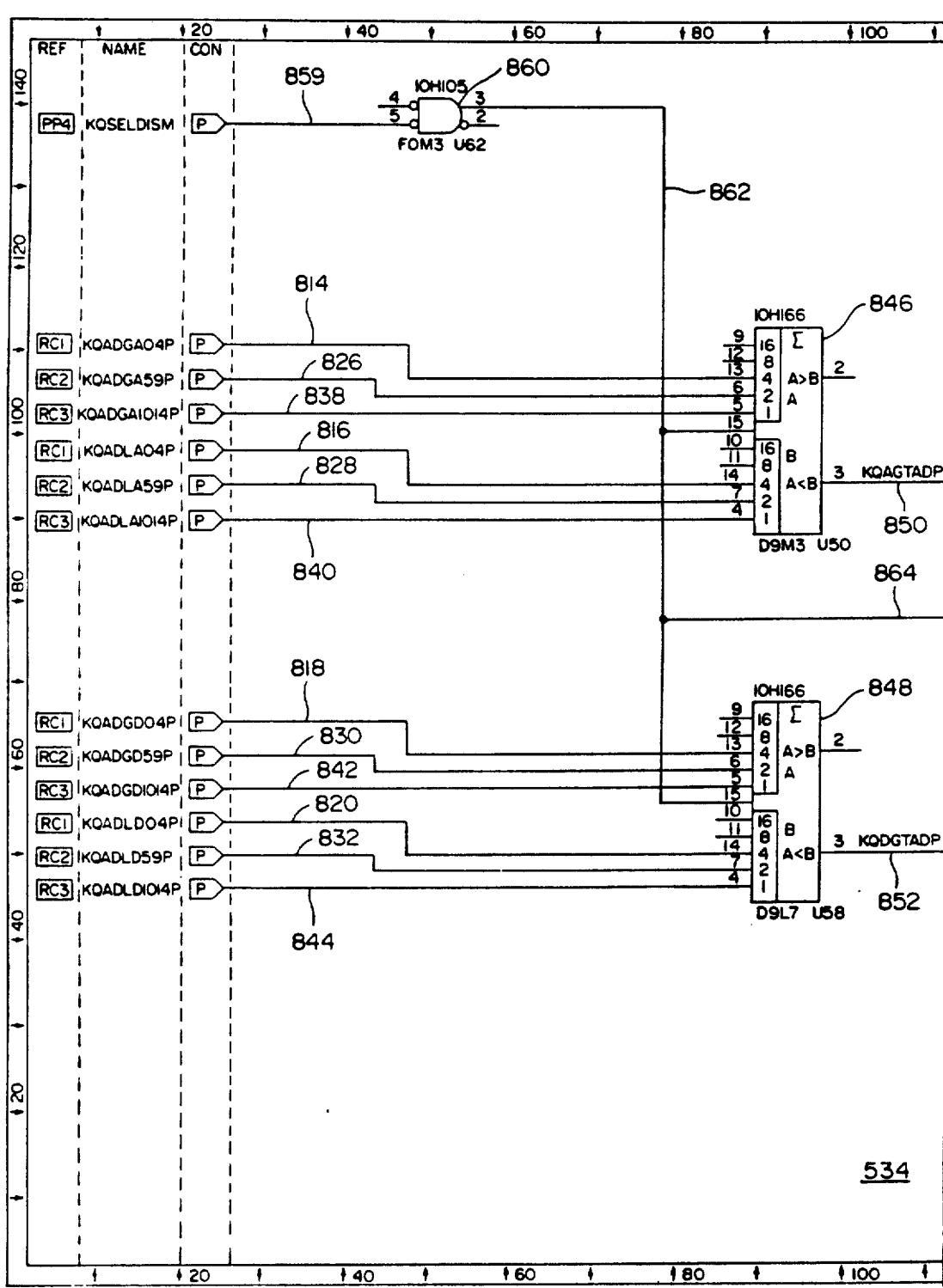
FIGS. 17A and 17B are logic diagrams of a portion of the logic of the request comparator.
Figure 17B:
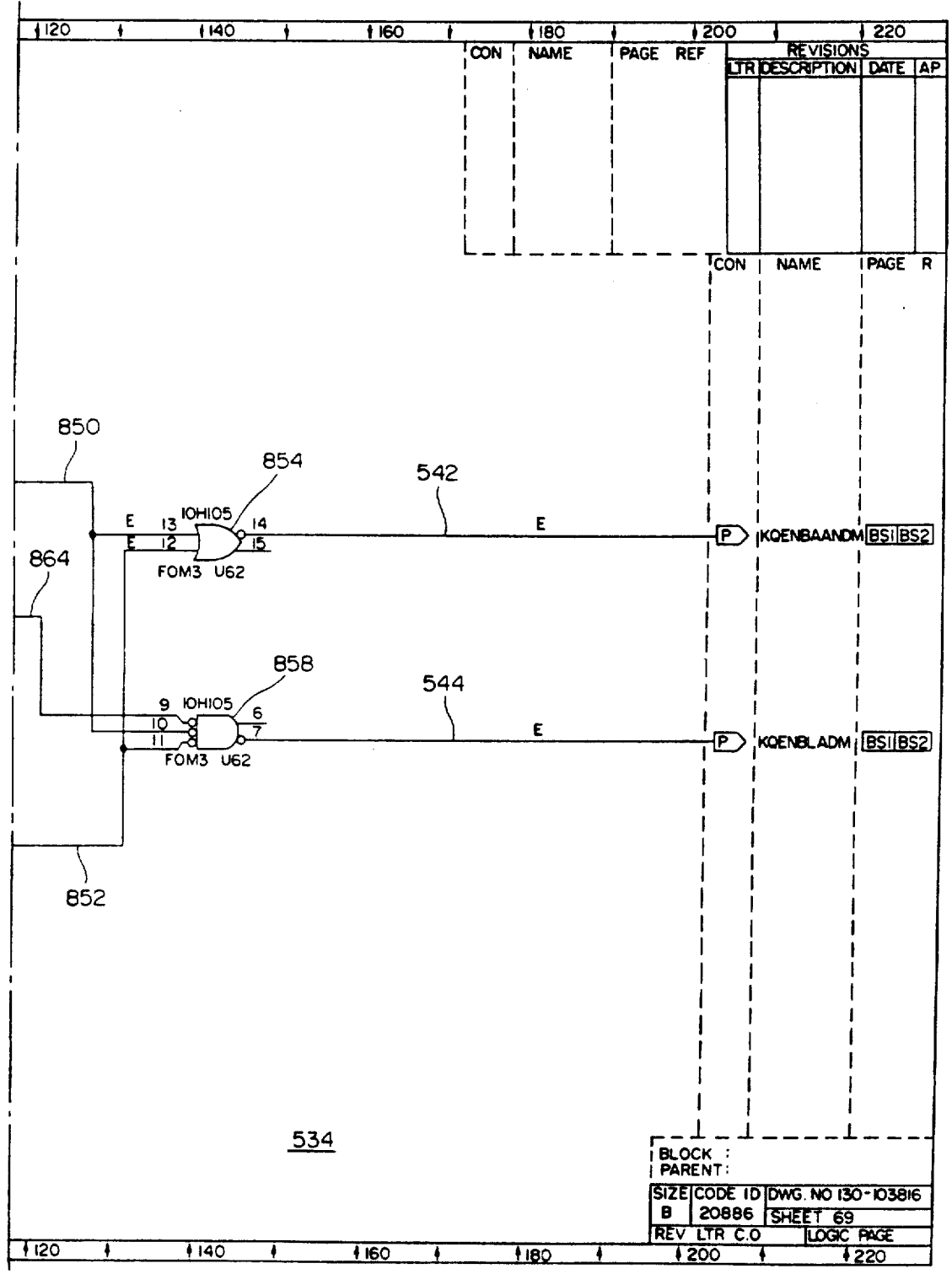

As may best be seen in FIG. 17, a 10H166 ECL 5-bit magnitude comparator 846 is coupled at its A port, at its least significant binary pin to line 838, is coupled to its next most significant pin to KQADGA59P line 826 and is coupled at its next most significant pin to KQADG04P line 814 to generate the weighted sum of the outputs of devices 04, 5 through 9 and 10 through 14. Similarly, its input port B is coupled at its least significant bit input to the KQADLA1014P line 840 at its next most significant bit to the KQADLA59P line 828 and its next most significant bit to the KQAD-LA04P line 816 so that when the effective weighted sum of the previously summed full bus requests on lines 814, 826 and 838 is less than the sum of the prioritized half bus requests on the lines 816, 828 and 840 an output is generated on a KQAGTADP line 850. The comparator 848 operates similarly. When the prioritized full bus requests have lower priority than the prioritized half bus requests for a data return on lines 820, 832 and 844, an output is generated on a KQDGTADP line 852. A NOR gate 854 is fed with the signals from the lines 850 and 852 and generates a signal on a KQENBAANDM line 542 in the event that either of the priorities for the half bus requests exceed the priority for the full bus requests. A NAND gate 858 is connected at its inverting inputs to the lines 850 and 852 as well as to an inverting input NAND gate 860 which functions as a buffer for a disable signal which may be used to selectively disable the request select logic. The buffer or inverter produces an output on a line 862 which is coupled by a line 864 to an inverting input of the gate 858. As long as the system has not been disabled and both of the half bus enable lines 850 and 852 remain low, a low output signal is generated on a line 544 connected to the inverting output of the NAND gate which is indicative of a full bus request.

Figure 18A:
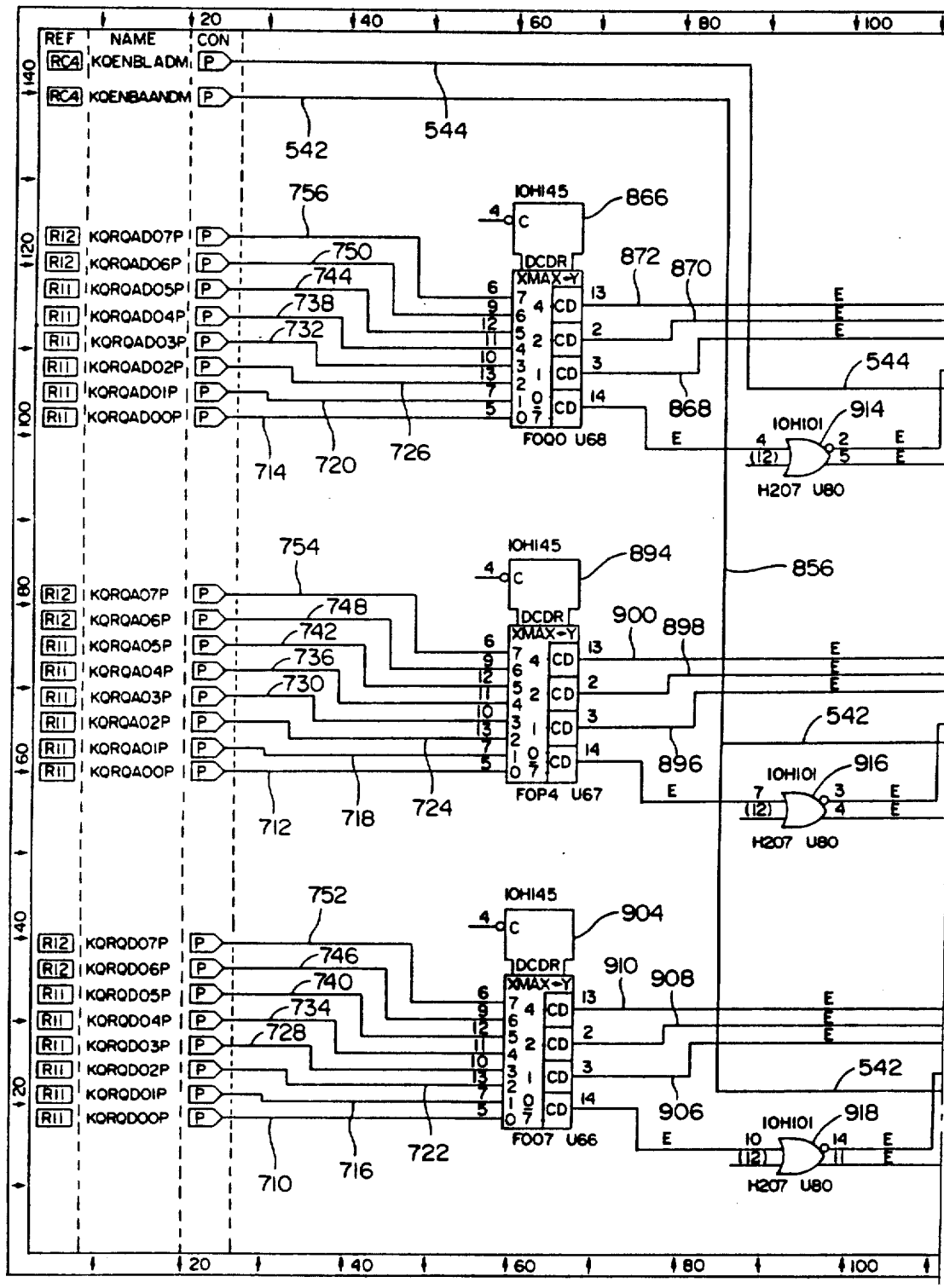
FIGS. 18A and 18B are logic diagrams of a portion of the logic of the bus select unit of FIG. 10.
Figure 18B:
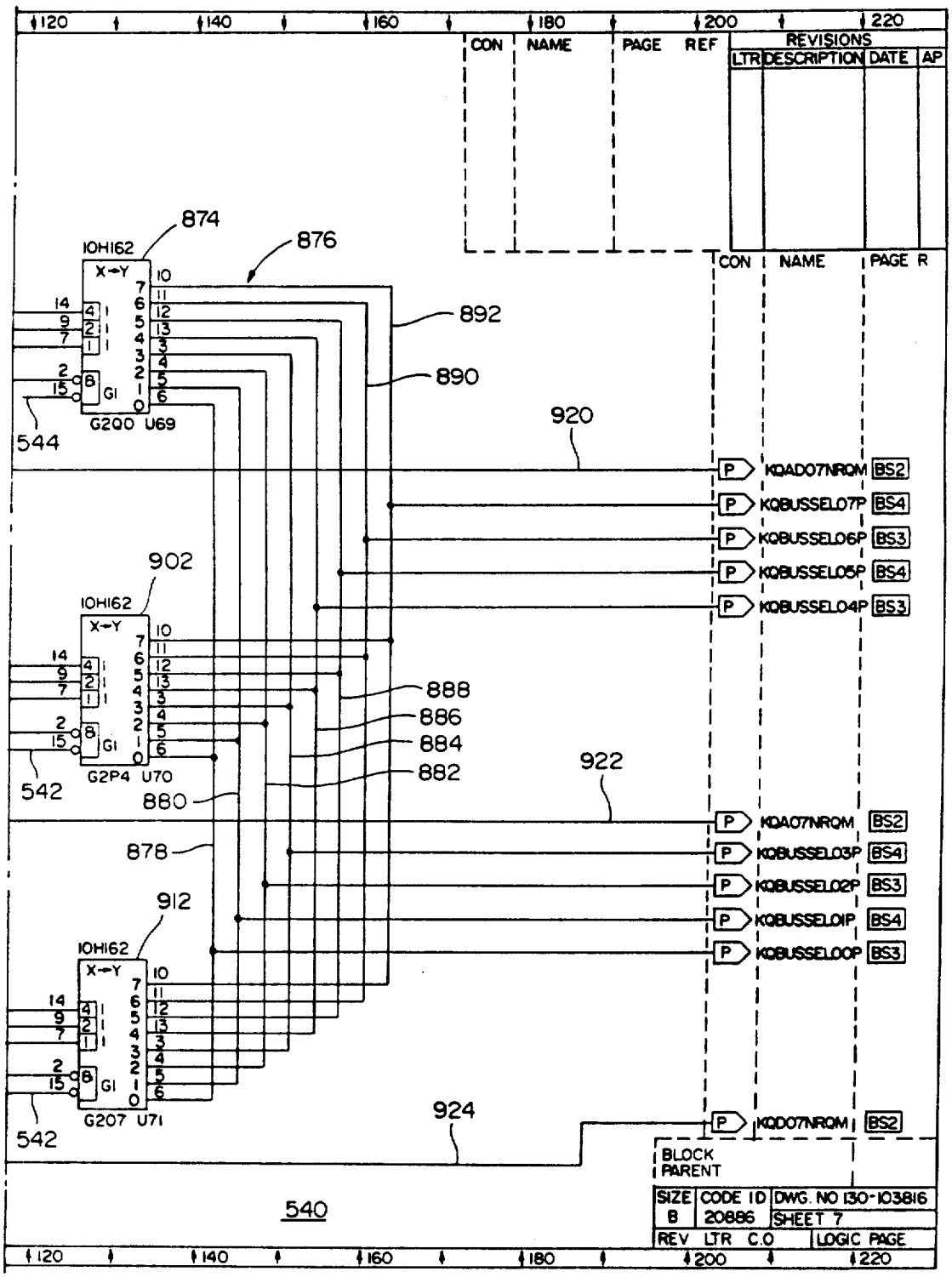

The bus select logic 540 receives the KQRQAD bus for further signal processing. In particular, as may best be seen in FIG. 18, the KQRQAD00-07P leads 714, 720, 726, 732, 738, 744, 750 and 756 are coupled, respectively to the 0 through 7 input terminals of a 10H165 ECL eight input priority encoder 866. The eight input priority encoder 866 has its three lowest level binary outputs 1,2 and 4 connected to a lead 868, a lead 870 and a lead 872, respectively. Leads 868 through 872 are connected to the input of a 10H162 3bit binary word to 1 of 8 decoder 874. The function of the priority encoder 866 and the decoder 874 is to initially provide a binary signal for the encoder 866 indicative of the highest priority of the lines upon which a signal is being asserted. That binary code is then fed to the decoder 874 which produces an output on a bus selection bus 876 having a KQBUSSEL00P bus select lead 878, a KQBUSSEL01P 880, a KQBUSSEL02P lead 882, a KQBUSSEL03P lead 884, a KQBUSSEL04P lead 886, a KQBUSSEL05P lead 888, a KQBUSSEL06P lead 890, a KQBUSSEL07P lead 892. In a similar fashion, a 10H165 8-input priority encoder 894 has its priority input lines 0 through 7 connected to KQRQA00-07P lines 712, 718, 724, 730, 736, 742, 748 and 754, respectively. Its three least significant binary output lines are coupled with the least significant bit being coupled to a lead 896, a lead 898 is connected to the next most significant bit pin and a lead 900 is connected to the most significant of the three-bit pins to carry a binary coded signal to a 10H162 ECL decoder 902 which is connected at its binary input pins to the leads 896, 898 and 900 and has its decoded output pins 0 through 7 connected respectively to KQBUSSEL00-07P leads 878, 880, 882, 884, 886, 888, 890 and 892.

A 10H165 8-input priority encoder 904 has its priority input pins 0 through 7 connected respectively to KQRQD00-07P leads 710, 716, 722, 728, 734, 740, 746 and 752. Its three least significant binary output pins are connected respectively to a lead 906, a lead 908 and a lead 910. Leads 906 through 910 are connected to a 10H162 3bit 1 of 8 decoder 912 at its binary input pins. The decoders decoded output pins 0 through 7 are connected respectively to KQBUSSEL00-07P leads 878, 880, 882. 884, 886, 888, 890 and 892.

In addition, an enable pin of the decoder 874 is connected to the KQENBLADM 544 line and is driven into an enabled state when the voltage is low on that line. A second enable pin on the decoder 874 is driven by the inverted output of an OR gate 914 which is connected to an output of the priority encoder 866. Thus, only if a full bus enable comes in on the KQENBLADM line 864 and the priority encoder 866 is producing an output, will an output be enabled from the decoder 874 to drive one of the KQBUSSELXXP lines. Similarly, the KQENBAANDM line 542 is connected to the decoders 902 and 912 at their enable pins to enable both of those decoders when a half bus transfer is requested. When one of devices 00 through 07 requests a memory read transfer, an OR gate 916 which is connected to an output of the encoder 894 and drives an enable pin of the decoder 902, causes the decoder 902 to be enabled and output a bus selection signal. When a half bus transfer is requested and one of the devices is selected by the encoder 904, it outputs a signal to an OR gate 918 which also drives an enable pin of the encoder 912 low enabling the decoder 912 to output a bus selection signal. Also, the OR gate 914 has coupled to it a KQAD07NRQM lead 920, the OR gate 916 has coupled to it a KQA07NRQM lead 922, the OR gate 918 has coupled to it a KQD07NRQM lead 924. If any of leads 920, 922 or 924 are driven low by their respective OR gates 914, 916 or 918 it indicates that the respective encoders 866, 894 or 904 are inactivated.

Figure 19A:
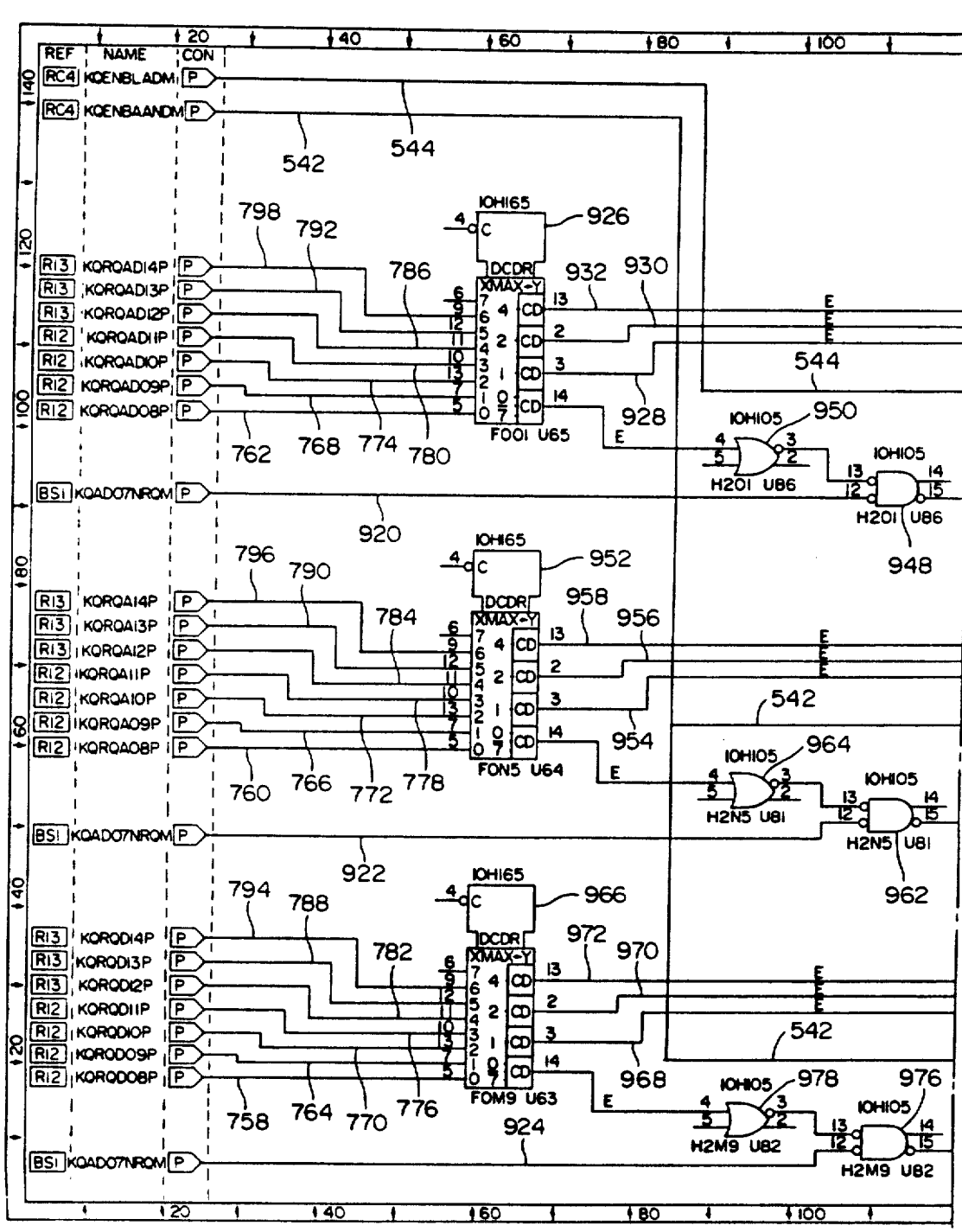
FIGS. 19A and 19B are logic diagrams of a portion of the logic of the bus select logic.
Figure 19B:
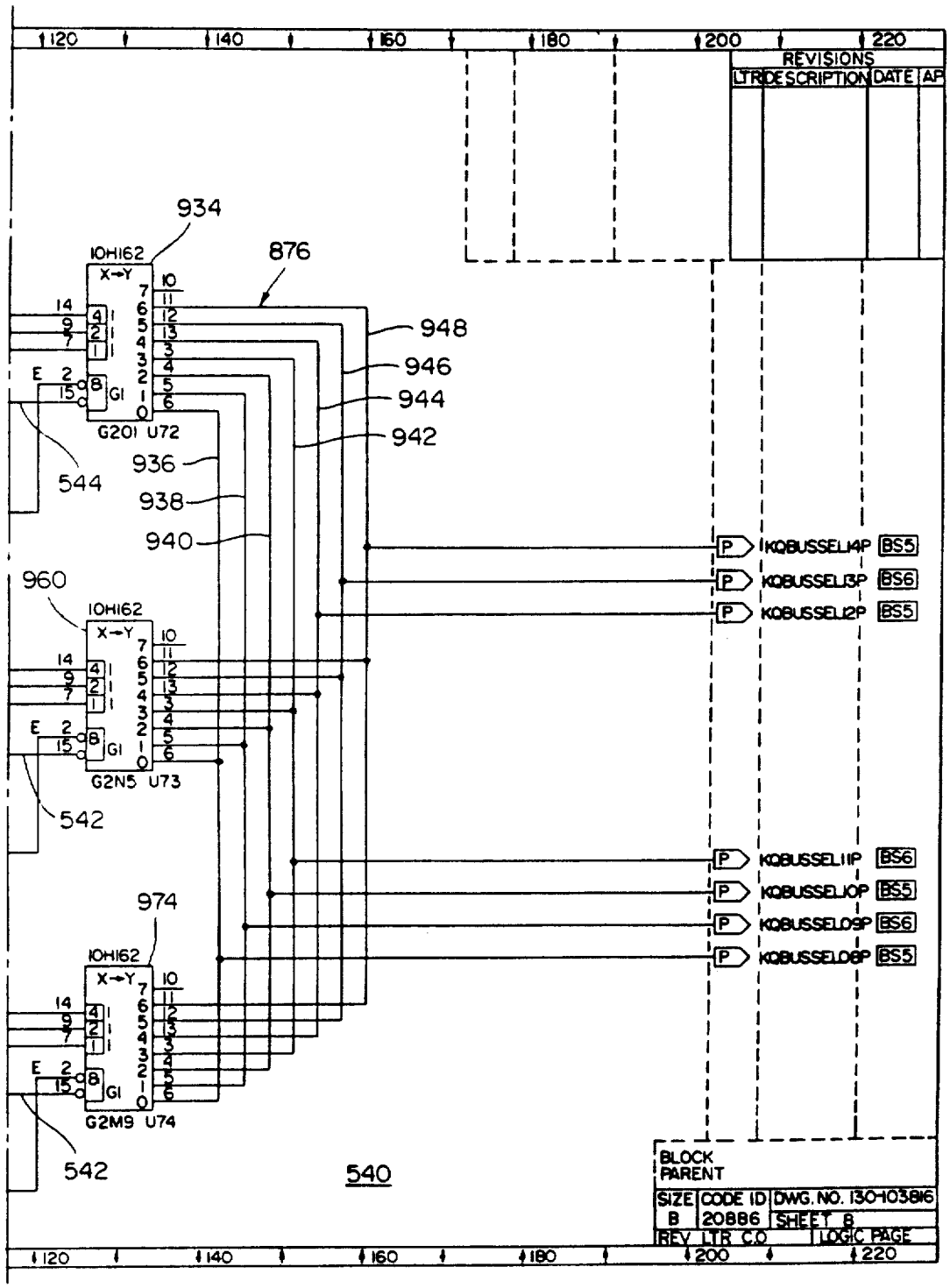

In a similar fashion, as may best be seen in FIG. 19, a 10H165 ECL 8-input priority encoder 926 has its priority input pins 0 through 6 respectively connected to KQRQAD08-14P leads 762, 768, 774, 780, 786, 792 and 798. The output pins of the priority encoder 926 are coupled to a least significant bit lead 928, a next most significant bit lead 930 and a most significant bit lead 932. Leads 928 through 932 are connected to a 10H162 3bit binary word to 1 of 8 line decoder 934 at its binary input pins. The decoder 934 has a plurality of decoded output pins 0 through 6 which are respectively connected to portions of the bus select bus 876. More particularly, with pin 0 connected to a KQBUSSEL08P line 936, pin 1 connected to a KQBUSSEL09P line 938, pin 2 connected to a KQBUSSEL10P line 940, pin 3 is connected to a KQBUSSEL11P line 942, pin 4 is connected to a KQBUSSEL12P line 944, pin 5 is connected to a KQBUSSEL13P line 946 and pin 6 is connected to a KQBUSSEL14P line 948.

The priority encoder 926 outputs a 3bit binary number representative of the highest priority of the lines KQRQAD08-14P which are asserted. The 3bit number is fed to the decoder 934 which energizes one of its output pins in response to the decoded number, thereby energizing one of the KQBUSSELXXP lines. It is necessary however, that the KQENBLADM line 544 be driven low to enable the decoder 934 as well as a negative signal being supplied on line KQAD07NRQM 920 which is coupled to an AND gate 948. The AND gate 948 also drives an enable pin of the decoder 934 in response to the signal on line 920 and a signal it receives from an OR gate 950 connected to the priority encoder 926. Thus, the decoder 934 is not enabled unless the priority encoder 926 has a valid output and the priority encoder 866 has caused the OR gate 914 to drive KQAD07NRQM line 920 low.

A 10H165 8-input priority encoder 952 is coupled at its input pins to leads KQRQA08-14P 760, 766, 772, 778, 784, 790 and 796 and has its binary 1, 2 and 4 output pins respectively coupled to a lead 954, a lead 956 and a lead 958. Leads 954 through 958 are coupled to the binary input pins of a 10H162 3bit binary word to 1 of 8 line decoder 960. The decoder 960 has its decode output pins 0 through 6 respectively connected to the KQBUSSEL08-14P lines 936, 938, 940, 942, 944, 946 and 948. Decoder 960 drives a selected one of those lines high when it receives an output from the encoder 952 which is indicative of the highest priority line having been driven high. Similarly, the decoder 960 is enabled by the output of an AND gate 962 which receives a signal from an OR gate 964 indicative of the encoder 952 being active. The AND gate 962 is also enabled when the priority encoder 894 is not driving an output indicating that devices 00 through 07 have not selected a memory read transfer.

A 10H165 8-input priority encoder 966 has its priority input leads 0 through 6 respectively connected to the lines KQRQD08-14P 758, 764, 770, 776, 782, 788 and 794. In a fashion similar to that discussed above for the other priority encoders, 3-binary output leads respectively numbered 968, 970 and 972 are coupled to the 1, 2 and 4 binary output pins of the priority encoder 966. A 10H162 3 bit binary to 1 of 8 decoder 974 is connected to the leads 968 through 972 and has its output pins 0 through 6 connected to the KQBUSSEL08-14P lines 936, 938, 940, 942, 944, 946 and 948. An enabling AND gate 976 is coupled to an enable pin of the decoder 974 as well as an enabling OR gate 978 so that the decoder 974 produces an output only when the priority encoder 966 is active and the priority encoder 904 is effectively inactive.

Figure 20A:
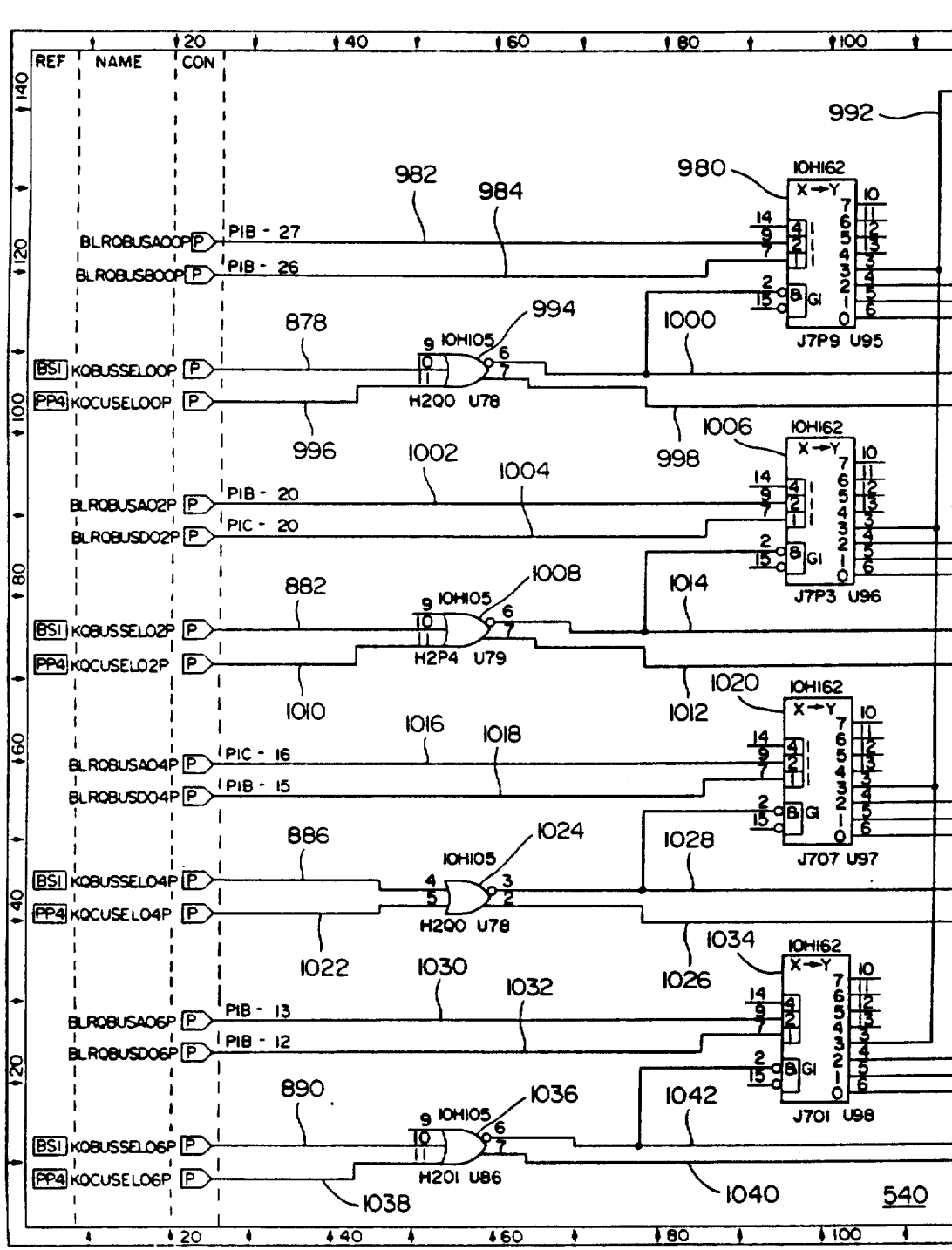
FIGS. 20A and 20B are logic diagrams of a portion of the bus select logic.
Figure 20B:
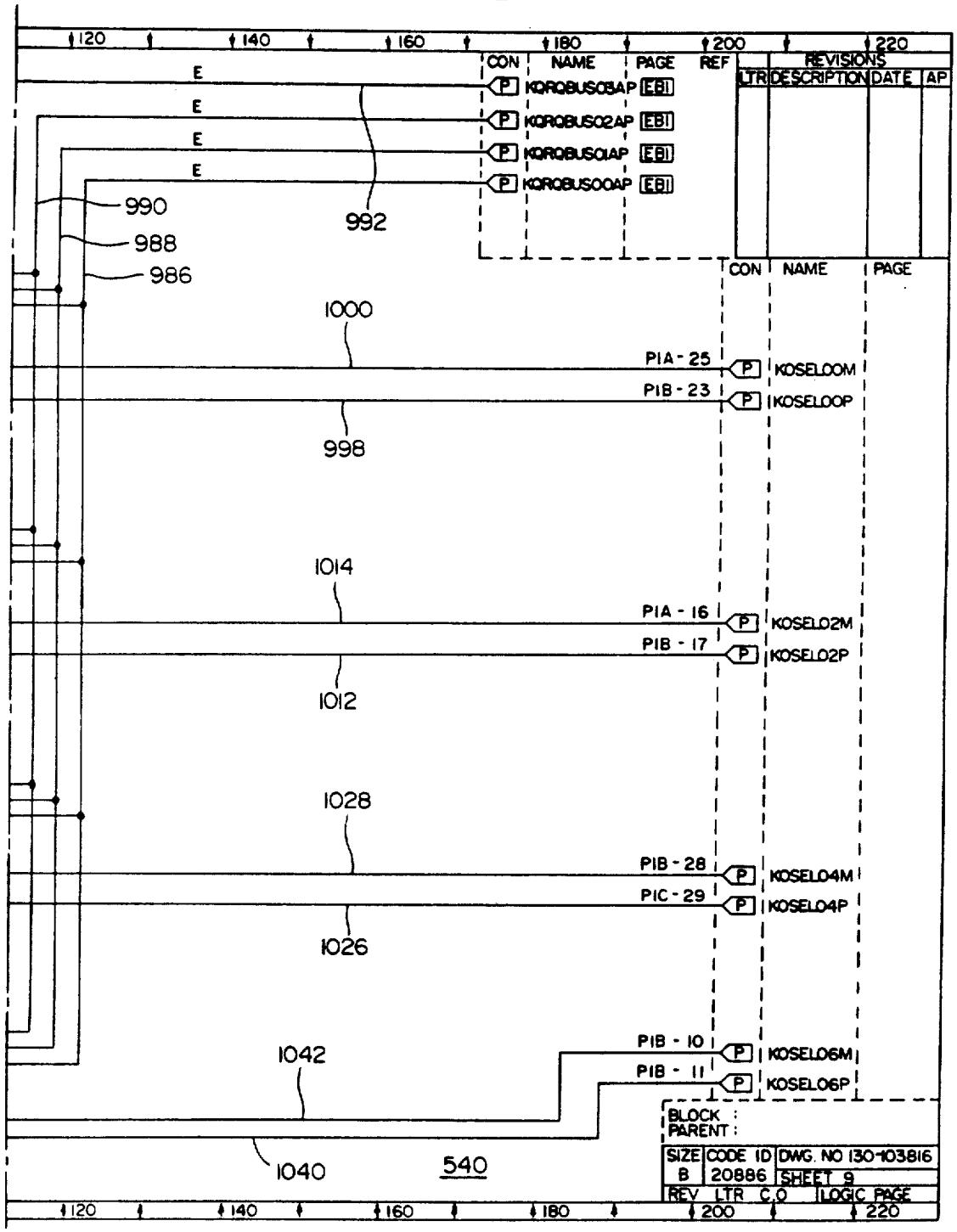

Referring now to FIG. 20, a 10H162 3bit binary word to 1 of 8 decoder 980 is coupled to a BLRQBUSA00P lead 982 and a BLRQBUSB00P lead 984 with the A lead comprising the most significant bit lead. When the device having priority 00 makes a bus request, the 2-bit number indicating the address of the target bus is received on lines 982 and 984. The decoder 980 then energizes one of its 0-3 output pins indicative of the binary decoded output for one of four target buses.

The output of the 0 through 3 pins of the decoder 980 is respectively coupled to a KQRQBUS00AP line 986, a KQRQBUS01AP line 988, a KQRQBUS02AP line 990 and a KQRQBUS03AP line 992. When BLRQBUSA00P and BLRQBUSB00P signals are 00, line 986 is generated, when 01 line 988 is energized, when 10 line 990 is energized and when 11 line 992 is energized. Energization of lines 986 through 992 selects which of the buses is to receive the proposed bus transfer and more particularly, causes the bus links priority logic 560 to send advance link signals to an intersystem bus link which is coupled to the bus whose number has been selected by the system unit 00. In addition, the KQBUSSEL00P line 878 is connected to an OR gate 994. Also connected to that OR gate 994 is a KQCUSEL00P line 996 from a diagnostic unit. If either line 878 or 996 is driven high, an output line 998 from the OR gate 994 is driven high, while a KQSEL00M output line 1000 is driven low. Line 998 comprises a select line connected to the port having priority Thus, if either KQBUSSEL00P or KQCUSEL00P are driven high system bus unit 00 receives a select signal. In addition, when the system bus unit is being selected a low signal is sent from line 1000 to an enabling terminal of the decoder 980 enabling the decoder output.

In a similar fashion, a BLRQBUSA02P line 1002 and a BLRQBUSB02P line 1004 are connected to a 10H162 3-bit binary word to 1 of 8 line decoder 1006 at its binary input pins 1 and 2. The decoder 1006 has its output pins 0 through 3 coupled to lines 986 through 992 in the same fashion as the decoder 980. An OR gate 1008 is connected to the KQBUSSEL02P line 882 and a KQCUSEL02P line 1010 so that unit 2 is selected by the diagnostic unit by energizing line 1010 or a bus select for unit 2 is indicated on line 882, a KQSEL02P line 1012 is driven high at the same time that a KQSEL02M line 1014 is driven low and line 1014 also enables the decoder 1006.

A BLRQBUSA04P line 1016 and a BLRQBUSB04P line 1018 are connected to a 10H162 3bit binary word to 1 of 8 line decoder 1020 at its binary input pins in a manner identical to decoders 980 and 1006. The output pins of the decoder 1020 are connected in parallel with decoders 980 and 1006. When the logic indicates selection of system bus unit having priority 4, line 886 is driven high or a KQCUSEL04P line 1022 is driven high causing an OR gate 1024 to drive a KQSEL04P line 1026 high and a KQSEL04M line 1028 low which are the select lines for system port 4.

A BLRQBUSA06P line 1030 and a BLRQBUSB06P line 1032 are connected to a 10H162 3bit binary word to 1 of 8 line decoder 1034 at binary input pins 1 and 2. The decoder 1034 is connected in parallel with decoders 980, 1006 and 1020. An OR gate 1036 is connected to the KQBUSSEL06P line 890 and a KQCUSEL06P line 1038 and energizes a KQSEL06P line 1040 high and a KQSEL06M line 1042 low when system bus unit 6 is selected by the bus select logic or a diagnostic unit makes a select by asserting KQCUSEL06P line 1038.

Figure 21A:
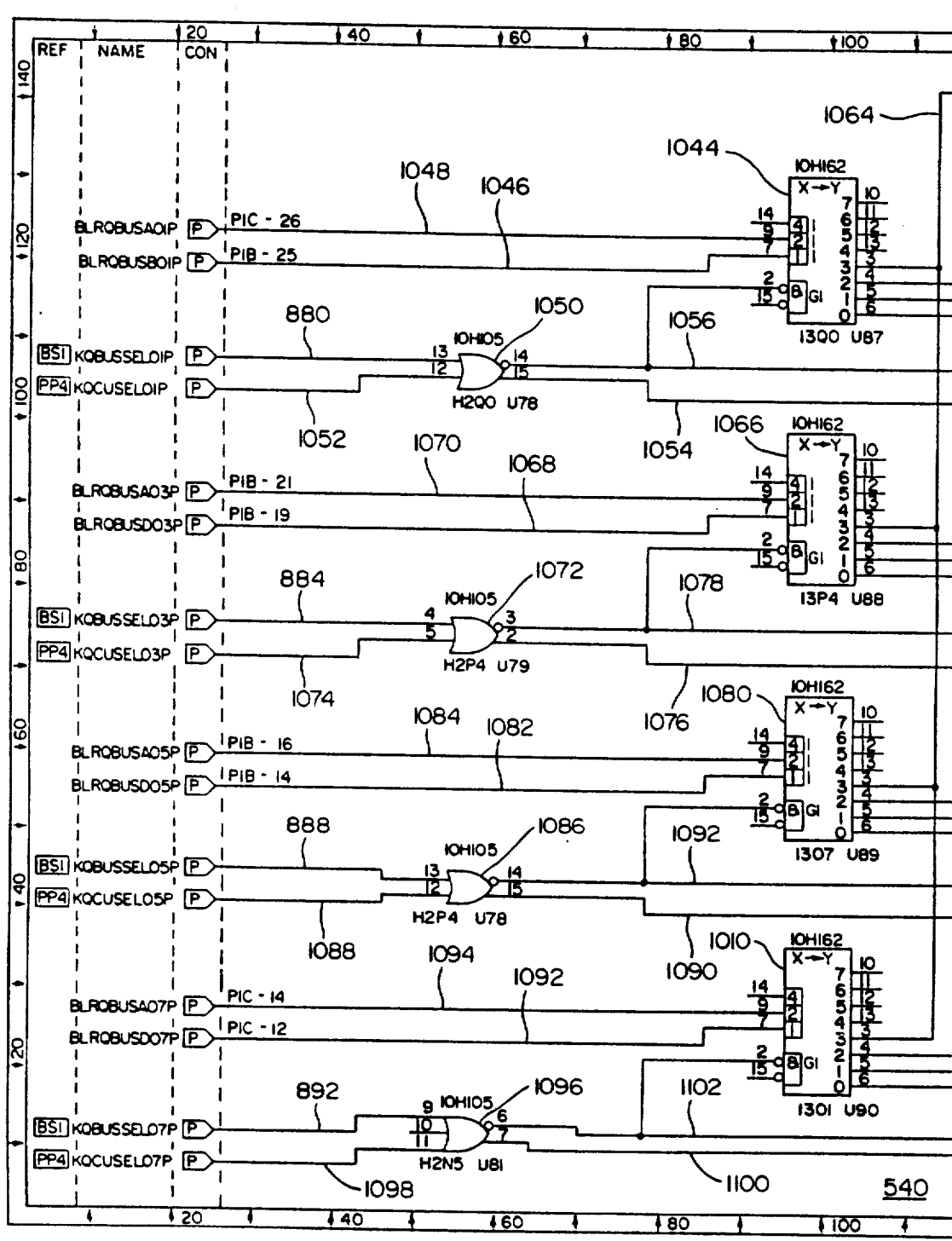
FIGS. 21A and 21B are logic diagrams of a portion of the bus select logic.
Figure 21B:
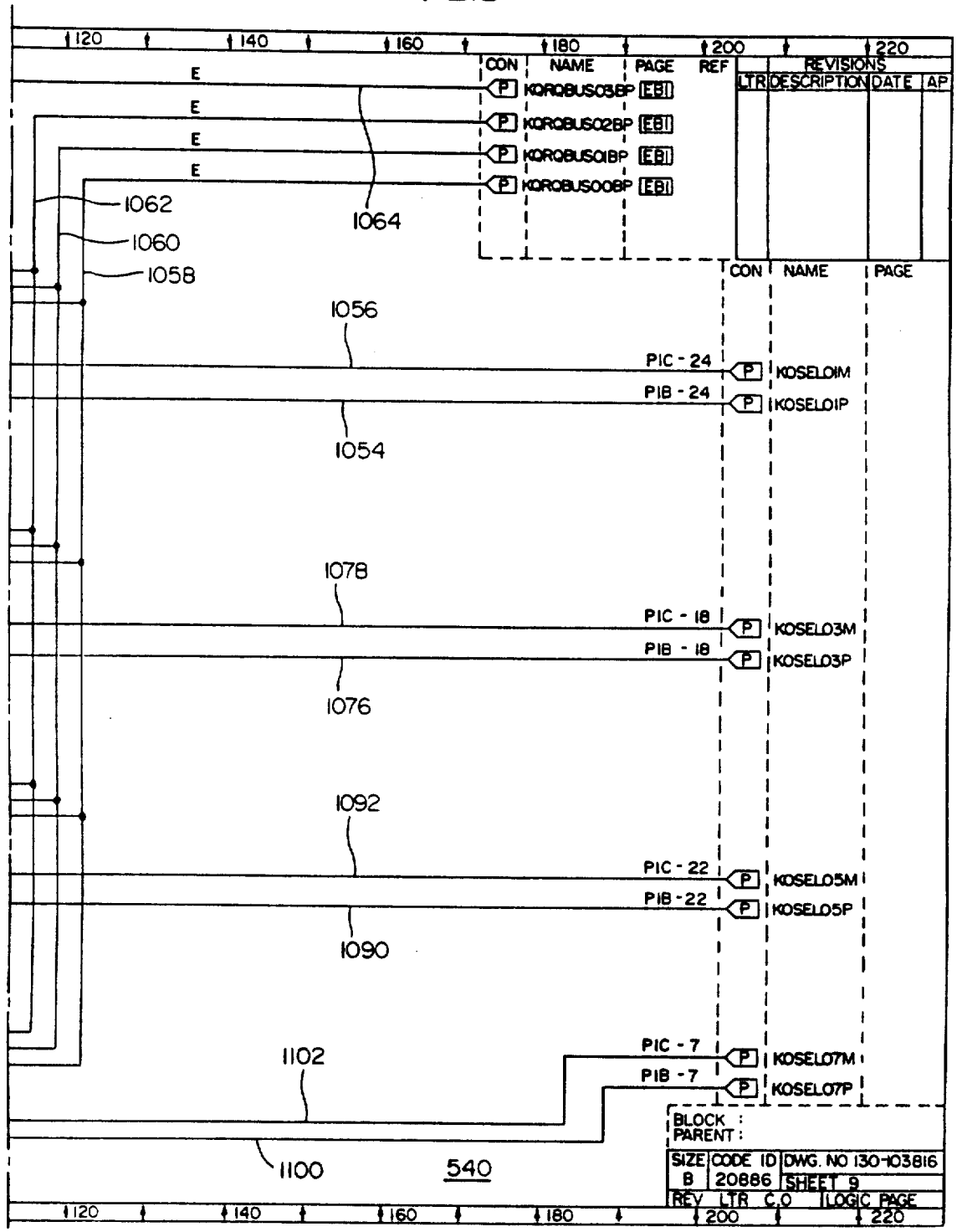

Referring now to FIG. 21, a 3-bit binary word to 1 of 8 decoder 1044 has its binary 1 and 2 input pins respectively connected to a BLRQBUSB01P line 1046 and a BLRQBUSA01P line 1048. An OR gate 1050 is coupled at its input to a KQBUSSEL01P line 880 and a KQCUSEL01P line 1052. When system bus unit 01 is selected by the bus select logic or the diagnostic logic, a lead KQSEL01P 1054 and a lead KQSEL01M 1056 are energized by the OR gate 1050 which also enables the decoder 1044. The decoded output pins 0 through 3 of the decoder 1044 are respectively connected to a KQRQBUS00BP line 1058, a KQRQBUS01BP line 1060, a KQRQBUS02P line 1062 and a KQRQBUS03P line 1064 for selection of either the local bus or one of three intersystem bus link units connected to it in response to the 2-bit address on the BLRQBUSA and BLRQBUSB lines.

A 10H162 3bit binary word to 1 of 8 decoder 1066 has its input binary pins 1 and 2 respectively connected to a BLRQBUSB03P lead 1068 and a BLRQBUSA03P lead 1070. The decoded outputs 0 through 3 of the decoder 1066 are respectively connected to leads 1058, 1060, 1062 and 1064 in parallel with the decoder 1044. An OR gate 1072 has an input coupled to the KQBUSSEL03P lead 884 and a KQCUSEL03P lead 1074 so that the OR gate 1072 generates a high output signal on a KQSEL03P line 1076 and a low output signal on a KQSEL03M line 1078 when either line 884 or line 1074 are driven high. The line 1076 is connected to system bus port 3 to provide a select signal to the device connected to that port.

A 3bit binary word to 1 of 8 line decoder 1080 has its binary 1 and 2 input pins connected respectively to a BLRQBUSB05P line 1082 and a BLRQBUSA05P line 1084 so that the 2-bit binary signal on lines 1082 and 1084 is decoded by the decoder 1080 and the line corresponding to the decoded output is energized by the decoder 1080. In addition, an OR gate 1086 is connected to the KQBUSSEL05P line 888 and a KQCUSEL05P line 1088 so that when either line 888 or 1088 are driven high a KQSEL05P line 1090 is driven high and a KQSEL05M line 1092 is driven low at the same time that the decoder 1080 is enabled for energization of one of the KQRQBUS00-03P lines.

A 10H162 3bit binary word to 1 of 8 decoder 1090 has its binary input pins and 2 respectively connected to a BLRQBUSB07P line 1092 and a BLRQBUSA07P line 1094 for receipt of a 2-bit binary signal from the system bus unit connected TM -.to port 07. The binary signal being indicative of the target bus for a bus transfer request. The output pins 0 through 3 of the decoder 1090 are connected to leads 1058, 1060, 1062 and 1064 respectively. An OR gate 1096 is connected to the KQBUSSEL07P line 892 and a KQCUSEL07P line 1098 from a diagnostic module. If either line is driven high by the bus selection logic indicating that a select signal is to be sent to port 07 or by the diagnostic logic by driving line 1098 high a KQSEL07P line 1100 is driven high and a KQSEL07M line 1102 is driven low by the OR gate 1096. The line 1102 when driven low also enables the decoder 1090.

Figure 22A:
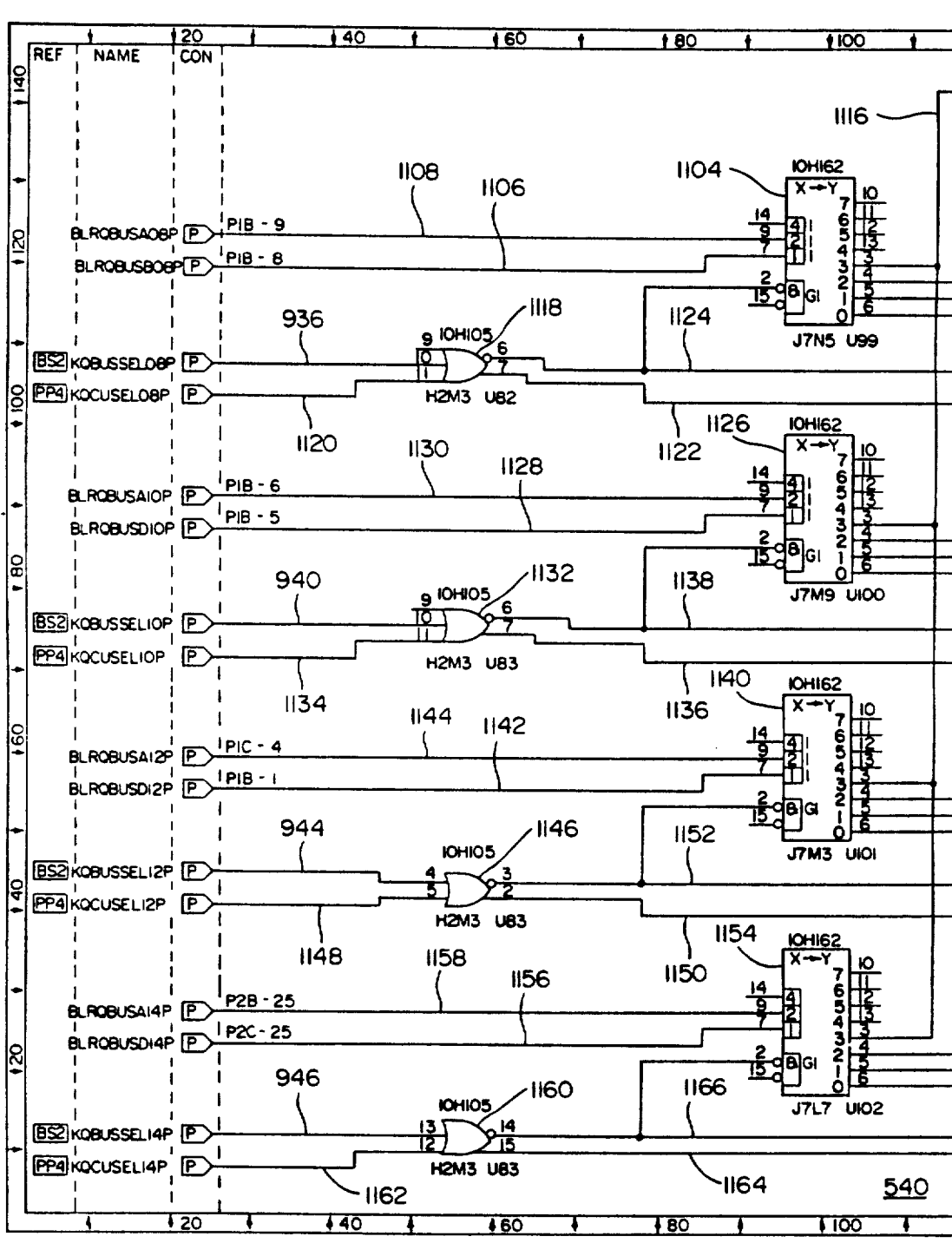
FIGS. 22A and 22B are logic diagrams of a portion of the bus select logic.
Figure 22B:
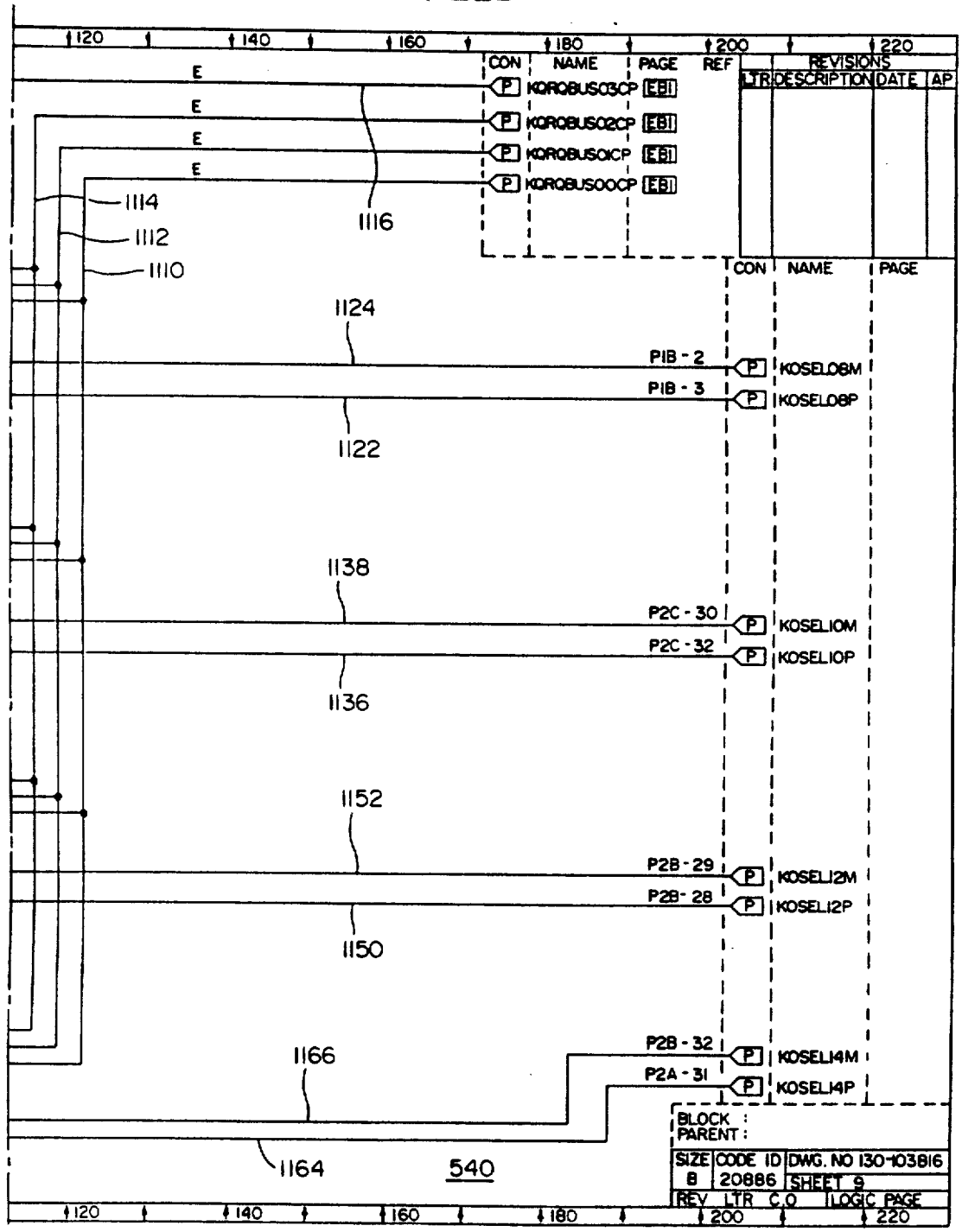

Referring now to FIG. 22, an additional portion of the bus select logic 540 may be seen therein. A 10H162 3bit binary word to 1 of 8 decoder 1104 has its binary 1 and 2 input pins respectively connected to BLRQBUSB08P lead 1106 and a BLRQBUSA08P lead 1108. Leads 1106 and 1108 convey a 2-bit binary code indicative of a target bus address for a bus transfer request from system port 08. The output pins 0 through 3 of the decoder 1104 are respectively connected to a KQRQBUS00CP lead 1110, a KQRQBUS01CP lead 1112, a KQRQBUS02CP lead 1114 and a KQRQBUS03CP lead 1116. An OR gate 1118 is connected to the KQBUSSEL08P line 936 and to a KQCUSEL08P line 1120. When either line 936 or line 1120 are driven high, the OR gate 1118 drives a KQSEL08P line 1122 high and a KQSEL08M line 1124 low thereby conveying a select signal to system bus port 08. At the same time that the select signal is being conveyed, an enable signal is supplied from the line 1124 to an enable pin of the decoder 1104 allowing it to energize one of its output pins 0 through 3 in response to the target bus code on lines 1106 and 1108.

A 10H162 3bit binary word to 1 of 8 line decoder 1126 has its binary input pins 1 and 2 coupled to BLRQBUSB10P lead 1128 and BLRQBUSA10P lead 1130 for receipt of a 2-bit target bus address signal from system bus port 10. An OR gate 1132 is connected to the KQBUSSEL10P line 940 and to a KQCUSEL10P line 1134 so that if the system bus port 10 is selected either by energizing line 940 or 1134, the OR gate 1132 produces a high voltage output on a KQSEL10P line 1136 and a low voltage output on a KQSEL10M line 1138 which are the select lines coupled to the system bus port 10. At the same time, the low signal on the line 1138 is supplied to an enable terminal of the decoder 1126 allowing it to provide a select signal to one of the three output pins coupled to lines 1110, 1112, 1114 and 1116.

A 10H162 3bit binary word to 1 of 8 decoder 1140 has its binary 1 and binary 2 input pins coupled to a BLRQBUSB12P line 1142 and a BLRQBUSA12P line 1144 respectively for receipt of a 2-bit target bus address signal from system bus port 12. An OR gate 1146 is connected to the KQBUSSEL12P line 944 and to a KQCUSEL12P line 1148 so that if either of those lines are driven high, the OR gate 1146 produces a high output signal on a KQSEL12P line 1150 and a low output signal on a KQSEL12M line 1152. The line 1152 when driven low also energizes an enable terminal of the decoder 1140 allowing it to drive one of its output decode pins.

A 10H162 3bit- binary word to 1 of 8 lines decoder 1154 has its binary 1 and 2 input pins respectively connected to a BLRQBUSB14P line 1156 and a BLRQBUSA14P line 1158 for receipt of a 2-bit target bus code from the system bus port 14. An OR gate 1160 is connected to receive a signal from the KQBUS-SEL14P line 946 and the KQCUSEL14P line 1162 when either line 946 or 1162 is driven high, a KQSEL14P line 1164 is driven high and a KQSEL14M line 1166 is driven low by the OR gate 1160 which also enables the decoder 1154.

Figure 23A:
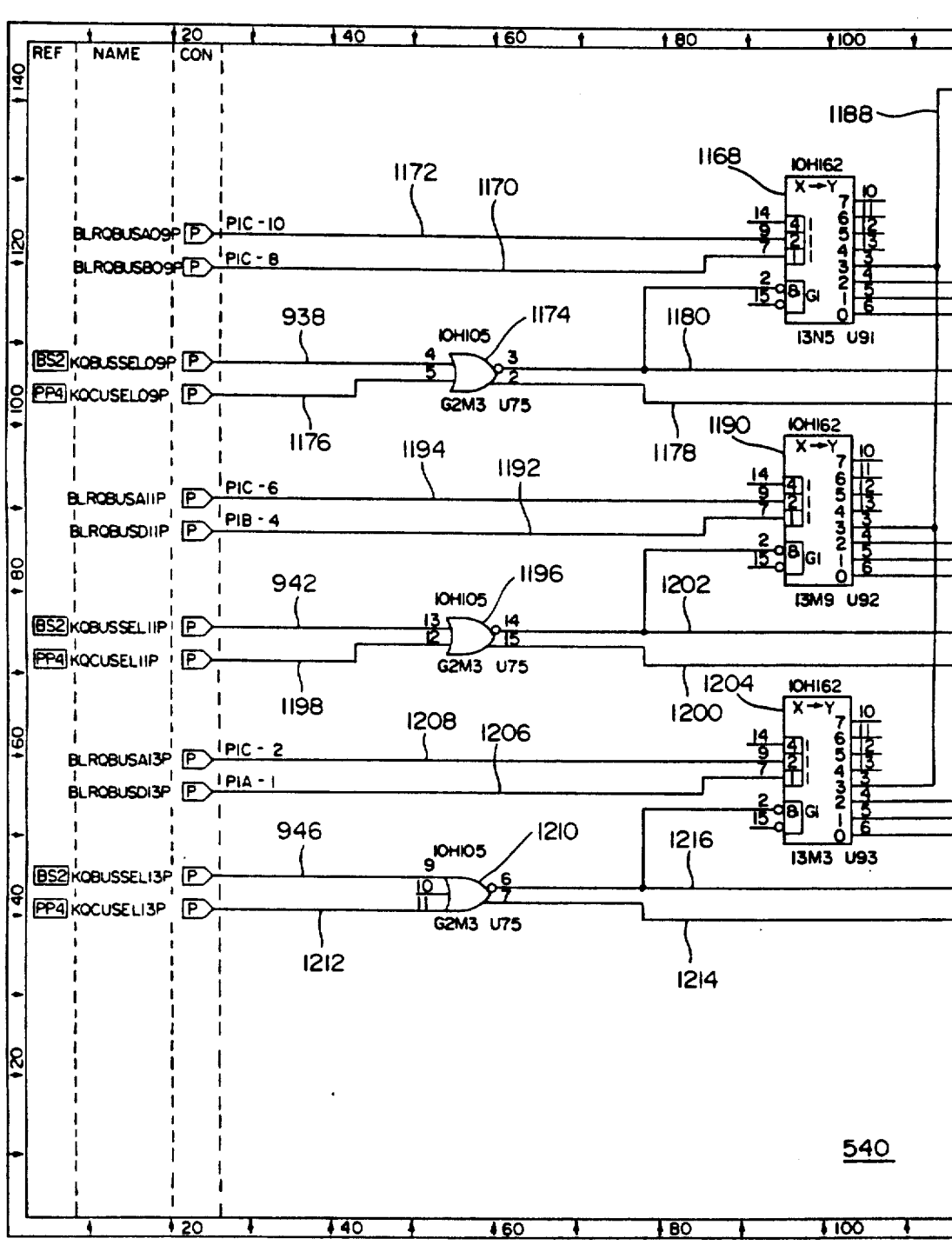
FIGS. 23A and 23B are logic diagrams of a portion of the bus select logic.
Figure 23B:
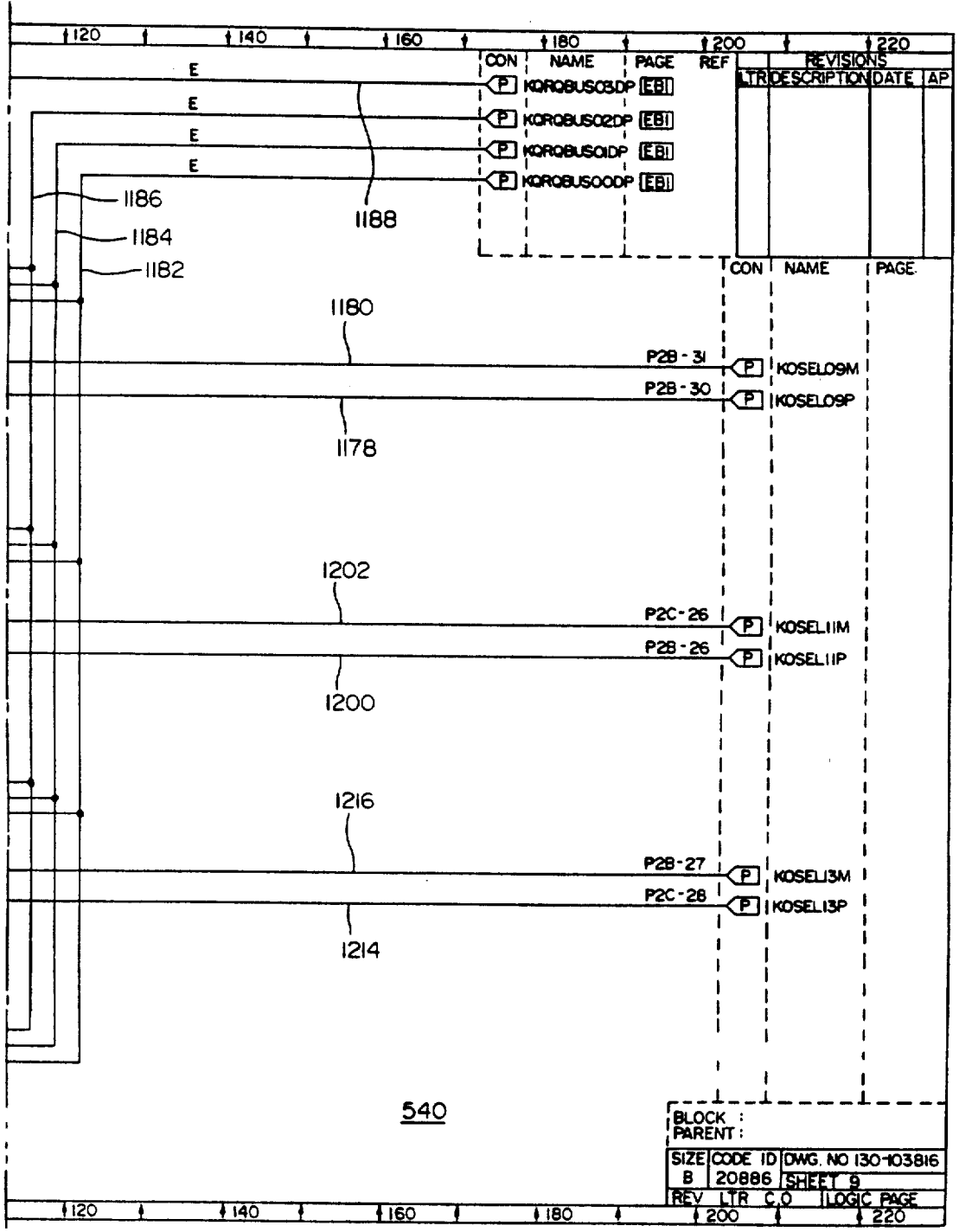

Referring now to FIG. 23, a final portion of the bus select logic 540 is shown therein. A 10H162 3bit binary word to 1 of 8 decoder 1168 has its binary 1 and binary 2 input pins respectively connected to a BLRQBUSB09P line 1170 and a BLRQBUSA09P line 1172 which carry a 2-bit target bus address signal from system bus port 09. An OR gate 1174 is connected to the KQBUSSEL09P line 938 and to a KQCUSEL09P line 1176 for receipt of a selection signal from lines 938 or 1176 indicative of selection of the unit in bus port 9 which causes the OR gate 1174 to drive a KQSEL09P line 1178 high and a KQSEL09M line 1180 low thereby providing a selection signal to the system bus port 9. At the same time that line 1180 is driven low, the low signal operates as an enable signal to allow the decoder 1168 to drive one of its output lines in an asserted state. The output pins 0 through 3 of the decoder 1168 are respectively connected to a KQRQBUS00DP line 1182, a KQRQBUS01DP line 1184, a KQRQBUS02DP line 1186 and a KQRQBUS03DP line 1188. One of lines 1182 through 1188 is driven high in response to the target bus address.

A 10H162 3-bit binary word to 1 of 8 decoder 1190 has its binary 1 and binary 2 input pins respectively connected to a BLRQBUSB11P line 1192 and a BLRQBUSA11P line 1194 which are connected to the system bus port 11 to carry the 2-bit target bus address signal from that port. The decoder 1190 decodes the signals on lines 1192 and 1194 and asserts a signal on one of lines 1182 through 1188. An OR gate 1196 is connected to the KQBUSSEL11P line 942 and a KQCUSEL11P line 1198 so that when system bus port 11 is selected, either line 942 or 1198 is driven high causing a KQSEL11P line 1200 to be driven high and a KQSEL11M line 1202 to be driven low thereby supplying a select signal to system bus port 11. At the same time that line 1202 is driven low, the low signal enables the decoder 1190 so that it can drive an assertion signal on one of the lines 1182 through 1188.

A 10H162 3bit binary word to 1 of 8 line decoder 1204 has its binary input pins 1 and 2 respectively connected to a BLRQBUSB13F line 1206 and a BLRQBUSA13P line 1208. Lines 1206 and 1208 carry the 2-bit target bus code from the system bus port 13 to the decoder 1204. An OR gate 1210 is connected to the KQBUSSEL13P line 946 and a KQCUSEL13P line 1212 is also connected to the OR gate 1210. When either line 946 or 1212 is driven high indicating selection of system bus port 13, the OR gate 1210 produces a high signal on a KQSEL13P line 1214 and produces a low signal on a KQSEL13M line 1216. The low signal on line 1216 also enables the decoder 1204. Thus, the bus select logic not only causes the specific select signals to be returned to the selected system bus units on the source bus, but also causes decoding of the target bus address to take place.

Figure 24A:
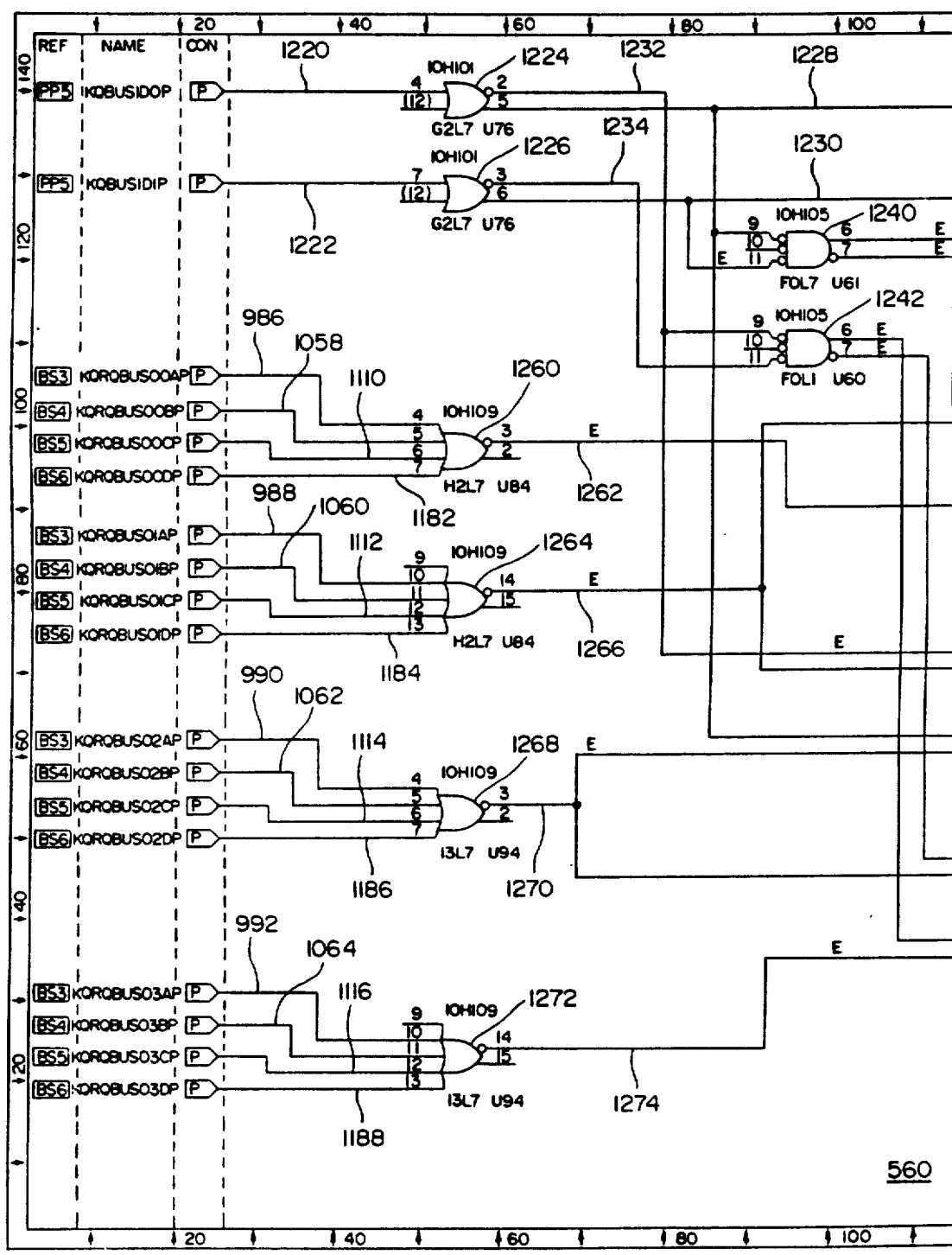
FIGS. 24A and 24B are logic diagrams of the bus link priority unit of FIG. 10.
Figure 24B:
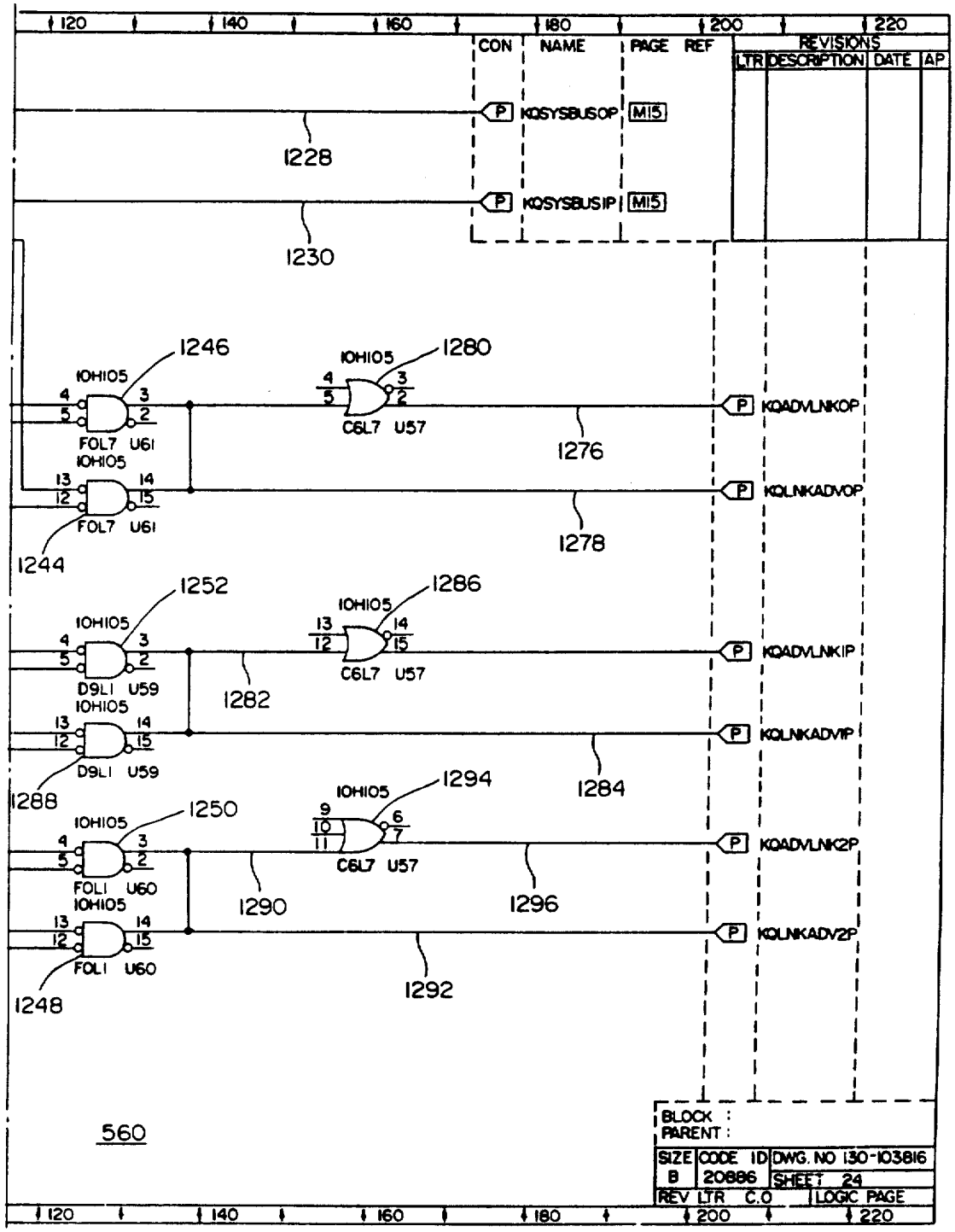

Referring now to FIG. 24, the details of the bus link priority unit 560 are shown therein.

In order to provide advance notice to the intersystem bus links, that a system unit on a source bus will be making a transfer to a target bus via an intersystem bus link, the bus links priority logic 560 is provided to provide a signal to the appropriate intersystem bus link that it will be receiving a transfer at the same time that the system bus unit which is to initiate the transfer is receiving the select signal from the bus select logic 540. This removes an additional polling cycle from transfer time through an intersystem bus link providing greater efficiency.

The ID bus 580 includes a KQBUSID0P lead 1220 and a KQBUSID1P lead 1222 which carry a 2-bit signal indicative of the address assigned to the local bus which is connected to the bus arbiter 251. A pair of OR gates connected to function as buffers and inverters and identified by numerals 1224 and 1226 are connected to the KQBUSID0P lead 1220 and KQBUSID1P lead 1222, respectively. A KQSYSBUS0P lead 1228 is connected to a noninverting output of the OR gate 1224 which functions as a buffer. A KQSYSBUS1P lead 1230 is connected to the OR gate 1226 which also functions as a buffer so that the bus id signal is transmitted on leads 1228 and 1230 to other portions of the system. A lead 1232 is connected to an inverting terminal of the OR gate 1224 to invert the high order bit of the bus id signal. A lead 1234 is connected to the inverting terminal of the OR gate 1226 and carries an inverted signal for the least significant bus id bit. An AND gate 1240 is connected to the leads 1228 and 1230 and inverts their inputs. An AND gate 1242 is connected to the leads 1232 and 1234.

A noninverting output of the AND gate 1240 is fed to an AND gate 1244. An inverting output from the AND gate 1240 is fed to an AND gate 1246. A noninverting output from the AND gate 1242 is fed to an AND gate 1248. An inverting output from the AND gate 1242 is fed to an AND gate 1250. The inverted output lead 1232 from the AND gate 1224 is also connected to an AND gate 1252.

A NOR gate 1260 is connected to KQRQBUS00AP line 986, KQRQBUS00BP line 1058, KQRQBUS00CP line 1110 and KQRQBUS00DP line 1182 so that if the target bus is decoded as bus 00 by any of the bus selection logic an output line 1262 from the NOR gate 1260 is driven low.

A NOR gate 1264 has its inputs coupled to a KQRQBUS01AP line 988, the KQRQBUS01BP line 1060, the KQRQBUS01CP line 1112 and the KQRQBUS01DP line 1184 so that if the bus selection logic indicates that the target bus is 01, the NOR gate 1264 drives an output line 1266 low.

A NOR gate 1268 has its inputs coupled to a KQRQBUS02AP line 990, the KQRQBUS02BP line 1062, the KQRQBUS02CP line 1114 and the KQRQBUS02DP line 1186 so that if any of those lines are driven high indicating that the target bus is bus 02, the NOR gate 1268 drives an output line 1270 low.

A NOR gate 1272 has its inputs connected to the KQRQBUS03AP line 992, the KQRQBUS03BP line 1064, the KQRQBUS03CP line 1116 and the KQRQBUS03DP line 1188 so that if the logic indicates that the target bus is bus 03, the NOR gate 1272 drives an output line 1274 low.

When the AND gate 1240 pin 6 is driven low indicating that the bus id of the source bus is bus 3, and bus 00 is selected, the AND gate 1244 is driven high at its output thereby driving an output line 1276 and an output line 1278 high. Output line 1278 is a KQLNKADV0P line. Output line 1276 is a KQADVLNK0P line. An OR gate 1280 produces the KQLNKADV0P signal. Likewise, if bus 01 is the target bus and the line 1266 is pulled low, while the bus id is 00, the AND gate 1246 output is driven high driving leads 1276 and 1278 high.

When the target bus is 01, and the most significant bit of the bus id number is 1, the AND gate 1252 is driven high energizing a lead 1282 and a lead 1284. The lead 1282 feeds a signal to the NOR gate 1286 which outputs the KQADVLNK1P signal. The line 1284 outputs the KQLNKADV1P signal before it. When the most significant bit of the bus id is 0 and the target bus is bus 02, an AND gate 1288 has its output driven high also asserting both the KQADVLNK1P signal and the KQLNKADV1P signal.

When the source bus id is bus 3 and the target bus id is bus 2, the AND gate 1250 is driven high outputting a signal on a lead 1290 and a lead 1292. The signal on the lead 1290 is delayed by one gate delay by an OR gate 1294 which has an output lead 1296 to carry a KQADVLNK2P signal thereon. When the target bus selected is bus 03, the AND gate 1248 is energized causing the KQADVLNK2P and KQLNKADV2P signals to be asserted in the same cycle.

When the source bus id equals 0 and the target bus is 1, the KQLNKADV0P line is driven. When the target bus is 2, the KQLNKADV1P line is driven. When the target bus is 3 the KQLNKADV2P line is driven.

When the source bus is 1 and the target bus is 0, the KQLNKADV0P line is driven. When the target bus equals 2, the KQLNKADV1P line is driven. When the target bus equals 3, the KQLNKADV2P line is driven.

When the source bus is 2 and the target bus is 0, the KQLNKADV0P line is driven. When the target bus is 1, the KQLNKADV1P line is driven. When the target bus is 3, the KQLNKADV2P line is driven.

When the source bus is 3 and the target bus is 0, the KQLNKADV0P line is driven. When the target bus is 1, the KQLNKADV1P line is driven and when the target bus is 2, the KQLNKADV2P line is driven.

The foregoing description is limited to a specific embodiment of this invention. It will be apparent, however, that this invention can be practiced in data processing systems that are different than the one described in this specification with the attainment of some or all of the foregoing objects and advantages of this invention. Therefore, it is the object of the appended claims to cover all such variations and modifications as come within the true spirit and scope of this invention.

What is claimed is:

1. A bus arbitration system for providing advance transfer signals in a multisystem computer network, comprising:
   a plurality of system units each, having an independent local bus address and predetermined priority number, asserting a bus request signal upon desiring to perform a bus transfer operation;
   an intersystem bus link coupled between one of said plurality of system units and a remote bus for performing off-bus transfers;
   a local system bus coupled to said plurality of system units for receiving said bus request signals; and
   a polling bus arbiter, comprising:
      bus request receiving means coupled to said plurality of system units for receiving said bus request signals from said local system bus;
      target means for receiving a target bus address signal from said system units asserting a bus request signal simultaneously with receiving of said bus request signal by said bus request receiving means;
      means for comparing said target bus address to said local bus address of each of said plurality of system units;
      means for prioritizing said bus request signals according to said predetermined priority numbers of said system units asserting said bus request signals;
      first signalling means for signalling a bus grant status signal to a system unit asserting a bus request signal prioritized by said prioritizing means; and
      second signalling means for signalling said intersystem bus link of an impending bus transfer through said intersystem bus link by said system unit upon determination by said comparing means that said target bus address matches an address of a remote bus to which said intersystem bus link is connected;
   wherein system bus arbitration and providing advance transfer signals to the intersystem bus link take place in a single bus cycle, thus saving time.

* * * * *